(12) United States Patent
High et al.

(10) Patent No.: US 10,239,738 B2
(45) Date of Patent: Mar. 26, 2019

(54) APPARATUS AND METHOD OF MONITORING PRODUCT PLACEMENT WITHIN A SHOPPING FACILITY

(71) Applicant: Walmart Apollo, LLC, Bentonville, AR (US)

(72) Inventors: Donald R. High, Noel, MO (US); Shuvro Chakrobartty, Bentonville, AR (US); Robert C. Taylor, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 468 days.

(21) Appl. No.: 15/061,265

(22) Filed: Mar. 4, 2016

(65) Prior Publication Data

US 2016/0260054 A1 Sep. 8, 2016

Related U.S. Application Data

(60) Provisional application No. 62/129,726, filed on Mar. 6, 2015, provisional application No. 62/129,727, filed
(Continued)

(51) Int. Cl.
*G01C 22/00* (2006.01)
*B66F 9/06* (2006.01)
(Continued)

(52) U.S. Cl.
CPC .............. *B66F 9/063* (2013.01); *A47F 3/08* (2013.01); *A47F 10/04* (2013.01); *A47F 13/00* (2013.01);
(Continued)

(58) Field of Classification Search
CPC ........... G06Q 10/08; G06F 7/00; G06K 15/00
(Continued)

(56) References Cited

U.S. PATENT DOCUMENTS 1,774,653 A 9/1930 Marriott
2,669,345 A 2/1954 Brown
(Continued)

FOREIGN PATENT DOCUMENTS

CA 2524037 5/2006
CA 2625885 4/2007
(Continued)

OTHER PUBLICATIONS

Budgee; "The Robotic Shopping Cart Budgee"; https://www.youtube.com/watch?v=2dYNdVPF4VM; published on Mar. 20, 2015; pp. 1-6.
(Continued)

*Primary Examiner* — Talia F Crawley
(74) *Attorney, Agent, or Firm* — Fitch, Even, Tabin & Flannery LLP

(57) ABSTRACT

Methods and apparatuses are provided for use in monitoring product placement within a shopping facility. Some embodiments provide an apparatus configured to determine product placement conditions within a shopping facility, comprising: a transceiver configured to wirelessly receive communications; a product monitoring control circuit coupled with the transceiver; a memory coupled with the control circuit and storing computer instructions that when executed by the control circuit cause the control circuit to: obtain a composite three-dimensional (3D) scan mapping corresponding to at least a select area of the shopping facility and based on a series of 3D scan data; evaluate the 3D scan mapping to identify multiple product depth distances; and identify, from the evaluation of the 3D scan mapping, when one or more of the multiple product depth distances is greater than a predefined depth distance threshold from the reference offset distance of the product support structure.

18 Claims, 13 Drawing Sheets

Related U.S. Application Data on Mar. 6, 2015, provisional application No. 62/138,877, filed on Mar. 26, 2015, provisional application No. 62/138,885, filed on Mar. 26, 2015, provisional application No. 62/152,421, filed on Apr. 24, 2015, provisional application No. 62/152,465, filed on Apr. 24, 2015, provisional application No. 62/152,440, filed on Apr. 24, 2015, provisional application No. 62/152,630, filed on Apr. 24, 2015, provisional application No. 62/152,711, filed on Apr. 24, 2015, provisional application No. 62/152,610, filed on Apr. 24, 2015, provisional application No. 62/152,667, filed on Apr. 24, 2015, provisional application No. 62/157,388, filed on May 5, 2015, provisional application No. 62/165,579, filed on May 22, 2015, provisional application No. 62/165,416, filed on May 22, 2015, provisional application No. 62/165,586, filed on May 22, 2015, provisional application No. 62/171,822, filed on Jun. 5, 2015, provisional application No. 62/175,182, filed on Jun. 12, 2015, provisional application No. 62/182,339, filed on Jun. 19, 2015, provisional application No. 62/185,478, filed on Jun. 26, 2015, provisional application No. 62/194,131, filed on Jul. 17, 2015, provisional application No. 62/194,119, filed on Jul. 17, 2015, provisional application No. 62/194,121, filed on Jul. 17, 2015, provisional application No. 62/194,127, filed on Jul. 17, 2015, provisional application No. 62/202,744, filed on Aug. 7, 2015, provisional application No. 62/202,747, filed on Aug. 7, 2015, provisional application No. 62/205,548, filed on Aug. 14, 2015, provisional application No. 62/205,569, filed on Aug. 14, 2015, provisional application No. 62/205,555, filed on Aug. 14, 2015, provisional application No. 62/205,539, filed on Aug. 14, 2015, provisional application No. 62/207,858, filed on Aug. 20, 2015, provisional application No. 62/214,826, filed on Sep. 4, 2015, provisional application No. 62/214,824, filed on Sep. 4, 2015, provisional application No. 62/292,084, filed on Feb. 5, 2016, provisional application No. 62/302,547, filed on Mar. 2, 2016, provisional application No. 62/302,567, filed on Mar. 2, 2016, provisional application No. 62/302,713, filed on Mar. 2, 2016, provisional application No. 62/303,021, filed on Mar. 3, 2016.

(51) Int. Cl.
| | | |
|---|---|---|
| G01C 21/20 | (2006.01) | |
| G06Q 30/06 | (2012.01) | |
| A47F 10/04 | (2006.01) | |
| H04W 4/80 | (2018.01) | |
| G05D 1/02 | (2006.01) | |
| G06Q 10/02 | (2012.01) | |
| G06Q 50/30 | (2012.01) | |
| G01S 1/70 | (2006.01) | |
| G06Q 10/08 | (2012.01) | |
| B62B 5/00 | (2006.01) | |
| G06Q 10/06 | (2012.01) | |
| G06Q 30/02 | (2012.01) | |
| H04W 4/04 | (2009.01) | |
| B60P 3/06 | (2006.01) | |
| G05D 1/00 | (2006.01) | |
| A47F 3/08 | (2006.01) | |
| G06Q 30/00 | (2012.01) | |
| H04N 5/77 | (2006.01) | |
| G06Q 50/28 | (2012.01) | |
| H04N 7/18 | (2006.01) |
| E01H 5/06 | (2006.01) |
| E01H 5/12 | (2006.01) |
| G06Q 10/00 | (2012.01) |
| G06Q 10/10 | (2012.01) |
| H04W 4/33 | (2018.01) |
| G06T 7/73 | (2017.01) |
| G06T 7/593 | (2017.01) |
| H04N 13/282 | (2018.01) |
| A47L 11/40 | (2006.01) |
| B60L 11/18 | (2006.01) |
| G05D 1/04 | (2006.01) |
| G06K 9/00 | (2006.01) |
| G06K 9/18 | (2006.01) |
| G06K 9/32 | (2006.01) |
| G06K 9/62 | (2006.01) |
| G06K 9/78 | (2006.01) |
| G08G 1/00 | (2006.01) |
| G10L 13/04 | (2013.01) |
| G10L 15/22 | (2006.01) |
| G10L 17/22 | (2013.01) |
| H02J 7/00 | (2006.01) |
| H04B 10/116 | (2013.01) |
| H04L 29/08 | (2006.01) |
| H04W 4/30 | (2018.01) |
| A47F 13/00 | (2006.01) |
| B07C 5/28 | (2006.01) |
| B07C 5/342 | (2006.01) |
| B65F 3/00 | (2006.01) |
| G05B 19/048 | (2006.01) |
| G06F 3/01 | (2006.01) |
| H04W 4/02 | (2018.01) |
| H04W 4/40 | (2018.01) |
| A47F 10/02 | (2006.01) |
| H04B 1/38 | (2015.01) |
| A47F 10/00 | (2006.01) |
| G05B 19/12 | (2006.01) |
| G06F 17/30 | (2006.01) |
| G06K 7/10 | (2006.01) |
| G06K 7/14 | (2006.01) |

(52) U.S. Cl.
CPC ............ *A47L 11/4011* (2013.01); *B07C 5/28* (2013.01); *B07C 5/3422* (2013.01); *B60L 11/1833* (2013.01); *B60L 11/1844* (2013.01); *B60P 3/06* (2013.01); *B62B 5/0026* (2013.01); *B62B 5/0069* (2013.01); *B62B 5/0076* (2013.01); *B65F 3/00* (2013.01); *E01H 5/061* (2013.01); *E01H 5/12* (2013.01); *G01C 21/206* (2013.01); *G01S 1/70* (2013.01); *G05B 19/048* (2013.01); *G05D 1/0011* (2013.01); *G05D 1/0016* (2013.01); *G05D 1/0022* (2013.01); *G05D 1/0027* (2013.01); *G05D 1/0061* (2013.01); *G05D 1/0088* (2013.01); *G05D 1/021* (2013.01); *G05D 1/028* (2013.01); *G05D 1/0214* (2013.01); *G05D 1/0219* (2013.01); *G05D 1/0234* (2013.01); *G05D 1/0246* (2013.01); *G05D 1/0255* (2013.01); *G05D 1/0276* (2013.01); *G05D 1/0289* (2013.01); *G05D 1/0291* (2013.01); *G05D 1/0293* (2013.01); *G05D 1/0297* (2013.01); *G05D 1/04* (2013.01); *G06F 3/017* (2013.01); *G06K 9/00208* (2013.01); *G06K 9/00671* (2013.01); *G06K 9/00711* (2013.01); *G06K 9/00771* (2013.01); *G06K 9/00791* (2013.01); *G06K 9/00805* (2013.01); *G06K*

9/18 (2013.01); *G06K 9/3208* (2013.01); *G06K 9/6256* (2013.01); *G06K 9/78* (2013.01); *G06Q 10/02* (2013.01); *G06Q 10/06311* (2013.01); *G06Q 10/083* (2013.01); *G06Q 10/087* (2013.01); *G06Q 10/1095* (2013.01); *G06Q 10/30* (2013.01); *G06Q 30/016* (2013.01); *G06Q 30/0281* (2013.01); *G06Q 30/0601* (2013.01); *G06Q 30/0605* (2013.01); *G06Q 30/0613* (2013.01); *G06Q 30/0617* (2013.01); *G06Q 30/0619* (2013.01); *G06Q 30/0631* (2013.01); *G06Q 30/0633* (2013.01); *G06Q 30/0635* (2013.01); *G06Q 30/0639* (2013.01); *G06Q 30/0641* (2013.01); *G06Q 50/28* (2013.01); *G06Q 50/30* (2013.01); *G06T 7/593* (2017.01); *G06T 7/74* (2017.01); *G08G 1/20* (2013.01); *G10L 13/043* (2013.01); *G10L 15/22* (2013.01); *G10L 17/22* (2013.01); *H02J 7/0027* (2013.01); *H04B 10/116* (2013.01); *H04L 67/12* (2013.01); *H04L 67/141* (2013.01); *H04L 67/143* (2013.01); *H04N 5/77* (2013.01); *H04N 7/18* (2013.01); *H04N 7/183* (2013.01); *H04N 7/185* (2013.01); *H04N 13/282* (2018.05); *H04W 4/02* (2013.01); *H04W 4/043* (2013.01); *H04W 4/30* (2018.02); *H04W 4/33* (2018.02); *H04W 4/40* (2018.02); *H04W 4/80* (2018.02); *A47F 2010/005* (2013.01); *A47F 2010/025* (2013.01); *A47L 2201/04* (2013.01); *B07C 2501/0045* (2013.01); *B07C 2501/0054* (2013.01); *B07C 2501/0063* (2013.01); *B60Y 2410/10* (2013.01); *B65F 2210/168* (2013.01); *G05B 19/124* (2013.01); *G05B 2219/23363* (2013.01); *G05B 2219/39107* (2013.01); *G05D 2201/0203* (2013.01); *G05D 2201/0216* (2013.01); *G06F 17/30979* (2013.01); *G06K 7/10297* (2013.01); *G06K 7/10821* (2013.01); *G06K 7/1413* (2013.01); *G06K 2009/00738* (2013.01); *G06Q 10/06315* (2013.01); *G06T 2207/10028* (2013.01); *G10L 2015/223* (2013.01); *H02J 2007/0096* (2013.01); *H04B 1/38* (2013.01); *Y02W 30/82* (2015.05); *Y02W 30/827* (2015.05); *Y02W 90/20* (2015.05); *Y10S 901/01* (2013.01)

(58) Field of Classification Search
USPC .............. 705/28; 700/250, 259; 348/46, 47
See application file for complete search history.

(56) References Cited

U.S. PATENT DOCUMENTS

| | | |
|---|---|---|
| 3,765,546 A | 10/1973 | Westerling |
| 4,071,740 A | 1/1978 | Gogulski |
| 4,158,416 A | 6/1979 | Podesta |
| 4,588,349 A | 5/1986 | Reuter |
| 4,672,280 A | 6/1987 | Honjo |
| 4,777,416 A | 10/1988 | George, II |
| 4,791,482 A | 12/1988 | Barry |
| 4,868,544 A | 9/1989 | Havens |
| 4,911,608 A | 3/1990 | Krappitz |
| 5,119,087 A | 6/1992 | Lucas |
| 5,279,672 A | 1/1994 | Betker |
| 5,287,266 A | 2/1994 | Malec |
| 5,295,551 A | 3/1994 | Sukonick |
| 5,363,305 A | 11/1994 | Cox |
| 5,380,138 A | 1/1995 | Kasai |
| 5,384,450 A | 1/1995 | Goetz, Jr. |
| 5,395,206 A | 3/1995 | Cerny, Jr. |
| 5,402,051 A | 3/1995 | Fujiwara |
| 5,548,515 A | 8/1996 | Pilley |
| 5,632,381 A | 5/1997 | Thust |
| 5,652,489 A | 7/1997 | Kawakami |
| 5,671,362 A | 9/1997 | Cowe |
| 5,777,571 A | 7/1998 | Chuang |
| 5,801,340 A | 9/1998 | Peter |
| 5,917,174 A | 6/1999 | Moore |
| 5,920,261 A | 7/1999 | Hughes |
| 5,969,317 A | 10/1999 | Espy |
| 6,018,397 A | 1/2000 | Cloutier |
| 6,199,753 B1 | 3/2001 | Tracy |
| 6,201,203 B1 | 3/2001 | Tilles |
| 6,240,342 B1 | 5/2001 | Fiegert |
| 6,339,735 B1 | 1/2002 | Peless |
| 6,365,857 B1 | 4/2002 | Maehata |
| 6,374,155 B1 | 4/2002 | Wallach |
| 6,394,519 B1 | 5/2002 | Byers |
| 6,431,078 B2 | 8/2002 | Serrano |
| 6,522,952 B1 | 2/2003 | Arai |
| 6,525,509 B1 | 2/2003 | Petersson |
| 6,535,793 B2 | 3/2003 | Allard |
| 6,550,672 B1 | 4/2003 | Tracy |
| 6,571,693 B1 | 6/2003 | Kaldenberg |
| 6,584,375 B2 | 6/2003 | Bancroft |
| 6,584,376 B1 | 6/2003 | VanKommer |
| 6,600,418 B2 | 7/2003 | Francis |
| 6,601,759 B2 | 8/2003 | Fife |
| 6,606,411 B1 | 8/2003 | Loui |
| 6,626,632 B2 | 9/2003 | Guenzi |
| 6,633,800 B1 | 10/2003 | Ward |
| 6,655,897 B1 | 12/2003 | Harwell |
| 6,667,592 B2 | 12/2003 | Jacobs |
| 6,672,601 B1 | 1/2004 | Hofheins |
| 6,678,583 B2 | 1/2004 | Nasr |
| 6,688,435 B1 | 2/2004 | Will |
| 6,728,597 B2 | 4/2004 | Didriksen |
| 6,731,204 B2 | 5/2004 | Lehmann |
| 6,745,186 B1 | 6/2004 | Testa |
| 6,752,582 B2 | 6/2004 | Garcia |
| 6,810,149 B1 | 10/2004 | Squilla |
| 6,816,085 B1 | 11/2004 | Haynes |
| 6,832,884 B2 | 12/2004 | Robinson |
| 6,841,963 B2 | 1/2005 | Song |
| 6,883,201 B2 | 4/2005 | Jones |
| 6,885,736 B2 | 4/2005 | Uppaluru |
| 6,886,101 B2 | 4/2005 | Glazer |
| 6,895,301 B2 | 5/2005 | Mountz |
| 6,910,828 B1 | 6/2005 | Hughes |
| 6,937,989 B2 | 8/2005 | McIntyre |
| 6,954,695 B2 | 10/2005 | Bonilla |
| 6,967,455 B2 | 11/2005 | Nakadai |
| 6,975,997 B1 | 12/2005 | Murakami |
| 7,039,499 B1 | 5/2006 | Nasr |
| 7,066,291 B2 | 6/2006 | Martins |
| 7,101,113 B2 | 9/2006 | Hughes |
| 7,101,139 B1 | 9/2006 | Benedict |
| 7,117,902 B2 | 10/2006 | Osborne |
| 7,145,562 B2 | 12/2006 | Schechter |
| 7,147,154 B2 | 12/2006 | Myers |
| 7,177,820 B2 | 2/2007 | McIntyre |
| 7,184,586 B2 | 2/2007 | Jeon |
| 7,205,016 B2 | 4/2007 | Garwood |
| 7,206,753 B2 | 4/2007 | Bancroft |
| 7,222,363 B2 | 5/2007 | Rice |
| 7,233,241 B2 | 6/2007 | Overhultz |
| 7,234,609 B2 | 6/2007 | DeLazzer |
| 7,261,511 B2 | 8/2007 | Felder |
| 7,367,245 B2 | 5/2008 | Okazaki |
| 7,381,022 B1 | 6/2008 | King |
| 7,402,018 B2 | 7/2008 | Mountz |
| 7,431,208 B2 | 10/2008 | Feldman |
| 7,447,564 B2 | 11/2008 | Yasukawa |
| 7,463,147 B1 | 12/2008 | Laffoon |
| 7,474,945 B2 | 1/2009 | Matsunaga |
| 7,487,913 B2 | 2/2009 | Adema |
| 7,533,029 B2 | 5/2009 | Mallett |
| 7,554,282 B2 | 6/2009 | Nakamoto |
| 7,556,108 B2 | 7/2009 | Won |

(56) References Cited

U.S. PATENT DOCUMENTS

| | | |
|---|---|---|
| 7,556,219 B2 | 7/2009 | Page |
| 7,587,756 B2 | 9/2009 | Peart |
| 7,613,544 B2 | 11/2009 | Park |
| 7,627,515 B2 | 12/2009 | Borgs |
| 7,636,045 B2 | 12/2009 | Sugiyama |
| 7,648,068 B2 * | 1/2010 | Silverbrook ............ G06F 3/014 |
| | | 235/383 |
| 7,653,603 B1 | 1/2010 | Holtkamp, Jr. |
| 7,658,327 B2 | 2/2010 | Tuchman |
| 7,689,322 B2 | 3/2010 | Tanaka |
| 7,693,605 B2 | 4/2010 | Park |
| 7,693,745 B1 | 4/2010 | Pomerantz |
| 7,693,757 B2 | 4/2010 | Zimmerman |
| 7,706,917 B1 | 4/2010 | Chiappetta |
| 7,716,064 B2 | 5/2010 | McIntyre |
| 7,726,563 B2 | 6/2010 | Scott |
| 7,762,458 B2 | 7/2010 | Stawar |
| 7,783,527 B2 | 8/2010 | Bonner |
| 7,787,985 B2 | 8/2010 | Tsujimoto |
| 7,817,394 B2 | 10/2010 | Mukherjee |
| 7,826,919 B2 | 11/2010 | DAndrea |
| 7,835,281 B2 | 11/2010 | Lee |
| 7,894,932 B2 | 2/2011 | Mountz |
| 7,894,939 B2 | 2/2011 | Zini |
| 7,969,297 B2 | 6/2011 | Haartsen |
| 7,996,109 B2 | 8/2011 | Zini |
| 8,010,230 B2 | 8/2011 | Zini |
| 8,032,249 B1 | 10/2011 | Shakes |
| 8,041,455 B2 | 10/2011 | Thorne |
| 8,050,976 B2 | 11/2011 | Staib |
| 8,065,032 B2 | 11/2011 | Stifter |
| 8,065,353 B2 | 11/2011 | Eckhoff-Hornback |
| 8,069,092 B2 | 11/2011 | Bryant |
| 8,083,013 B2 | 12/2011 | Bewley |
| 8,099,191 B2 | 1/2012 | Blanc |
| 8,103,398 B2 | 1/2012 | Duggan |
| 8,195,333 B2 | 6/2012 | Ziegler |
| 8,239,276 B2 | 8/2012 | Lin |
| 8,244,041 B1 | 8/2012 | Silver |
| 8,248,467 B1 | 8/2012 | Ganick |
| 8,260,456 B2 | 9/2012 | Siegel |
| 8,284,240 B2 | 10/2012 | Saint-Pierre |
| 8,295,542 B2 | 10/2012 | Albertson |
| 8,321,303 B1 | 11/2012 | Krishnamurthy |
| 8,325,036 B1 | 12/2012 | Fuhr |
| 8,342,467 B2 | 1/2013 | Stachowski |
| 8,352,110 B1 | 1/2013 | Szybalski |
| 8,359,122 B2 | 1/2013 | Koselka |
| 8,380,349 B1 * | 2/2013 | Hickman ............ G05D 1/0246 |
| | | 700/247 |
| 8,393,846 B1 | 3/2013 | Coots |
| 8,412,400 B2 | 4/2013 | DAndrea |
| 8,423,280 B2 | 4/2013 | Edwards |
| 8,425,173 B2 | 4/2013 | Lert |
| 8,429,004 B2 | 4/2013 | Hamilton |
| 8,430,192 B2 | 4/2013 | Gillett |
| 8,433,470 B1 | 4/2013 | Szybalski |
| 8,433,507 B2 | 4/2013 | Hannah |
| 8,437,875 B2 | 5/2013 | Hernandez |
| 8,444,369 B2 | 5/2013 | Watt |
| 8,447,863 B1 * | 5/2013 | Francis, Jr. ............ H04W 4/02 |
| | | 709/226 |
| 8,452,450 B2 | 5/2013 | Dooley |
| 8,474,090 B2 | 7/2013 | Jones |
| 8,494,908 B2 | 7/2013 | Herwig |
| 8,504,202 B2 | 8/2013 | Ichinose |
| 8,508,590 B2 | 8/2013 | Laws |
| 8,510,033 B2 | 8/2013 | Park |
| 8,511,606 B1 | 8/2013 | Lutke |
| 8,515,580 B2 | 8/2013 | Taylor |
| 8,516,651 B2 | 8/2013 | Jones |
| 8,538,577 B2 | 9/2013 | Bell |
| 8,544,858 B2 | 10/2013 | Eberlein |
| 8,571,700 B2 | 10/2013 | Keller |
| 8,572,712 B2 | 10/2013 | Rice |
| 8,577,538 B2 | 11/2013 | Lenser |
| 8,587,662 B1 | 11/2013 | Moll |
| 8,588,969 B2 | 11/2013 | Frazier |
| 8,594,834 B1 | 11/2013 | Clark |
| 8,606,314 B2 | 12/2013 | Barnes, Jr. |
| 8,606,392 B2 | 12/2013 | Wurman |
| 8,639,382 B1 | 1/2014 | Clark |
| 8,645,223 B2 | 2/2014 | Ouimet |
| 8,649,557 B2 | 2/2014 | Hyung |
| 8,656,550 B2 | 2/2014 | Jones |
| 8,670,866 B2 | 3/2014 | Ziegler |
| 8,671,507 B2 | 3/2014 | Jones |
| 8,676,377 B2 | 3/2014 | Siegel |
| 8,676,420 B2 | 3/2014 | Kume |
| 8,676,480 B2 | 3/2014 | Lynch |
| 8,700,230 B1 | 4/2014 | Hannah |
| 8,708,285 B1 | 4/2014 | Carreiro |
| 8,718,814 B1 | 5/2014 | Clark |
| 8,724,282 B2 | 5/2014 | Hiremath |
| 8,732,039 B1 | 5/2014 | Chen |
| 8,744,626 B2 | 6/2014 | Johnson |
| 8,751,042 B2 | 6/2014 | Lee |
| 8,763,199 B2 | 7/2014 | Jones |
| 8,770,976 B2 | 7/2014 | Moser |
| 8,775,064 B2 | 7/2014 | Zeng |
| 8,798,786 B2 | 8/2014 | Wurman |
| 8,798,840 B2 * | 8/2014 | Fong ................... G05D 1/0274 |
| | | 701/23 |
| 8,814,039 B2 | 8/2014 | Bishop |
| 8,818,556 B2 | 8/2014 | Sanchez |
| 8,820,633 B2 | 9/2014 | Bishop |
| 8,825,226 B1 | 9/2014 | Worley, III |
| 8,831,984 B2 | 9/2014 | Hoffman |
| 8,838,268 B2 | 9/2014 | Friedman |
| 8,843,244 B2 | 9/2014 | Phillips |
| 8,851,369 B2 | 10/2014 | Bishop |
| 8,882,432 B2 | 11/2014 | Bastian, II |
| 8,886,390 B2 | 11/2014 | Wolfe |
| 8,892,240 B1 | 11/2014 | Vliet |
| 8,892,241 B2 | 11/2014 | Weiss |
| 8,899,903 B1 | 12/2014 | Saad |
| 8,918,202 B2 | 12/2014 | Kawano |
| 8,918,230 B2 | 12/2014 | Chen |
| 8,930,044 B1 | 1/2015 | Peeters |
| 8,965,561 B2 | 2/2015 | Jacobus |
| 8,972,045 B1 | 3/2015 | Mountz |
| 8,972,061 B2 | 3/2015 | Rosenstein |
| 8,983,647 B1 | 3/2015 | Dwarakanath |
| 8,989,053 B1 | 3/2015 | Skaaksrud |
| 9,002,506 B1 | 4/2015 | Agarwal |
| 9,008,827 B1 | 4/2015 | Dwarakanath |
| 9,008,829 B2 | 4/2015 | Worsley |
| 9,014,848 B2 | 4/2015 | Farlow |
| 9,075,136 B1 | 7/2015 | Joao |
| 9,129,277 B2 * | 9/2015 | MacIntosh ............ G06Q 20/208 |
| 9,170,117 B1 | 10/2015 | Abuelsaad |
| 9,173,816 B2 | 11/2015 | Reinhardt |
| 9,190,304 B2 | 11/2015 | MacKnight |
| 1,506,095 A1 | 3/2016 | High |
| 1,506,102 A1 | 3/2016 | Kay |
| 1,506,105 A1 | 3/2016 | High |
| 1,506,120 A1 | 3/2016 | High |
| 1,506,128 A1 | 3/2016 | Thompson |
| 1,506,132 A1 | 3/2016 | High |
| 1,506,135 A1 | 3/2016 | High |
| 1,506,140 A1 | 3/2016 | High |
| 1,506,144 A1 | 3/2016 | High |
| 1,506,147 A1 | 3/2016 | High |
| 1,506,150 A1 | 3/2016 | High |
| 1,506,167 A1 | 3/2016 | Taylor |
| 1,506,168 A1 | 3/2016 | Thompson |
| 1,506,172 A1 | 3/2016 | Atchley |
| 1,506,177 A1 | 3/2016 | Winkle |
| 1,506,179 A1 | 3/2016 | High |
| 1,506,180 A1 | 3/2016 | Atchley |
| 1,506,184 A1 | 3/2016 | High |
| 1,506,190 A1 | 3/2016 | High |
| 1,506,198 A1 | 3/2016 | Thompson |
| 9,278,839 B2 | 3/2016 | Gilbride |

(56) References Cited

U.S. PATENT DOCUMENTS

| | | | |
|---|---|---|---|
| 9,305,280 B1 | 4/2016 | Berg | |
| 9,329,597 B2 | 5/2016 | Stoschek | |
| 1,527,500 A1 | 9/2016 | High | |
| 1,527,501 A1 | 9/2016 | High | |
| 1,527,504 A1 | 9/2016 | High | |
| 1,528,295 A1 | 9/2016 | High | |
| 1,528,892 A1 | 10/2016 | High | |
| 9,495,703 B1 | 11/2016 | Kaye, III | |
| 9,534,906 B2 * | 1/2017 | High | E01H 5/12 |
| 9,550,577 B1 | 1/2017 | Beckman | |
| 1,542,381 A1 | 2/2017 | High | |
| 9,573,684 B2 | 2/2017 | Kimchi | |
| 9,578,282 B1 | 2/2017 | Sills | |
| 1,544,691 A1 | 3/2017 | High | |
| 1,544,717 A1 | 3/2017 | High | |
| 1,544,720 A1 | 3/2017 | High | |
| 1,547,127 A1 | 3/2017 | High | |
| 9,607,285 B1 | 3/2017 | Wellman | |
| 9,623,923 B2 | 4/2017 | Riedel | |
| 9,649,766 B2 | 5/2017 | Stubbs | |
| 9,656,805 B1 | 5/2017 | Evans | |
| 9,658,622 B2 | 5/2017 | Walton | |
| 9,663,292 B1 | 5/2017 | Brazeau | |
| 9,663,293 B2 | 5/2017 | Wurman | |
| 9,663,295 B1 | 5/2017 | Wurman | |
| 9,663,296 B1 | 5/2017 | Dingle | |
| 1,569,222 A1 | 8/2017 | High | |
| 9,747,480 B2 | 8/2017 | McAllister | |
| 1,569,806 A1 | 9/2017 | High | |
| 9,757,002 B2 | 9/2017 | Thompson | |
| 9,801,517 B2 | 10/2017 | High | |
| 9,827,678 B1 | 11/2017 | Gilbertson | |
| 1,583,670 A1 | 12/2017 | High | |
| 9,875,502 B2 | 1/2018 | Kay | |
| 9,875,503 B2 | 1/2018 | High | |
| 1,589,225 A1 | 2/2018 | High | |
| 1,589,415 A1 | 2/2018 | High | |
| 9,896,315 B2 | 3/2018 | High | |
| 9,908,760 B2 | 3/2018 | High | |
| 1,599,027 A1 | 5/2018 | High | |
| 1,600,177 A1 | 6/2018 | High | |
| 9,994,434 B2 | 6/2018 | High | |
| 1,001,732 A1 | 7/2018 | High | |
| 1,605,943 A1 | 8/2018 | High | |
| 1,610,006 A1 | 8/2018 | High | |
| 1,610,929 A1 | 8/2018 | High | |
| 1,007,189 A1 | 9/2018 | High | |
| 1,008,152 A1 | 9/2018 | High | |
| 2001/0042024 A1 | 11/2001 | Rogers | |
| 2002/0060542 A1 | 5/2002 | Song | |
| 2002/0095342 A1 | 7/2002 | Feldman | |
| 2002/0154974 A1 | 10/2002 | Fukuda | |
| 2002/0156551 A1 | 10/2002 | Tackett | |
| 2002/0165638 A1 | 11/2002 | Bancroft | |
| 2002/0165643 A1 | 11/2002 | Bancroft | |
| 2002/0165790 A1 | 11/2002 | Bancroft | |
| 2002/0174021 A1 | 11/2002 | Chu | |
| 2003/0028284 A1 | 2/2003 | Chirnomas | |
| 2003/0152679 A1 | 8/2003 | Garwood | |
| 2003/0170357 A1 | 9/2003 | Garwood | |
| 2003/0185948 A1 | 10/2003 | Garwood | |
| 2003/0222798 A1 | 12/2003 | Floros | |
| 2004/0068348 A1 | 4/2004 | Jager | |
| 2004/0081729 A1 | 4/2004 | Garwood | |
| 2004/0093650 A1 | 5/2004 | Martins | |
| 2004/0098167 A1 | 5/2004 | Yi | |
| 2004/0117063 A1 | 6/2004 | Sabe | |
| 2004/0146602 A1 | 7/2004 | Garwood | |
| 2004/0216339 A1 | 11/2004 | Garberg | |
| 2004/0217166 A1 | 11/2004 | Myers | |
| 2004/0221790 A1 | 11/2004 | Sinclair | |
| 2004/0225613 A1 | 11/2004 | Narayanaswami | |
| 2004/0249497 A1 | 12/2004 | Saigh | |
| 2005/0008463 A1 | 1/2005 | Stehr | |
| 2005/0047895 A1 | 3/2005 | Lert | |
| 2005/0072651 A1 | 4/2005 | Wieth | |
| 2005/0080520 A1 | 4/2005 | Kline | |
| 2005/0104547 A1 | 5/2005 | Wang | |
| 2005/0149414 A1 | 7/2005 | Schrodt | |
| 2005/0177446 A1 | 8/2005 | Hoblit | |
| 2005/0216126 A1 | 9/2005 | Koselka | |
| 2005/0222712 A1 | 10/2005 | Orita | |
| 2005/0230472 A1 | 10/2005 | Chang | |
| 2005/0238465 A1 | 10/2005 | Razumov | |
| 2006/0107067 A1 | 5/2006 | Safal | |
| 2006/0147087 A1 | 7/2006 | Goncalves | |
| 2006/0163350 A1 | 7/2006 | Melton | |
| 2006/0178777 A1 | 8/2006 | Park | |
| 2006/0206235 A1 | 9/2006 | Shakes | |
| 2006/0210382 A1 | 9/2006 | Mountz | |
| 2006/0220809 A1 | 10/2006 | Stigall | |
| 2006/0221072 A1 | 10/2006 | Se | |
| 2006/0231301 A1 | 10/2006 | Rose | |
| 2006/0235570 A1 | 10/2006 | Jung | |
| 2006/0241827 A1 | 10/2006 | Fukuchi | |
| 2006/0244588 A1 | 11/2006 | Hannah | |
| 2006/0279421 A1 | 12/2006 | French | |
| 2006/0293810 A1 | 12/2006 | Nakamoto | |
| 2007/0005179 A1 | 1/2007 | Mccrackin | |
| 2007/0017855 A1 | 1/2007 | Pippin | |
| 2007/0045018 A1 | 3/2007 | Carter | |
| 2007/0061210 A1 | 3/2007 | Chen | |
| 2007/0085682 A1 | 4/2007 | Murofushi | |
| 2007/0125727 A1 | 6/2007 | Winkler | |
| 2007/0150368 A1 | 6/2007 | Arora | |
| 2007/0152057 A1 | 7/2007 | Cato | |
| 2007/0222679 A1 | 9/2007 | Morris | |
| 2007/0269299 A1 | 11/2007 | Ross | |
| 2007/0284442 A1 | 12/2007 | Herskovitz | |
| 2007/0288123 A1 | 12/2007 | D'Andrea | |
| 2007/0293978 A1 | 12/2007 | Wurman | |
| 2008/0011836 A1 | 1/2008 | Adema | |
| 2008/0031491 A1 | 2/2008 | Ma | |
| 2008/0041644 A1 | 2/2008 | Tudek | |
| 2008/0042836 A1 | 2/2008 | Christopher | |
| 2008/0075566 A1 | 3/2008 | Benedict | |
| 2008/0075568 A1 | 3/2008 | Benedict | |
| 2008/0075569 A1 | 3/2008 | Benedict | |
| 2008/0077511 A1 | 3/2008 | Zimmerman | |
| 2008/0105445 A1 | 5/2008 | Dayton | |
| 2008/0131255 A1 | 6/2008 | Hessler | |
| 2008/0140253 A1 | 6/2008 | Brown | |
| 2008/0154720 A1 | 6/2008 | Gounares | |
| 2008/0201227 A1 | 8/2008 | Bakewell | |
| 2008/0226129 A1 | 9/2008 | Kundu | |
| 2008/0267759 A1 | 10/2008 | Morency | |
| 2008/0281515 A1 | 11/2008 | Ann | |
| 2008/0281664 A1 | 11/2008 | Campbell | |
| 2008/0294288 A1 | 11/2008 | Yamauchi | |
| 2008/0306787 A1 | 12/2008 | Hamilton | |
| 2008/0308630 A1 | 12/2008 | Bhogal | |
| 2008/0314667 A1 | 12/2008 | Hannah | |
| 2009/0074545 A1 | 3/2009 | Lert | |
| 2009/0132250 A1 | 5/2009 | Chiang | |
| 2009/0134572 A1 | 5/2009 | Obuchi | |
| 2009/0138375 A1 | 5/2009 | Schwartz | |
| 2009/0154708 A1 | 6/2009 | Kolar Sunder | |
| 2009/0155033 A1 | 6/2009 | Olsen | |
| 2009/0164902 A1 | 6/2009 | Cohen | |
| 2009/0210536 A1 | 8/2009 | Allen | |
| 2009/0240571 A1 | 9/2009 | Bonner | |
| 2009/0259571 A1 | 10/2009 | Ebling | |
| 2009/0265193 A1 | 10/2009 | Collins | |
| 2009/0269173 A1 | 10/2009 | De Leo | |
| 2009/0299822 A1 | 12/2009 | Harari | |
| 2009/0319399 A1 | 12/2009 | Resta | |
| 2010/0025964 A1 | 2/2010 | Fisk | |
| 2010/0030417 A1 | 2/2010 | Fang | |
| 2010/0076959 A1 | 3/2010 | Ramani | |
| 2010/0138281 A1 | 6/2010 | Zhang | |
| 2010/0143089 A1 | 6/2010 | Hvass | |
| 2010/0171826 A1 | 7/2010 | Hamilton | |
| 2010/0176922 A1 | 7/2010 | Schwab | |
| 2010/0211441 A1 | 8/2010 | Sprigg | |

(56) References Cited

U.S. PATENT DOCUMENTS

| | | |
|---|---|---|
| 2010/0222925 A1 | 9/2010 | Anezaki |
| 2010/0268697 A1 | 10/2010 | Karlsson |
| 2010/0295847 A1 | 11/2010 | Titus |
| 2010/0299065 A1 | 11/2010 | Mays |
| 2010/0302102 A1 | 12/2010 | Desai |
| 2010/0324773 A1 | 12/2010 | Choi |
| 2011/0010023 A1 | 1/2011 | Kunzig |
| 2011/0022201 A1 | 1/2011 | Reumerman |
| 2011/0098920 A1 | 4/2011 | Chuang |
| 2011/0153081 A1 | 6/2011 | Romanov |
| 2011/0163160 A1 | 7/2011 | Zini |
| 2011/0176803 A1 | 7/2011 | Song |
| 2011/0225071 A1 | 9/2011 | Sano |
| 2011/0240777 A1 | 10/2011 | Johns |
| 2011/0258060 A1 | 10/2011 | Sweeney |
| 2011/0260865 A1 | 10/2011 | Bergman |
| 2011/0279252 A1 | 11/2011 | Carter |
| 2011/0288684 A1 | 11/2011 | Farlow |
| 2011/0288763 A1 | 11/2011 | Hui |
| 2011/0295424 A1 | 12/2011 | Johnson |
| 2011/0301757 A1 | 12/2011 | Jones |
| 2011/0320034 A1 | 12/2011 | Dearlove |
| 2011/0320322 A1 | 12/2011 | Roslak |
| 2012/0000024 A1 | 1/2012 | Layton |
| 2012/0029697 A1 | 2/2012 | Ota |
| 2012/0035823 A1 | 2/2012 | Carter |
| 2012/0046998 A1 | 2/2012 | Staib |
| 2012/0059743 A1 | 3/2012 | Rao |
| 2012/0072303 A1 | 3/2012 | Brown |
| 2012/0134771 A1 | 5/2012 | Larson |
| 2012/0143726 A1 | 6/2012 | Chirnomas |
| 2012/0192260 A1 | 7/2012 | Kontsevich |
| 2012/0197431 A1 | 8/2012 | Toebes |
| 2012/0226556 A1 | 9/2012 | Itagaki |
| 2012/0239224 A1 | 9/2012 | McCabe |
| 2012/0255810 A1 | 10/2012 | Yang |
| 2012/0259732 A1 | 10/2012 | Sasankan |
| 2012/0272500 A1 | 11/2012 | Reuteler |
| 2012/0294698 A1 | 11/2012 | Villamar |
| 2012/0303263 A1 | 11/2012 | Alam |
| 2012/0303479 A1 | 11/2012 | Derks |
| 2012/0330458 A1 | 12/2012 | Weiss |
| 2013/0016011 A1 | 1/2013 | Harriman |
| 2013/0026224 A1 | 1/2013 | Ganick |
| 2013/0051667 A1 | 2/2013 | Deng |
| 2013/0054052 A1 | 2/2013 | Waltz |
| 2013/0054280 A1 | 2/2013 | Moshfeghi |
| 2013/0060461 A1 | 3/2013 | Wong |
| 2013/0073405 A1 | 3/2013 | Ariyibi |
| 2013/0096735 A1 | 4/2013 | Byford |
| 2013/0103539 A1 | 4/2013 | Abraham |
| 2013/0105036 A1 | 5/2013 | Smith |
| 2013/0110671 A1 | 5/2013 | Gray |
| 2013/0141555 A1 | 6/2013 | Ganick |
| 2013/0145572 A1 | 6/2013 | Schregardus |
| 2013/0151335 A1 | 6/2013 | Avadhanam |
| 2013/0155058 A1 | 6/2013 | Golparvar-Fard |
| 2013/0174371 A1 | 7/2013 | Jones |
| 2013/0181370 A1 | 7/2013 | Rafie |
| 2013/0211953 A1 | 8/2013 | Abraham |
| 2013/0218453 A1 | 8/2013 | Geelen |
| 2013/0235206 A1 | 9/2013 | Smith |
| 2013/0238130 A1 | 9/2013 | Dorschel |
| 2013/0245810 A1 | 9/2013 | Sullivan |
| 2013/0276004 A1 | 10/2013 | Boncyk |
| 2013/0300729 A1 | 11/2013 | Grimaud |
| 2013/0302132 A1 | 11/2013 | DAndrea |
| 2013/0309637 A1 | 11/2013 | Minvielle Eugenio |
| 2013/0317642 A1 | 11/2013 | Asaria |
| 2013/0333961 A1 | 12/2013 | Odonnell |
| 2013/0338825 A1 | 12/2013 | Cantor |
| 2014/0006229 A1* | 1/2014 | Birch ................. G06Q 10/087 705/28 |
| 2014/0014470 A1 | 1/2014 | Razumov |
| 2014/0032034 A1 | 1/2014 | Raptopoulos |
| 2014/0032379 A1 | 1/2014 | Schuetz |
| 2014/0037404 A1 | 2/2014 | Hancock |
| 2014/0046512 A1 | 2/2014 | Villamar |
| 2014/0058556 A1 | 2/2014 | Kawano |
| 2014/0067564 A1 | 3/2014 | Yuan |
| 2014/0081445 A1 | 3/2014 | Villamar |
| 2014/0091013 A1 | 4/2014 | Streufert |
| 2014/0100715 A1 | 4/2014 | Mountz |
| 2014/0100768 A1 | 4/2014 | Kessens |
| 2014/0100769 A1 | 4/2014 | Wurman |
| 2014/0100998 A1 | 4/2014 | Mountz |
| 2014/0100999 A1 | 4/2014 | Mountz |
| 2014/0101690 A1 | 4/2014 | Boncyk |
| 2014/0108087 A1 | 4/2014 | Fukui |
| 2014/0124004 A1 | 5/2014 | Rosenstein |
| 2014/0129054 A1 | 5/2014 | Huntzicker |
| 2014/0133943 A1 | 5/2014 | Razumov |
| 2014/0135984 A1 | 5/2014 | Hirata |
| 2014/0143039 A1 | 5/2014 | Branton |
| 2014/0149958 A1 | 5/2014 | Samadi |
| 2014/0152507 A1 | 6/2014 | McAllister |
| 2014/0156450 A1 | 6/2014 | Ruckart |
| 2014/0156461 A1 | 6/2014 | Lerner |
| 2014/0157156 A1 | 6/2014 | Kawamoto |
| 2014/0164123 A1 | 6/2014 | Wissner-Gross |
| 2014/0172197 A1 | 6/2014 | Ganz |
| 2014/0172727 A1 | 6/2014 | Abhyanker |
| 2014/0177907 A1 | 6/2014 | Argue |
| 2014/0177924 A1 | 6/2014 | Argue |
| 2014/0180478 A1 | 6/2014 | Letsky |
| 2014/0180528 A1 | 6/2014 | Argue |
| 2014/0180865 A1 | 6/2014 | Argue |
| 2014/0180914 A1 | 6/2014 | Abhyanker |
| 2014/0201041 A1 | 7/2014 | Meyer |
| 2014/0207614 A1 | 7/2014 | Ramaswamy |
| 2014/0209514 A1 | 7/2014 | Gitschel |
| 2014/0211988 A1 | 7/2014 | Fan |
| 2014/0214205 A1 | 7/2014 | Kwon |
| 2014/0217242 A1 | 8/2014 | Muren |
| 2014/0228999 A1 | 8/2014 | D'Andrea |
| 2014/0229320 A1 | 8/2014 | Mohammed |
| 2014/0244026 A1 | 8/2014 | Neiser |
| 2014/0244207 A1 | 8/2014 | Hicks |
| 2014/0246257 A1 | 9/2014 | Jacobsen |
| 2014/0247116 A1 | 9/2014 | Davidson |
| 2014/0250613 A1 | 9/2014 | Jones |
| 2014/0254896 A1 | 9/2014 | Zhou |
| 2014/0257928 A1 | 9/2014 | Chen |
| 2014/0266616 A1 | 9/2014 | Jones |
| 2014/0274309 A1 | 9/2014 | Nguyen |
| 2014/0277693 A1 | 9/2014 | Naylor |
| 2014/0277742 A1 | 9/2014 | Wells |
| 2014/0277841 A1 | 9/2014 | Klicpera |
| 2014/0285134 A1 | 9/2014 | Kim |
| 2014/0289009 A1 | 9/2014 | Campbell |
| 2014/0297090 A1 | 10/2014 | Ichinose |
| 2014/0304107 A1 | 10/2014 | McAllister |
| 2014/0306654 A1 | 10/2014 | Partovi |
| 2014/0309809 A1 | 10/2014 | Dixon |
| 2014/0330456 A1 | 11/2014 | LopezMorales |
| 2014/0330677 A1 | 11/2014 | Boncyk |
| 2014/0344011 A1* | 11/2014 | Dogin ................. G06Q 20/12 705/7.29 |
| 2014/0344118 A1 | 11/2014 | Parpia |
| 2014/0350725 A1 | 11/2014 | LaFary |
| 2014/0350851 A1 | 11/2014 | Carter |
| 2014/0350855 A1 | 11/2014 | Vishnuvajhala |
| 2014/0361077 A1 | 12/2014 | Davidson |
| 2014/0369558 A1 | 12/2014 | Holz |
| 2014/0371912 A1 | 12/2014 | Passot |
| 2014/0379588 A1 | 12/2014 | Gates |
| 2015/0006319 A1 | 1/2015 | Thomas |
| 2015/0029339 A1 | 1/2015 | Kobres |
| 2015/0032252 A1 | 1/2015 | Galluzzo |
| 2015/0045992 A1 | 2/2015 | Ashby |
| 2015/0046299 A1 | 2/2015 | Yan |
| 2015/0066283 A1 | 3/2015 | Wurman |
| 2015/0073589 A1 | 3/2015 | Khodl |
| 2015/0098775 A1 | 4/2015 | Razumov |

(56) References Cited

U.S. PATENT DOCUMENTS

| | | |
|---|---|---|
| 2015/0100439 A1 | 4/2015 | Lu |
| 2015/0100461 A1 | 4/2015 | Baryakar |
| 2015/0112826 A1 | 4/2015 | Crutchfield |
| 2015/0120094 A1 | 4/2015 | Kimchi |
| 2015/0123973 A1 | 5/2015 | Larsen |
| 2015/0142249 A1 | 5/2015 | Ooga |
| 2015/0203140 A1 | 7/2015 | Holtan |
| 2015/0205298 A1 | 7/2015 | Stoschek |
| 2015/0205300 A1 | 7/2015 | Caver |
| 2015/0217449 A1 | 8/2015 | Meier |
| 2015/0217790 A1 | 8/2015 | Golden |
| 2015/0221854 A1 | 8/2015 | Melz |
| 2015/0228004 A1 | 8/2015 | Bednarek |
| 2015/0229906 A1 | 8/2015 | De Matos |
| 2015/0231873 A1 | 8/2015 | Okamoto |
| 2015/0277440 A1 | 10/2015 | Kimchi |
| 2015/0278889 A1 | 10/2015 | Qian |
| 2015/0325128 A1 | 11/2015 | Lord |
| 2015/0336668 A1 | 11/2015 | Pasko |
| 2015/0360865 A1 | 12/2015 | Massey |
| 2016/0016731 A1 | 1/2016 | Razumov |
| 2016/0023675 A1 | 1/2016 | Hannah |
| 2016/0052139 A1 | 2/2016 | Hyde |
| 2016/0101794 A1 | 4/2016 | Fowler |
| 2016/0101936 A1 | 4/2016 | Chamberlin |
| 2016/0101940 A1 | 4/2016 | Grinnell |
| 2016/0110701 A1 | 4/2016 | Herring |
| 2016/0114488 A1* | 4/2016 | Mascorro Medina ........... B25J 9/1697 700/259 |
| 2016/0167557 A1 | 6/2016 | Mecklinger |
| 2016/0167577 A1 | 6/2016 | Simmons |
| 2016/0176638 A1 | 6/2016 | Toebes |
| 2016/0196755 A1 | 7/2016 | Navot |
| 2016/0207193 A1 | 7/2016 | Wise |
| 2016/0210602 A1 | 7/2016 | Siddique |
| 2016/0236867 A1 | 8/2016 | Brazeau |
| 2016/0255969 A1 | 9/2016 | High |
| 2016/0257212 A1 | 9/2016 | Thompson |
| 2016/0257240 A1 | 9/2016 | High |
| 2016/0257401 A1 | 9/2016 | Buchmueller |
| 2016/0258762 A1 | 9/2016 | Taylor |
| 2016/0258763 A1 | 9/2016 | High |
| 2016/0259028 A1 | 9/2016 | High |
| 2016/0259329 A1 | 9/2016 | High |
| 2016/0259331 A1 | 9/2016 | Thompson |
| 2016/0259339 A1 | 9/2016 | High |
| 2016/0259340 A1 | 9/2016 | Kay |
| 2016/0259341 A1 | 9/2016 | High |
| 2016/0259342 A1 | 9/2016 | High |
| 2016/0259343 A1 | 9/2016 | High |
| 2016/0259344 A1 | 9/2016 | High |
| 2016/0259345 A1 | 9/2016 | McHale |
| 2016/0259346 A1 | 9/2016 | High |
| 2016/0260049 A1 | 9/2016 | High |
| 2016/0260054 A1 | 9/2016 | High |
| 2016/0260055 A1 | 9/2016 | High |
| 2016/0260142 A1 | 9/2016 | Winkle |
| 2016/0260145 A1 | 9/2016 | High |
| 2016/0260148 A1 | 9/2016 | High |
| 2016/0260158 A1 | 9/2016 | High |
| 2016/0260159 A1 | 9/2016 | Atchley |
| 2016/0260161 A1 | 9/2016 | Atchley |
| 2016/0261698 A1 | 9/2016 | Thompson |
| 2016/0274586 A1 | 9/2016 | Stubbs |
| 2016/0288601 A1 | 10/2016 | Gehrke |
| 2016/0300291 A1 | 10/2016 | Carmeli |
| 2016/0301698 A1 | 10/2016 | Katara |
| 2016/0325932 A1 | 11/2016 | Hognaland |
| 2016/0349754 A1 | 12/2016 | Mohr |
| 2016/0355337 A1 | 12/2016 | Lert |
| 2016/0364785 A1 | 12/2016 | Wankhede |
| 2016/0364786 A1 | 12/2016 | Wankhede |
| 2017/0009417 A1 | 1/2017 | High |
| 2017/0010608 A1 | 1/2017 | High |
| 2017/0010609 A1 | 1/2017 | High |
| 2017/0010610 A1 | 1/2017 | Atchley |
| 2017/0020354 A1 | 1/2017 | High |
| 2017/0024806 A1 | 1/2017 | High |
| 2017/0080846 A1 | 3/2017 | Lord |
| 2017/0107055 A1 | 4/2017 | Magens |
| 2017/0110017 A1 | 4/2017 | Kimchi |
| 2017/0120443 A1 | 5/2017 | Kang |
| 2017/0129602 A1 | 5/2017 | Alduaiji |
| 2017/0137235 A1 | 5/2017 | Thompson |
| 2017/0148075 A1 | 5/2017 | High |
| 2017/0158430 A1 | 6/2017 | Raizer |
| 2017/0166399 A1 | 6/2017 | Stubbs |
| 2017/0176986 A1 | 6/2017 | High |
| 2017/0178066 A1 | 6/2017 | High |
| 2017/0178082 A1 | 6/2017 | High |
| 2017/0183159 A1 | 6/2017 | Weiss |
| 2017/0283171 A1 | 10/2017 | High |
| 2017/0355081 A1 | 12/2017 | Fisher |
| 2018/0020896 A1 | 1/2018 | High |
| 2018/0068357 A1 | 3/2018 | High |
| 2018/0075403 A1* | 3/2018 | Mascorro Medina ........... G06Q 30/016 |
| 2018/0099846 A1 | 4/2018 | High |
| 2018/0170729 A1 | 6/2018 | High |
| 2018/0170730 A1 | 6/2018 | High |

FOREIGN PATENT DOCUMENTS

| | | |
|---|---|---|
| CN | 100999277 | 7/2007 |
| CN | 102079433 | 6/2011 |
| CN | 202847767 | 4/2013 |
| CN | 103136923 | 5/2013 |
| CN | 103213115 | 7/2013 |
| CN | 203166399 | 8/2013 |
| CN | 203191819 | 9/2013 |
| CN | 203401274 | 1/2014 |
| CN | 203402565 | 1/2014 |
| CN | 103625808 | 3/2014 |
| CN | 203468521 | 3/2014 |
| CN | 103696393 | 4/2014 |
| CN | 103723403 | 4/2014 |
| CN | 203512491 | 4/2014 |
| CN | 103770117 | 5/2014 |
| CN | 203782622 | 8/2014 |
| CN | 104102188 | 10/2014 |
| CN | 104102219 | 10/2014 |
| CN | 102393739 | 12/2014 |
| CN | 204054062 | 12/2014 |
| CN | 204309852 | 12/2014 |
| CN | 204331404 | 5/2015 |
| CN | 105460051 | 4/2016 |
| DE | 102013013438 | 2/2015 |
| EP | 861415 | 5/1997 |
| EP | 1136052 | 9/2001 |
| EP | 0887491 | 4/2004 |
| EP | 1439039 | 7/2004 |
| EP | 1447726 | 8/2004 |
| EP | 2148169 | 1/2010 |
| EP | 2106886 | 3/2011 |
| EP | 2309487 | 4/2011 |
| EP | 2050544 | 8/2011 |
| EP | 2498158 | 9/2012 |
| EP | 2571660 | 3/2013 |
| EP | 2590041 | 5/2013 |
| EP | 2608163 | 6/2013 |
| EP | 2662831 | 11/2013 |
| EP | 2730377 | 5/2014 |
| EP | 2886020 | 6/2015 |
| FR | 2710330 | 3/1995 |
| GB | 1382806 | 2/1971 |
| GB | 2530626 | 3/2016 |
| GB | 2542472 | 3/2017 |
| GB | 2542905 | 5/2017 |
| JP | 62247458 | 10/1987 |
| JP | H10129996 | 5/1998 |
| JP | 2003288396 | 10/2003 |
| JP | 2005350222 | 12/2005 |
| JP | 2009284944 | 12/2009 |

(56) References Cited

FOREIGN PATENT DOCUMENTS

| | | |
|---|---|---|
| JP | 2010105644 | 5/2010 |
| JP | 2010231470 | 10/2010 |
| KR | 20120100505 A | 9/2012 |
| WO | 8503277 A | 8/1985 |
| WO | 9603305 | 7/1995 |
| WO | 1997018523 | 5/1997 |
| WO | 9855903 | 12/1998 |
| WO | 2000061438 | 10/2000 |
| WO | 0132366 | 5/2001 |
| WO | 2004092858 | 10/2004 |
| WO | 2005102875 | 11/2005 |
| WO | 2006056614 | 6/2006 |
| WO | 2006120636 | 11/2006 |
| WO | 2006137072 | 12/2006 |
| WO | 2007007354 | 1/2007 |
| WO | 2007047514 | 4/2007 |
| WO | 2007149196 | 12/2007 |
| WO | 2008118906 | 10/2008 |
| WO | 2008144638 | 11/2008 |
| WO | 2008151345 | 12/2008 |
| WO | 2009022859 | 2/2009 |
| WO | 2009027835 | 3/2009 |
| WO | 2009103008 | 8/2009 |
| WO | 2011063527 | 6/2011 |
| WO | 2012075196 | 6/2012 |
| WO | 2013138193 | 9/2013 |
| WO | 2013138333 | 9/2013 |
| WO | 2013176762 | 11/2013 |
| WO | 2014022366 | 2/2014 |
| WO | 2014022496 | 2/2014 |
| WO | 2014045225 | 3/2014 |
| WO | 2014046757 | 3/2014 |
| WO | 2014101714 | 7/2014 |
| WO | 2014116947 | 7/2014 |
| WO | 2014138472 | 9/2014 |
| WO | 2014165286 | 10/2014 |
| WO | 2015021958 | 2/2015 |
| WO | 2015104263 | 7/2015 |
| WO | 2015155556 | 10/2015 |
| WO | 2016009423 | 1/2016 |
| WO | 2016015000 | 1/2016 |
| WO | 2016144765 | 9/2016 |

OTHER PUBLICATIONS

Daily Mail; "Dancing with your phone: The gyrating robotic dock that can move along with your music", Sep. 12, 2012, http://www.dailymail.co.uk/sciencetech/article-2202164/The-intelligent-dancing-robot-controlled-mobile-phone.html, pp. 1-23.
Follow Inspiration; "wiiGO"; https://www.youtube.com/watch?v=dhHXIdpknC4; published on Jun. 16, 2015; pp. 1-7.
Messieh, Nancy; "Humanoid robots will be roaming Abu Dhabi's malls next year", The Next Web, Oct. 17, 2011, https://thenextweb.com/me/2011/10/17/humanoid-robots-will-be-roaming-abu-dhabis-malls-next-year/, pp. 1-6.
Owano, Nancy; "HEARBO robot can tell beeps, notes, and spoken word (w/ Video)", Phys.org, Nov. 21, 2012, https://phys.org/news/2012-11-hearbo-robot-beeps-spoken-word.html, pp. 1-4.
Sales, Jorge, et al.; "CompaRob: The Shopping Cart Assistance Robot", International Journal of Distributed Sensor Networks, vol. 2016, Article ID 4781280, Jan. 3, 2016, http://dx.doi.org/10.1155/2016/4781280, pp. 1-16.
Technion; "Autonomous Tracking Shopping Cart—Shopping Made Easy from Technion"; https://www.youtube.com/watch?v=pQcb9fofmXg; published on Nov. 23, 2014; pp. 1-10.
Garun, Natt; "Hop the hands-free suitcase follows you around like an obedient pet"; https://www.digitaltrends.com/cool-tech/hop-the-hands-free-suitcase-follows-you-around-like-an-obedient-pet/; Oct. 10, 2012; pp. 1-6.
Kohtsuka, T. et al.; "Design of a Control System for Robot Shopping Carts"; KES'11 Proceedings of the 15th International Conference on Knowledge-Based and Intelligent Information and Engineering Systems; Sep 12-14, 2011; pp. 280-288.
Nishimura, S. et al.; "Development of Attachable Modules for Robotizing Daily Items: Person Following Shopping Cart Robot"; Proceedings of the 2007 IEEE International Conference on Robotics and Biomimetics (Sanya, China); Dec. 15-18, 2007; pp. 1506-1511.
Onozato, Taishi et al.; "A Control System for the Robot Shopping Cart"; 2010 IRAST International Congress on Computer Applications and Computational Science (CACS 2010); 2010; pp. 907-910.
Scholz, J. et al.; "Cart Pushing with a Mobile Manipulation System: Towards Navigation with Moveable Objects"; Proceedings of the 2011 IEEE International Conference on Robotics and Automation (Shanghai, China); May 9-13, 2011; pp. 6115-6120.
SK Telecom Co.; "SK Telecom Launches Smart Cart Pilot Test in Korea"; http://www.sktelecom.com/en/press/press_detail.do?idx=971; Oct. 4, 2011; pp. 1-2.
Bohren; Jonathan et al.; "Towards Autonomous Robotic Butlers: Lessons Learned with the PR2", Willow Garage, May 9, 2011, pp. 1-8.
Denso; "X-mobility", Oct. 10, 2014, pp. 1-2, including machine translation.
Fellow Robots; "Meet OSHBOT", http://fellowrobots.com/oshbot/, May 19, 2015, pp. 1-3.
Green, A., et al; "Report on evaluation of the robot trolley", CommRob IST-045441, Advanced Behaviour and High-Level Multimodal Communications with and among Robots, Jun. 14, 2010, pp. 10-67.
Koubaa, Anis; "A Service-Oriented Architecture for Virtualizing Robots in Robot-as-a-Service Clouds", 2014, pp. 1-13.
Kumar Paradkar, Prashant; "Voice Controlled Robotic Project using interfacing of Ardruino and Bluetooth HC-05", Robotics_Projects_C/C++_Android, Jan. 23, 2016, pp. 1-14.
Meena, M., & Thilagavathi, P.; "Automatic Docking System with Recharging and Battery Replacement for Surveillance Robot", International Journal of Electronics and Computer Science Engineering, 2012, pp. 1148-1154.
Sebaali, G., et al.; "Smart Shopping Cart", Department of Electrical and Computer Engineering, American University of Beirut, 2014, pp. 1-6.
Shukla, Neha; "SaviOne the Butler Bot: Service Robot for Hospitality Industry", TechieTonics, http://www.techietonics.com/robotonics/savione-the-butler-bot-service-for-hospitality-industry.html, Aug. 14, 2014, pp. 1-5.
Swisslog; "RoboCourier Autonomous Mobile Robot", http://www.swisslog.com/en/Products/HCS/Automated-Material-Transport/RoboCourier-Autonomous-Mobile-Robot, printed May 27, 2015, pp. 1.
Vasilescu, Iuliu, et al.; "Autonomous Modular Optical Underwater Robot (AMOUR) Design, Prototype and Feasibility Study", Apr. 18, 2005, pp. 1-7.
Wikipedia; "Leeds Kirkgate Market"; https://en.wikipedia.org/wiki/Leeds_Kirkgate_Market; Retrieved on Apr. 5, 2017; 8 pages.
Abbrobotics; "ABB Robotics—Innovative Packaging Solutions", https://www.youtube.com/watch?v=e5jif-IUvHY, published on May 16, 2013, pp. 1-5.
Ang, Fitzwatler, et al.; "Automated Waste Sorter With Mobile Robot Delivery Waste System", De La Salle University Research Congress 2013, Mar. 7-9, 2013, pp. 1-7.
Ansari, Sameer, et al.; "Automated Trash Collection & Removal in Office Cubicle Environments", Squad Collaborative Robots, Sep. 27, 2013, pp. 1-23.
Armstrong, Jean, et al.; "Visible Light Positioning: A Roadmap for International Standardization", IEEE Communications Magazine, Dec. 2013, pp. 2-7.
Artal, J.S., et al.; "Autonomous Mobile Robot with Hybrid PEM Fuel-Cell and Ultracapacitors Energy System, Dedalo 2.0", International Conference on Renewable Energies and Power Quality, Santiago de Compostela, Spain, Mar. 28-30, 2012, pp. 1-6.
Atherton, Kelsey D.; "New GPS Receiver Offers Navigation Accurate to an Inch", Popular Science, www.popsci.com/technology/article/2013-08/global-positioning-down-inches, Aug. 16, 2013, pp. 1-2.

(56) References Cited

OTHER PUBLICATIONS

Avezbadalov, Ariel, et al.; "Snow Shoveling Robot", engineering.nyu.edu/mechatronics/projects/ME3484/2006/Snow Shoveling Robot/Mechatronics Snow Robot Presentation Update 12-19-06.pdf, 2006, pp. 1-24.
Bares, John, et al.; "Designing Crash-Survivable Unmanned Vehicles", AUVSI Symposium, Jul. 10, 2002, pp. 1-15.
Bohren; Jonathan et al.; "Towards Autonomous Robotic Butlers: Lessons Learned with the PR2", Willow Garage, pp. 1-8.
Bouchard, Samuel; "A Robot to Clean Your Trash Bin!", Robotiq, http://blog.robotiq.com/bid/41203/A-Robot-to-Clean-your-Trash-Bin, Aug. 22, 2011, pp. 1-7.
Burns, Tom; "irobot roomba 780 review best robot vacuum floor cleaning robot review video demo", https://www.youtube.com/watch?v=MkwtlyVAaEY, published on Feb. 13, 2013, pp. 1-10.
Bytelight; "Scalable Indoor Location", http://www.bytelight.com/, Dec. 12, 2014, pp. 1-2.
Canadian Manufacturing; "Amazon unleashes army of order-picking robots", http://www.canadianmanufacturing.com/supply-chain/amazon-unleashes-army-order-picking-robots-142902/, Dec. 2, 2014, pp. 1-4.
Capel, Claudine; "Waste sorting—a look at the separation and sorting techniques in today's European market", Waste Management World, http://waste-management-world.com/a/waste-sorting-a-look-at-the-separation-and-sorting-techniques-in-todayrsquos-european-market, Jul. 1, 2008, pp. 1-8.
Carnegie Mellon Univeristy; "AndyVision—The Future of Retail", https://www.youtube.com/watch?v=n5309ILTV2s, published on Jul. 16, 2012, pp. 1-9.
Carnegie Mellon University; "Robots in Retail", www.cmu.edu/homepage/computing/2012/summer/robots-in-retail.shmtl, 2012, pp. 1.
Chopade, Jayesh, et al.; "Control of Spy Robot by Voice and Computer Commands", International Journal of Advanced Research in Computer and Communication Engineering, vol. 2, Issue 4, Apr. 2013, pp. 1-3.
CNET; "iRobot Braava 380t—No standing ovation for this robotic floor mop", https://www.youtube.com/watch?v=JAtC1xFtC6Q, published on May 7, 2014, pp. 1-6.
Coltin, Brian & Ventura, Rodrigo; "Dynamic User Task Scheduling for Mobile Robots", Association for the Advancement of Artificial Intelligence, 2011, pp. 1-6.
Couceiro, Micael S., et al.; "Marsupial teams of robots: deployment of miniature robots for swarm exploration under communication constraints", Robotica, Cambridge University Press, downloaded Jan. 14, 2014, pp. 1-22.
Coxworth, Ben; "Robot designed to sort trash for recycling", Gizmag, http://www.gizmag.com/robot-sorts-trash-for-recycling/18426/, Apr. 18, 2011, pp. 1-7.
Davis, Jo; "The Future of Retail: In Store Now", Online Brands, http://onlinebrands.co.nz/587/future-retail-store-now/, Nov. 16, 2014, pp. 1-5.
DENSO; "X-mobility", pp. 1.
DHL; "Self-Driving Vehicles in Logistics: A DH: perspective on implications and use cases for the logistics industry", 2014, pp. 1-39.
Dorrier, Jason; "Service Robots Will Now Assist Customers at Lowe's Store", SingularityHUB, http://singularityhub.com/2014/10/29/service-robots-will-now-assist-customers-at-lowes-store/, Oct. 29, 2014, pp. 1-4.
Dronewatch; "Weatherproof Drone XAircraft Has 'Black Box'", DroneWatch, http://www.dronewatch.nl/2015/02/13/weatherproof-drone-van-xaircraft-beschikt-over-zwarte-doos/, Feb. 13, 2015, pp. 1-5.
Dyson US; "See the new Dyson 360 Eye robot vacuum cleaner in action #DysonRobot", https://www.youtube.com/watch?v=OadhulCDAjk, published on Sep. 4, 2014, pp. 1-7.
Edwards, Lin; "Supermarket robot to help the elderly (w/Video)", Phys.Org, http://phys.org/news/2009-12-supermarket-robot-elderly-video.html, Dec. 17, 2009, pp. 1-5.
Elfes, Alberto; "Using Occupancy Grids for Mobile Robot Perception and Navigation", IEEE, 1989, pp. 46-57.
Elkins, Herschel T.; "Important 2014 New Consumer Laws", County of Los Angeles Department of Consumer Affairs Community Outreach & Education, updated Jan. 6, 2014, pp. 1-46.
Falconer, Jason; "HOSPI-R drug delivery robot frees nurses to do more important work", Gizmag, http://www.gizmag.com/panasonic-hospi-r-delivery-robot/29565/, Oct. 28, 2013, pp. 1-6.
Falconer, Jason; "Toyota unveils helpful Human Support Robot", Gizmag, http:/www.gizmag.com/toyota-human-support-robot/24246/, Sep. 22, 2012, pp. 1-6.
Farivar, Cyrus; "This in-store robot can show you the hammer aisle, but not the bathroom", Ars Technica, http://arstechnica.com/business/2014/12/this-in-store-robot-can-show-you-the-hammer-aisle-but-not-the-bathroom/, Dec. 3, 2014, pp. 1-4.
Fellow Robots; "Meet OSHBOT", http://fellowrobots.com/oshbot/, pp. 1-3.
Fellowrobots; "Oshbot Progress—Fellow Robots", https://vimeo.com/139532370, published Sep. 16, 2015, pp. 1-5.
Fora.TV; "A Day in the Life of a Kiva Robot", https://www.youtube.com/watch?v=6KRjuuEVEZs, published on May 11, 2011, pp. 1-11.
GAMMA2VIDEO; "FridayBeerBot.wmv", https://www.youtube.com/watch?v=KXXIIDYatxQ, published on Apr. 27, 2010, pp. 1-7.
Glas, Dylan F., et al.; "The Network Robot System: Enabling Social Human-Robot Interaction in Public Spaces", Journal of Human-Robot Interaction, vol. 1, No. 2, 2012, pp. 5-32.
Green, A., et al; "Report on evaluation of the robot trolley", CommRob IST-045441, Advanced Behaviour and High-Level Multimodal Communications with and among Robots, pp. 10-67.
Gross, H.-M., et al.; TOOMAS: Interactive Shopping Guide Robots in Everyday Use—Final Implementation and Experiences from Long-term Field Trials, Proc. IEEE/RJS Intern. Conf. on Intelligent Robots and Systems (IROS'09), St. Louis, USA, pp. 2005-2012.
Habib, Maki K., "Real Time Mapping and Dynamic Navigation for Mobile Robots", International Journal of Advanced Robotic Systems, vol. 4, No. 3, 2007, pp. 323-338.
HRJ3 Productions; "Japanese Automatic Golf Cart", https://www.youtube.com/watch?v=8diWYtqb6CO, published on Mar. 29, 2014, pp. 1-4.
Huang, Edward Y.C.; "A Semi-Autonomous Vision-Based Navigation System for a Mobile Robotic Vehicle", Thesis submitted to the Massachusetts Institute of Technology Department of Electrical Engineering and Computer Science on May 21, 2003, pp. 1-76.
IEEE Spectrum; "Warehouse Robots at Work", https://www.youtube.com/watch?v=IWsMdN7HMuA, published on Jul. 21, 2008, pp. 1-11.
Intelligent Autonomous Systems; "TUM James goes shopping", https://www.youtube.com/watch?v=JS2zycc4AUE, published on May 23, 2011, pp. 1-13.
Katic, M., Dusko; "Cooperative Multi Robot Systems for Contemporary Shopping Malls", Robotics Laboratory, Mihailo Pupin Institute, University of Belgrade, Dec. 30, 2010, pp. 10-17.
Kehoe, Ben, et al.; "Cloud-Based Robot Grasping with the Google Object Recognition Engine", 2013, pp. 1-7.
Kendricks, Cooper; "Trash Disposal Robot", https://prezi.com31acae05zf8i/trash-disposal-robot/, Jan. 9, 2015, pp. 1-7.
Kibria, Shafkat; "Speech Recognition for Robotic Control", Master's Thesis in Computing Science, Umea University, Dec. 18, 2005, pp. 1-77.
King, Rachael; "Newest Workers for Lowe's: Robots", The Wall Street Journal, http:/www.wsj.com/articles/newest-workers-for-lowes-robots-1414468866, Oct. 28, 2014, pp. 1-4.
Kitamura, Shunichi; "Super Golf Cart with Remote drive and NAVI system in Japan", https://www.youtube.com/watch?v=2_3-dUR12F8, published on Oct. 4, 2009, pp. 1-6.
Kiva Systems; "Automated Goods-to-Man Order Picking System—Kiva Systems", http://www.kivasystems.com/solutions/picking/, printed on Apr. 2, 2015, pp. 1-2.
Kiva Systems; "Frequently Asked Questions about Kiva Systems—Kiva Systems", http://kivasystems.com/about-us-the-kiva-approach/faq/, printed on Apr. 2, 2015, pp. 1-2.

(56) References Cited

OTHER PUBLICATIONS

Kiva Systems; "how a Kiva system makes use of the vertical space—Kiva Systems", http://www.kivasystems.com/solutions/vertical-storage/, printed on Apr. 2, 2015, pp. 1-2.

Kiva Systems; "How Kiva Systems and Warehouse Management Systems Interact", 2010, pp. 1-12.

Kiva Systems; "Kiva's warehouse automation system is the most powerful and flexible a . . . ", http://www.kivasystems.com/solutions/, printed on Apr. 2, 2015, pp. 1-2.

Kiva Systems; "Kiva replenishment is more productive and accurate than replenishing pick faces in traditional distribution operations", http//www.kivasystems.com/solutions/replenishment/, printed on Apr. 2, 2015, pp. 1-2.

Kiva Systems; "Kiva warehouse control software, Kiva WCS—Kiva Systems", http://www.kivasystems.com/solutions/software/, printed on Apr. 2, 2015, pp. 1-2.

Kiva Systems; "Shipping Sortation—Kiva Systems", http://www.kivasystems.com/solutions/shipping-sortation/, printed on Apr. 2, 2015, pp. 1-2.

Kohtsuka, Takafumi, et al.; "Design of a Control System for Robot Shopping Carts", Knowledge-Based and Intelligent Information and Engineering Systems, 15th International Conference, KES 2011, Kaiserslautern, Germany, Sep. 12-14, 2011, pp. 280-288.

Koubaa, Anis; "A Service-Oriented Architecture for Virtualizing Robots in Robot-as-a-Service Clouds", pp. 1-13.

Kumar, Swagat; "Robotics-as-a-Service: Transforming the Future of Retail", Tata Consultancy Services, http://www.tcs.com/resources/white_papers/Pages/Robotics-as-a-Service.aspx, printed on May 13, 2015, pp. 1-4.

Kumar Paradkar, Prashant; "Voice Controlled Robotic Project using interfacing of Andruino and Bluetooth HC-05", Robotics Projects C/C++_Android.

Lejepekov, Fedor; "Yuki-taro. Snow recycle robot.", https://www.youtube.com/watch?v=g12j9PY4jGY, published on Jan. 17, 2011, pp. 1-4.

Liu, Xiaohan, et al.; "Design of an Indoor Self-Positioning System for the Visually Impaired—Simulation with RFID and Bluetooth in a Visible Light Communication System", Proceedings of the 29th Annual International Conference of the IEEE EMBS, Cite Internationale, Lyon, France, Aug. 23-26, 2007, pp. 1655-1658.

Lowe's Home Improvement; "OSHbots from Lowe's Innovation Labs", https://www.youtube.com/watch?v=W-RKAjP1dtA, published on Dec. 15, 2014, pp. 1-8.

Lowe's Innovation Labs; "Autonomous Retail Service Robots", http://www.lowesinnovationlabs.com/innovation-robots/, printed on Feb. 26, 2015, pp. 1-4.

Matos, Luis; "wi-GO—The autonomous and self-driven shopping cart"; https://www.indiegogo.com/projects/wi-go-the-autonomous-and-self-driven-shopping-cart; printed on Feb. 27, 2015, pp. 1-16.

Meena, M., & Thilagavahi, P.; "Automatic Docking System with Recharging and Battery Replacement for Surveillance Robot", International Journal of Electronics and Computer Science Engineering, pp. 1148-1154.

Murph, Darren; "B.O.S.S. shopping cart follows you around", Engadget, http://www.engadget.com/2006/08/11/b-o-s-s-shopping-cart-follows-you-around/, Aug. 11, 2006, pp. 1-4.

Nakajima, Madoka & Haruyama, Shinichiro; "New indoor navigation system for visually impaired people using visible light communication", EURASIP Journal on Wireless Communications and Networking, 2013, pp. 1-10.

Neurobtv; "Shopping Robot TOOMAS 2009", https://www.youtube.com/watch?v=49Pkm30qmQU, published on May 8, 2010, pp. 1-7.

Nickerson, S.B., et al.; "An autonomous mobile robot for known industrial environments", Autonomous Robot for a Known environment, Aug. 28, 1997, pp. 1-28.

O'Donnell, Jake; "Meet the Bluetooth-Connected Self-Following Robo-Caddy of the Future", Sportsgrid; http://www.sportsgrid.com/uncategorized/meet-the-bluetooth-connected-self-following-robo-caddy-of-the-future/, Apr. 22, 2014, pp. 1-5.

Ogawa, Keisuke; "Denso Demos In-wheel Motor System for Baby Carriages, Shopping Carts", Nikkei Technology, http://techon.nikkeiibp.co.jp/english/NEWS_EN/20141010/381880/?ST=english_PRINT, Oct. 10, 2014, pp. 1-2.

Orchard Supply Hardware; "Orchard Supply Hardware's OSHbot", https://www.youtube.com/watch?v=Sp9176vm7Co, published on Oct. 28, 2014, pp. 1-9.

Osborne, Charlie; "Smart Cart Follows You When Grocery Shopping", Smartplanet, http://www.smartplanet.com/blog/smart-takes/smart-cart-follows-you-when-grocery-shopping/, Feb. 29, 2012, pp. 1-4.

Poudel, Dev Bahadur; "Coordinating Hundreds of Cooperative, Autonomous Robots in a Warehouse", Jan. 27, 2013, pp. 1-13.

Robotlab Inc.; "NAO robot drives autonomously it's own car", https://www.youtube.com/watch?v=o13HYwYlo1UE, published on Sep. 8, 2014, pp. 1-6.

Rodriguez, Ashley; "Meet Lowe's Newest Sales Associate—OSHbot, the Robot", Advertising Age, http://adage.com/article/cmo-strategy/meet-lowe-s-newest-sales-associate-oshbot-robot/295591/, Oct. 28, 2014, pp. 1-8.

Sebaali, G., et al.; "Smart Shopping Cart", Department of Electrical and Computer Engineering, American University of Beirut, pp. 1-6.

Shukla, Neha; "SaviOne the Butler Bot: Service Robot for Hospitality Industry", TechieTonics, http://www.techietonics.com/robo-tonics/savione-the-butler-bot-service-for-hospitality-industry.html, pp. 1-5.

Song, Guangming, et al.; "Automatic Docking System for Recharging Home Surveillance Robots", http://www.academia.edu/6495007/Automatic_Docking_System_for_Recharging_Home_Surveillance_Robots, IEEE Transactions on Consumer Electronics, vol. 57, No. 2, May 2011, pp. 1-8.

Soper, Taylor; "Amazon vet's new robot-powered apparel startup aims to revolutionize how we buy clothes", GeekWire, http://www.geekwire.com/2012/hointer-robot-jeans-clothing-apparel-store-startup/, Nov. 29, 2012, pp. 1-12.

Stewart Golf; "Introducing the New Stewart Golf X9 Follow", https://www.youtube.com/watch?v=HHivFGtiuE, published on Apr. 9, 2014, pp. 1-9.

Sun, Eric; ""Smart Bin & Trash Route" system—RMIT 2012 Green Inventors Competition", http://www.youtube.com/watch?v=OrTA57a100k, published on Nov. 14, 2012, pp. 1-8.

Superdroid Robots; "Cool Robots, Making Life Easier", http://www.superdroidrobots.com/shop/custom.aspx/cool-robots-making-life-easier/83/, printed on Jun. 16, 2015, pp. 1-7.

Swisslog; "RoboCourier Autonomous Mobile Robot", http://www.swisslog.com/en/Products/HCS/Automated-Material-Transport/RoboCourier-Autonomous-Mobile-Robot, pp. 1.

Tam, Donna; "Meet Amazon's busiest employee—the Kiva robot", CNET, http://www.cnet.com/news/meet-amazons-busiest-employee-the-kiva-robot/, Nov. 30, 2014, pp. 1-6.

Universal Robotics; "Neocortex Enables Random Part Handling and Automated Assembly", http://www.universalrobotics.com/random-bin-picking, printed on Dec. 22, 2015, pp. 1-3.

Uphigh Productions; "Behold the Future (E017 Robot Sales Assistant)", https://www.youtube.com/watch?v=8WbvjaPm7d4, published on Nov. 19, 2014, pp. 1-7.

Urankar, Sandeep, et al.; "Robo-Sloth: A Rope-Climbing Robot", Department of Mechanical Engineering, Indian Institute of Technology, 2003, pp. 1-10.

Vasilescu, Iuliu, et al.; "Autonomous Modular Optical Underwater Robot (AMOUR) Design, Prototype and Feasibility Study", pp. 1-7.

Vmecavacuumtech; "VMECA Magic Suction Cup with ABB robot for pick and place (packaging application)", https://www.youtube.com/watch?v=5btR9MLtGJA, published on Sep. 14, 2014, pp. 1-4.

Wang, Xuan; "2D Mapping Solutions for Low Cost Mobile Robot", Master's Thesis in Computer Science, Royal Institute of Technology, KTH CSC, Stockholm, Sweden, 2013, pp. 1-60.

Webb, Mick; "Robovie II—the personal robotic shopping", Gizmag, http://www.gizmag.com/robovie-ii-robotic-shopping-assistance/13664/, Dec. 23, 2009, pp. 1-5.

(56) References Cited

OTHER PUBLICATIONS

Weise, Elizabeth; "15,000 robots usher in Amazon's Cyber Monday", USATODAY, http://www.usatoday.com/story/tech/2014/12/01/robots-amazon.kiva-fulfillment-centers-cyber-monday/19725229/, Dec. 2, 2014, pp. 1-3.
Weiss, C.C.; "Multifunctional hybrid robot shovels snow and mows your lawn", Gizmag, http://www.gizmag.com/snowbyte-snow-shoveling-robot/32961/, Jul. 21, 2014, pp. 1-7.
Wikipedia; "Kiva Systems", http://en.wikipedia.org/wiki/Kiva_Systems, printed on Apr. 2, 2015, pp. 1-3.
Wired; "High-Speed Robots Part 1: Meet BettyBot in "Human Exclusion Zone" Warehouses-The Window-WIRED", https://www.youtube.com/watch?v=8gy5tYVR-28, published on Jul. 2, 2013, pp. 1-6.
Wulf, O., et al.; "Colored 2D maps for robot navigation with 3D sensor data," Institute for Systems Engineering, University of Hannover, Hannover, Germany, 2014, pp. 1-6.
YRF; "The Diamond Robbery—Scene Dhoom:2 Hrithik Roshan", https://www.youtube.com/watch?v=3bMYgo_SOKc, published on Jul. 12, 2012, pp. 1-7.

\* cited by examiner

APPARATUS AND METHOD OF MONITORING PRODUCT PLACEMENT WITHIN A SHOPPING FACILITY

RELATED APPLICATION

This application claims the benefit of each of the following U.S. Provisional applications, each of which is incorporated herein by reference in its entirety: U.S. Provisional Application No. 62/129,726, filed Mar. 6, 2015; U.S. Provisional Application No. 62/129,727, filed Mar. 6, 2015; U.S. Provisional Application No. 62/138,877, filed Mar. 26, 2015; U.S. Provisional Application No. 62/138,885, filed Mar. 26, 2015; U.S. Provisional Application No. 62/152,421, filed Apr. 24, 2015; U.S. Provisional Application No. 62/152,465, filed Apr. 24, 2015; U.S. Provisional Application No. 62/152,440, filed Apr. 24, 2015; U.S. Provisional Application No. 62/152,630, filed Apr. 24, 2015; U.S. Provisional Application No. 62/152,711, filed Apr. 24, 2015; U.S. Provisional Application No. 62/152,610, filed Apr. 24, 2015; U.S. Provisional Application No. 62/152,667, filed Apr. 24, 2015; U.S. Provisional Application No. 62/157,388, filed May 5, 2015; U.S. Provisional Application No. 62/165,579, filed May 22, 2015; U.S. Provisional Application No. 62/165,416, filed May 22, 2015; U.S. Provisional Application No. 62/165,586, filed May 22, 2015; U.S. Provisional Application No. 62/171,822, filed Jun. 5, 2015; U.S. Provisional Application No. 62/175,182, filed Jun. 12, 2015; U.S. Provisional Application No. 62/182,339, filed Jun. 19, 2015; U.S. Provisional Application No. 62/185,478, filed Jun. 26, 2015; U.S. Provisional Application No. 62/194,131, filed Jul. 17, 2015; U.S. Provisional Application No. 62/194,119, filed Jul. 17, 2015; U.S. Provisional Application No. 62/194,121, filed Jul. 17, 2015; U.S. Provisional Application No. 62/194,127, filed Jul. 17, 2015; U.S. Provisional Application No. 62/202,744, filed Aug. 7, 2015; U.S. Provisional Application No. 62/202,747, filed Aug. 7, 2015; U.S. Provisional Application No. 62/205,548, filed Aug. 14, 2015; U.S. Provisional Application No. 62/205,569, filed Aug. 14, 2015; U.S. Provisional Application No. 62/205,555, filed Aug. 14, 2015; U.S. Provisional Application No. 62/205,539, filed Aug. 14, 2015; U.S. Provisional Application No. 62/207,858, filed Aug. 20, 2015; U.S. Provisional Application No. 62/214,826, filed Sep. 4, 2015; U.S. Provisional Application No. 62/214,824, filed Sep. 4, 2015; U.S. Provisional Application No. 62/292,084, filed Feb. 5, 2016; U.S. Provisional Application No. 62/302,547, filed Mar. 2, 2016; U.S. Provisional Application No. 62/302,567, filed Mar. 2, 2016; U.S. Provisional Application No. 62/302,713, filed Mar. 2, 2016; and U.S. Provisional Application No. 62/303,021, filed Mar. 3, 2016.

TECHNICAL FIELD

These teachings relate generally to shopping environments and more particularly to devices, systems and methods for assisting customers and/or workers in those shopping environments.

BACKGROUND

In a modern retail store environment, there is a need to improve the customer experience and/or convenience for the customer. Whether shopping in a large format (big box) store or smaller format (neighborhood) store, customers often require assistance that employees of the store are not always able to provide. For example, particularly during peak hours, there may not be enough employees available to assist customers such that customer questions go unanswered. Additionally, due to high employee turnover rates, available employees may not be fully trained or have access to information to adequately support customers. Other routine tasks also are difficult to keep up with, particularly during peak hours. For example, shopping carts are left abandoned, aisles become messy, inventory is not displayed in the proper locations or is not even placed on the sales floor, shelf prices may not be properly set, and theft is hard to discourage. All of these issues can result in low customer satisfaction or reduced convenience to the customer. With increasing competition from non-traditional shopping mechanisms, such as online shopping provided by e-commerce merchants and alternative store formats, it can be important for "brick and mortar" retailers to focus on improving the overall customer experience and/or convenience.

BRIEF DESCRIPTION OF THE DRAWINGS

The above needs are at least partially met through provision of embodiments of systems, devices, and methods designed to provide assistance to customers and/or workers in a shopping facility, such as described in the following detailed description, particularly when studied in conjunction with the drawings, wherein.

Figure 1:
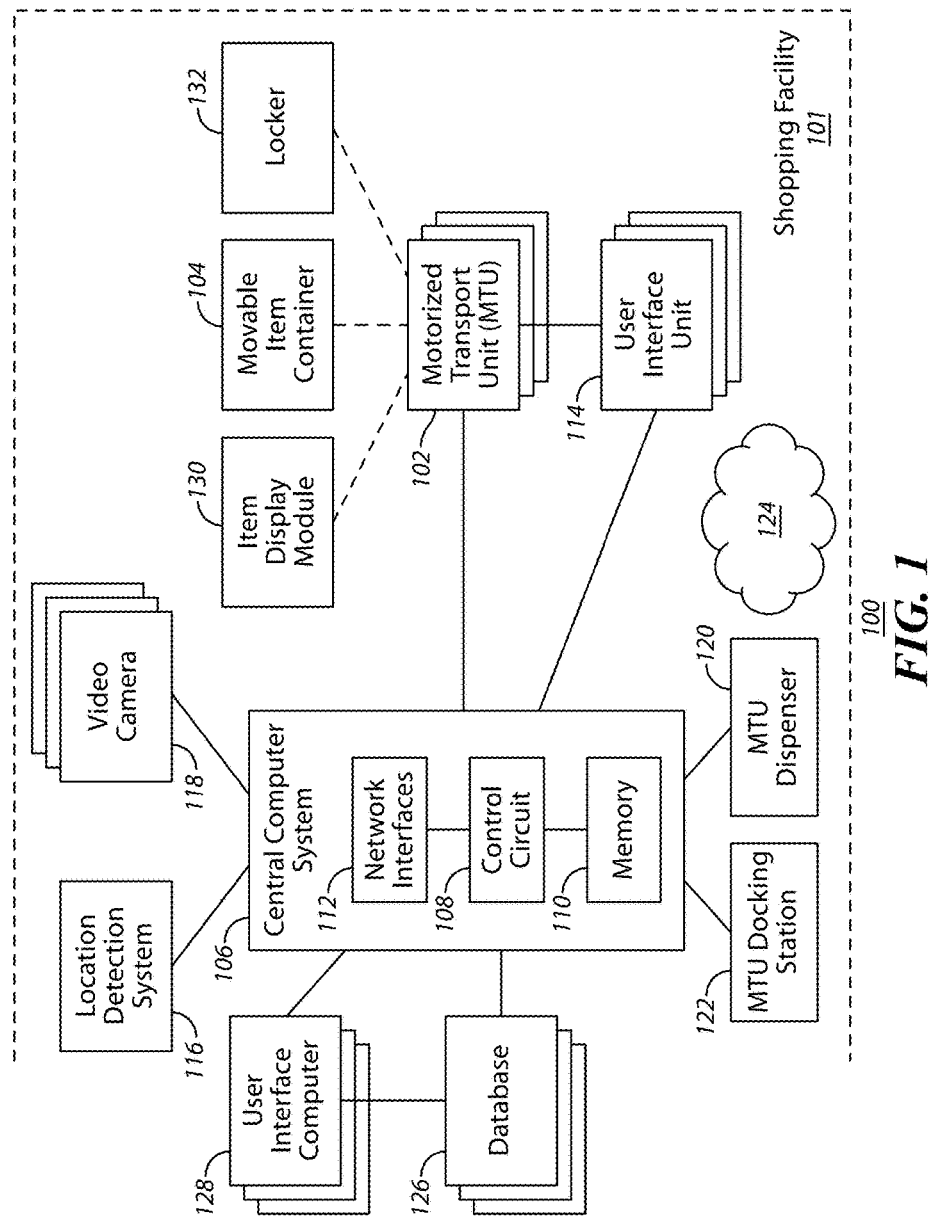
FIG. 1 comprises a block diagram of a shopping assistance system as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, systems, devices and methods are provided for assistance of persons at a shopping facility. Generally, assistance may be provided to customers or shoppers at the facility and/or to workers at the facility. The facility may be any type of shopping facility at a location in which products for display and/or for sale are variously distributed throughout the shopping facility space. The shopping facility may be a retail sales facility, or any other type of facility in which products are displayed and/or sold. The shopping facility may include one or more of sales floor areas, checkout locations, parking locations, entrance and exit areas, stock room areas, stock receiving areas, hallway areas, common areas shared by merchants, and so on. Generally, a shopping facility includes areas that may be dynamic in terms of the physical structures occupying the space or area and objects, items, machinery and/or persons moving in the area. For example, the shopping area may include product storage units, shelves, racks, modules, bins, etc., and other walls, dividers, partitions, etc. that may be configured in different layouts or physical arrangements. In other example, persons or other movable objects may be freely and independently traveling through the shopping facility space. And in other example, the persons or movable objects move according to known travel patterns and timing. The facility may be any size of format facility, and may include products from one or more merchants. For example, a facility may be a single store operated by one merchant or may be a collection of stores covering multiple merchants such as a mall. Generally, the system makes use of automated, robotic mobile devices, e.g., motorized transport units, that are capable of self-powered movement through a space of the shopping facility and providing any number of functions. Movement and operation of such devices may be controlled by a central computer system or may be autonomously controlled by the motorized transport units themselves. Various embodiments provide one or more user interfaces to allow various users to interact with the system including the automated mobile devices and/or to directly interact with the automated mobile devices. In some embodiments, the automated mobile devices and the corresponding system serve to enhance a customer shopping experience in the shopping facility, e.g., by assisting shoppers and/or workers at the facility.

In some embodiments, a shopping facility personal assistance system comprises: a plurality of motorized transport units located in and configured to move through a shopping facility space; a plurality of user interface units, each corresponding to a respective motorized transport unit during use of the respective motorized transport unit; and a central computer system having a network interface such that the central computer system wirelessly communicates with one or both of the plurality of motorized transport units and the plurality of user interface units, wherein the central computer system is configured to control movement of the plurality of motorized transport units through the shopping facility space based at least on inputs from the plurality of user interface units.

System Overview

Referring now to the drawings, FIG. 1 illustrates embodiments of a shopping facility assistance system 100 that can serve to carry out at least some of the teachings set forth herein. It will be understood that the details of this example are intended to serve in an illustrative capacity and are not necessarily intended to suggest any limitations as regards the present teachings. It is noted that generally, FIGS. 1-5 describe the general functionality of several embodiments of a system, and FIGS. 6-15 expand on some functionalities of some embodiments of the system and/or embodiments independent of such systems.

In the example of FIG. 1, a shopping assistance system 100 is implemented in whole or in part at a shopping facility 101. Generally, the system 100 includes one or more motorized transport units (MTUs) 102; one or more item containers 104; a central computer system 106 having at least one control circuit 108, at least one memory 110 and at least one network interface 112; at least one user interface unit 114; a location determination system 116; at least one video camera 118; at least one motorized transport unit (MTU) dispenser 120; at least one motorized transport unit (MTU) docking station 122; at least one wireless network 124; at least one database 126; at least one user interface computer device 128; an item display module 130; and a locker or an item storage unit 132. It is understood that more or fewer of such components may be included in different embodiments of the system 100.

These motorized transport units 102 are located in the shopping facility 101 and are configured to move throughout the shopping facility space. Further details regarding such motorized transport units 102 appear further below. Generally speaking, these motorized transport units 102 are configured to either comprise, or to selectively couple to, a corresponding movable item container 104. A simple example of an item container 104 would be a shopping cart as one typically finds at many retail facilities, or a rocket cart, a flatbed cart or any other mobile basket or platform that may be used to gather items for potential purchase.

In some embodiments, these motorized transport units 102 wirelessly communicate with, and are wholly or largely controlled by, the central computer system 106. In particular, in some embodiments, the central computer system 106 is configured to control movement of the motorized transport units 102 through the shopping facility space based on a variety of inputs. For example, the central computer system 106 communicates with each motorized transport unit 102 via the wireless network 124 which may be one or more wireless networks of one or more wireless network types (such as, a wireless local area network, a wireless personal area network, a wireless mesh network, a wireless star network, a wireless wide area network, a cellular network, and so on), capable of providing wireless coverage of the desired range of the motorized transport units 102 according to any known wireless protocols, including but not limited to a cellular, Wi-Fi, Zigbee, or Bluetooth network.

By one approach the central computer system 106 is a computer based device and includes at least one control circuit 108, at least one memory 110 and at least one wired and/or wireless network interface 112. Such a control circuit 108 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here. This control circuit 108 is configured (for example, by using corresponding programming stored in the memory 110 as will be well understood by those skilled in the art) to carry out one or more of the steps, actions, and/or functions described herein.

In this illustrative example the control circuit 108 operably couples to one or more memories 110. The memory 110 may be integral to the control circuit 108 or can be physically discrete (in whole or in part) from the control circuit 108 as desired. This memory 110 can also be local with respect to the control circuit 108 (where, for example, both share a common circuit board, chassis, power supply, and/or housing) or can be partially or wholly remote with respect to the control circuit 108 (where, for example, the memory 110 is physically located in another facility, metropolitan area, or even country as compared to the control circuit 108).

This memory 110 can serve, for example, to non-transitorily store the computer instructions that, when executed by the control circuit 108, cause the control circuit 108 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

Additionally, at least one database 126 may be accessible by the central computer system 106. Such databases may be integrated into the central computer system 106 or separate from it. Such databases may be at the location of the shopping facility 101 or remote from the shopping facility 101. Regardless of location, the databases comprise memory to store and organize certain data for use by the central control system 106. In some embodiments, the at least one database 126 may store data pertaining to one or more of: shopping facility mapping data, customer data, customer shopping data and patterns, inventory data, product pricing data, and so on.

In this illustrative example, the central computer system 106 also wirelessly communicates with a plurality of user interface units 114. These teachings will accommodate a variety of user interface units including, but not limited to, mobile and/or handheld electronic devices such as so-called smart phones and portable computers such as tablet/pad-styled computers. Generally speaking, these user interface units 114 should be able to wirelessly communicate with the central computer system 106 via a wireless network, such as the wireless network 124 of the shopping facility 101 (such as a Wi-Fi wireless network). These user interface units 114 generally provide a user interface for interaction with the system. In some embodiments, a given motorized transport unit 102 is paired with, associated with, assigned to or otherwise made to correspond with a given user interface unit 114. In some embodiments, these user interface units 114 should also be able to receive verbally-expressed input from a user and forward that content to the central computer system 106 or a motorized transport unit 102 and/or convert that verbally-expressed input into a form useful to the central computer system 106 or a motorized transport unit 102.

By one approach at least some of the user interface units 114 belong to corresponding customers who have come to the shopping facility 101 to shop. By another approach, in lieu of the foregoing or in combination therewith, at least some of the user interface units 114 belong to the shopping facility 101 and are loaned to individual customers to employ as described herein. In some embodiments, one or more user interface units 114 are attachable to a given movable item container 104 or are integrated with the movable item container 104. Similarly, in some embodiments, one or more user interface units 114 may be those of shopping facility workers, belong to the shopping facility 101 and are loaned to the workers, or a combination thereof.

In some embodiments, the user interface units 114 may be general purpose computer devices that include computer programming code to allow it to interact with the system 106. For example, such programming may be in the form of an application installed on the user interface unit 114 or in the form of a browser that displays a user interface provided by the central computer system 106 or other remote computer or server (such as a web server). In some embodiments, one or more user interface units 114 may be special purpose devices that are programmed to primarily function as a user interface for the system 100. Depending on the functionality and use case, user interface units 114 may be operated by customers of the shopping facility or may be operated by workers at the shopping facility, such as facility employees (associates or colleagues), vendors, suppliers, contractors, etc.

By one approach, the system 100 optionally includes one or more video cameras 118. Captured video imagery from such a video camera 118 can be provided to the central computer system 106. That information can then serve, for example, to help the central computer system 106 determine a present location of one or more of the motorized transport units 102 and/or determine issues or concerns regarding automated movement of those motorized transport units 102 in the shopping facility space. As one simple example in these regards, such video information can permit the central computer system 106, at least in part, to detect an object in a path of movement of a particular one of the motorized transport units 102.

By one approach these video cameras 118 comprise existing surveillance equipment employed at the shopping facility 101 to serve, for example, various security purposes. By another approach these video cameras 118 are dedicated to providing video content to the central computer system 106 to facilitate the latter's control of the motorized transport units 102. If desired, the video cameras 118 can have a selectively movable field of view and/or zoom capability that the central computer system 106 controls as appropriate to help ensure receipt of useful information at any given moment.

In some embodiments, a location detection system 116 is provided at the shopping facility 101. The location detection system 116 provides input to the central computer system 106 useful to help determine the location of one or more of the motorized transport units 102. In some embodiments, the location detection system 116 includes a series of light sources (e.g., LEDs (light-emitting diodes)) that are mounted in the ceiling at known positions throughout the space and that each encode data in the emitted light that identifies the source of the light (and thus, the location of the light). As a given motorized transport unit 102 moves through the space, light sensors (or light receivers) at the motorized transport unit 102, on the movable item container 104 and/or at the user interface unit 114 receive the light and can decode the data. This data is sent back to the central computer system 106 which can determine the position of the motorized transport unit 102 by the data of the light it receives, since it can relate the light data to a mapping of the light sources to locations at the facility 101. Generally, such lighting systems are known and commercially available, e.g., the ByteLight system from ByteLight of Boston, Mass. In embodiments using a ByteLight system, a typical display screen of the typical smart phone device can be used as a light sensor or light receiver to receive and process data encoded into the light from the ByteLight light sources.

In other embodiments, the location detection system 116 includes a series of low energy radio beacons (e.g., Bluetooth low energy beacons) at known positions throughout the space and that each encode data in the emitted radio signal that identifies the beacon (and thus, the location of the beacon). As a given motorized transport unit 102 moves through the space, low energy receivers at the motorized transport unit 102, on the movable item container 104 and/or at the user interface unit 114 receive the radio signal and can decode the data. This data is sent back to the central computer system 106 which can determine the position of the motorized transport unit 102 by the location encoded in the radio signal it receives, since it can relate the location data to a mapping of the low energy radio beacons to locations at the facility 101. Generally, such low energy radio systems are known and commercially available. In embodiments using a Bluetooth low energy radio system, a typical Bluetooth radio of a typical smart phone device can be used as a receiver to receive and process data encoded into the Bluetooth low energy radio signals from the Bluetooth low energy beacons.

In still other embodiments, the location detection system 116 includes a series of audio beacons at known positions throughout the space and that each encode data in the emitted audio signal that identifies the beacon (and thus, the location of the beacon). As a given motorized transport unit 102 moves through the space, microphones at the motorized transport unit 102, on the movable item container 104 and/or at the user interface unit 114 receive the audio signal and can decode the data. This data is sent back to the central computer system 106 which can determine the position of the motorized transport unit 102 by the location encoded in the audio signal it receives, since it can relate the location data to a mapping of the audio beacons to locations at the facility 101. Generally, such audio beacon systems are known and commercially available. In embodiments using an audio beacon system, a typical microphone of a typical smart phone device can be used as a receiver to receive and process data encoded into the audio signals from the audio beacon.

Also optionally, the central computer system 106 can operably couple to one or more user interface computers 128 (comprising, for example, a display and a user input interface such as a keyboard, touch screen, and/or cursor-movement device). Such a user interface computer 128 can permit, for example, a worker (e.g., an associate, analyst, etc.) at the retail or shopping facility 101 to monitor the operations of the central computer system 106 and/or to attend to any of a variety of administrative, configuration or evaluation tasks as may correspond to the programming and operation of the central computer system 106. Such user interface computers 128 may be at or remote from the location of the facility 101 and may access one or more the databases 126.

In some embodiments, the system 100 includes at least one motorized transport unit (MTU) storage unit or dispenser 120 at various locations in the shopping facility 101. The dispenser 120 provides for storage of motorized transport units 102 that are ready to be assigned to customers and/or workers. In some embodiments, the dispenser 120 takes the form of a cylinder within which motorized transports units 102 are stacked and released through the bottom of the dispenser 120. Further details of such embodiments are provided further below. In some embodiments, the dispenser 120 may be fixed in location or may be mobile and capable of transporting itself to a given location or utilizing a motorized transport unit 102 to transport the dispenser 120, then dispense one or more motorized transport units 102.

In some embodiments, the system 100 includes at least one motorized transport unit (MTU) docking station 122. These docking stations 122 provide locations where motorized transport units 102 can travel and connect to. For example, the motorized transport units 102 may be stored and charged at the docking station 122 for later use, and/or may be serviced at the docking station 122.

In accordance with some embodiments, a given motorized transport unit 102 detachably connects to a movable item container 104 and is configured to move the movable item container 104 through the shopping facility space under control of the central computer system 106 and/or the user interface unit 114. For example, a motorized transport unit 102 can move to a position underneath a movable item container 104 (such as a shopping cart, a rocket cart, a flatbed cart, or any other mobile basket or platform), align itself with the movable item container 104 (e.g., using sensors) and then raise itself to engage an undersurface of the movable item container 104 and lift a portion of the movable item container 104. Once the motorized transport unit is cooperating with the movable item container 104 (e.g., lifting a portion of the movable item container), the motorized transport unit 102 can continue to move throughout the facility space 101 taking the movable item container 104 with it. In some examples, the motorized transport unit 102 takes the form of the motorized transport unit 202 of FIGS. 2A-3B as it engages and detachably connects to a given movable item container 104. It is understood that in other embodiments, the motorized transport unit 102 may not lift a portion of the movable item container 104, but that it removably latches to, connects to or otherwise attaches to a portion of the movable item container 104 such that the movable item container 104 can be moved by the motorized transport unit 102. For example, the motorized transport unit 102 can connect to a given movable item container using a hook, a mating connector, a magnet, and so on.

In addition to detachably coupling to movable item containers 104 (such as shopping carts), in some embodiments, motorized transport units 102 can move to and engage or connect to an item display module 130 and/or an item storage unit or locker 132. For example, an item display module 130 may take the form of a mobile display rack or shelving unit configured to house and display certain items for sale. It may be desired to position the display module 130 at various locations within the shopping facility 101 at various times. Thus, one or more motorized transport units 102 may move (as controlled by the central computer system 106) underneath the item display module 130, extend upward to lift the module 130 and then move it to the desired location. A storage locker 132 may be a storage device where items for purchase are collected and placed therein for a customer and/or worker to later retrieve. In some embodiments, one or more motorized transport units 102 may be used to move the storage locker to a desired location in the shopping facility 101. Similar to how a motorized transport unit engages a movable item container 104 or item display module 130, one or more motorized transport units 102 may move (as controlled by the central computer system 106) underneath the storage locker 132, extend upward to lift the locker 132 and then move it to the desired location.

Figure 2A:
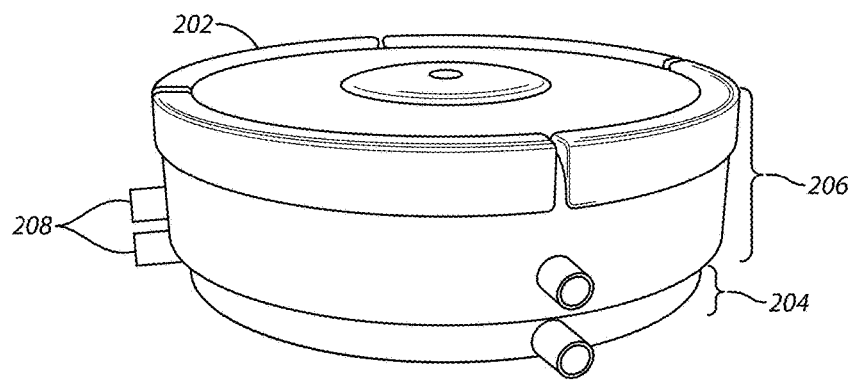
FIGS. 2A and 2B are illustrations of a motorized transport unit of the system of FIG. 1 in a retracted orientation and an extended orientation in accordance with some embodiments.
Figure 2B:
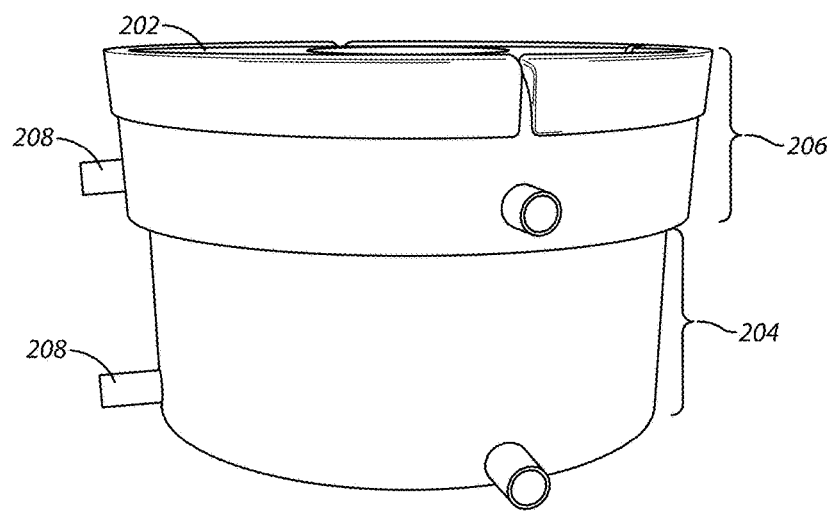

FIGS. 2A and 2B illustrate some embodiments of a motorized transport unit 202, similar to the motorized transport unit 102 shown in the system of FIG. 1. In this embodiment, the motorized transport unit 202 takes the form of a disc-shaped robotic device having motorized wheels (not shown), a lower body portion 204 and an upper body portion 206 that fits over at least part of the lower body portion 204. It is noted that in other embodiments, the motorized transport unit may have other shapes and/or configurations, and is not limited to disc-shaped. For example, the motorized transport unit may be cubic, octagonal, triangular, or other shapes, and may be dependent on a movable item container with which the motorized transport unit is intended to cooperate. Also included are guide members 208. In FIG. 2A, the motorized transport unit 202 is shown in a retracted position in which the upper body portion 206 fits over the lower body portion 204 such that the motorized transport unit 202 is in its lowest profile orientation which is generally the preferred orientation for movement when it is unattached to a movable item container 104 for example. In FIG. 2B, the motorized transport unit 202 is shown in an extended position in which the upper body portion 206 is moved upward relative to the lower body portion 204 such that the motorized transport unit 202 is in its highest profile orientation for movement when it is lifting and attaching to a movable item container 104 for example. The mechanism within the motorized transport unit 202 is designed to provide sufficient lifting force to lift the weight of the upper body portion 206 and other objects to be lifted by the motorized transport unit 202, such as movable item containers 104 and items placed within the movable item container, item display modules 130 and items supported by the item display module, and storage lockers 132 and items placed within the storage locker. The guide members 208 are embodied as pegs or shafts that extend horizontally from the both the upper body portion 206 and the lower body portion 204. In some embodiments, these guide members 208 assist docking the motorized transport unit 202 to a docking station 122 or a dispenser 120. In some embodiments, the lower body portion 204 and the upper body portion are capable to moving independently of each other. For example, the upper body portion 206 may be raised and/or rotated relative to the lower body portion 204. That is, one or both of the upper body portion 206 and the lower body portion 204 may move toward/away from the other or rotated relative to the other. In some embodiments, in order to raise the upper body portion 206 relative to the lower body portion 204, the motorized transport unit 202 includes an internal lifting system (e.g., including one or more electric actuators or rotary drives or motors). Numerous examples of such motorized lifting and rotating systems are known in the art. Accordingly, further elaboration in these regards is not provided here for the sake of brevity.

Figure 3B:
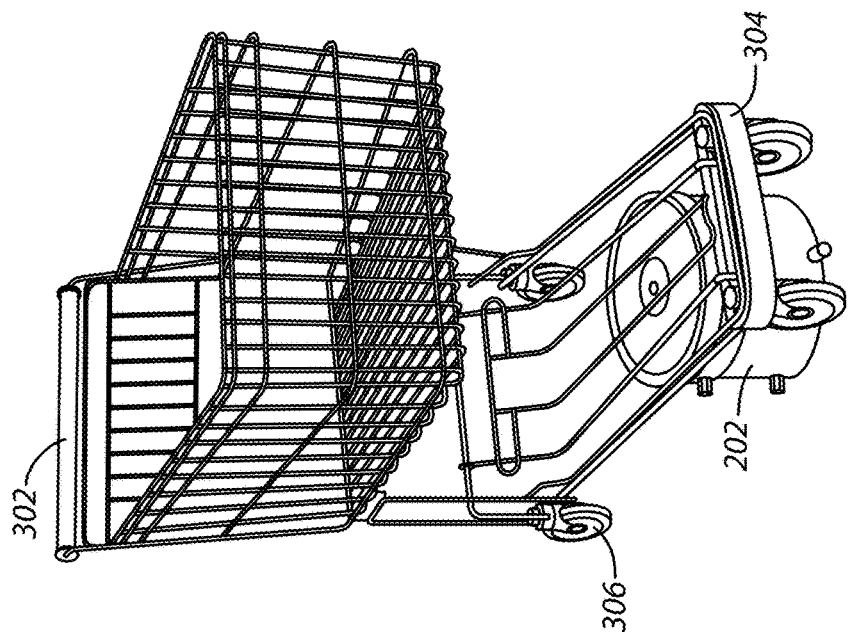
FIGS. 3A and 3B are illustrations of the motorized transport unit of FIGS. 2A and 2B detachably coupling to a movable item container, such as a shopping cart, in accordance with some embodiments.
Figure 3A:
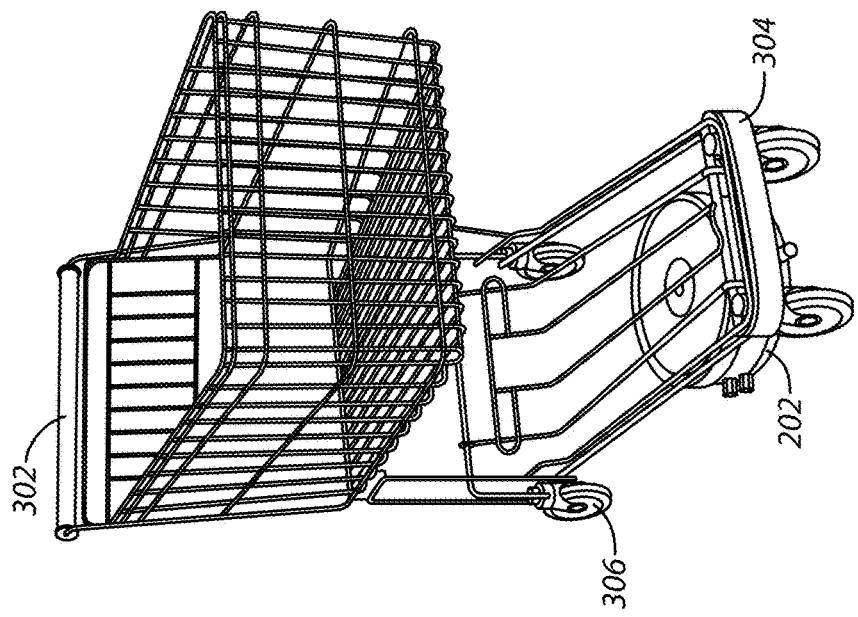

FIGS. 3A and 3B illustrate some embodiments of the motorized transport unit 202 detachably engaging a movable item container embodied as a shopping cart 302. In FIG. 3A, the motorized transport unit 202 is in the orientation of FIG. 2A such that it is retracted and able to move in position underneath a portion of the shopping cart 302. Once the motorized transport unit 202 is in position (e.g., using sensors), as illustrated in FIG. 3B, the motorized transport unit 202 is moved to the extended position of FIG. 2B such that the front portion 304 of the shopping cart is lifted off of the ground by the motorized transport unit 202, with the wheels 306 at the rear of the shopping cart 302 remaining on the ground. In this orientation, the motorized transport unit 202 is able to move the shopping cart 302 throughout the shopping facility. It is noted that in these embodiments, the motorized transport unit 202 does not bear the weight of the entire cart 302 since the rear wheels 306 rest on the floor. It is understood that in some embodiments, the motorized transport unit 202 may be configured to detachably engage other types of movable item containers, such as rocket carts, flatbed carts or other mobile baskets or platforms.

Figure 4:
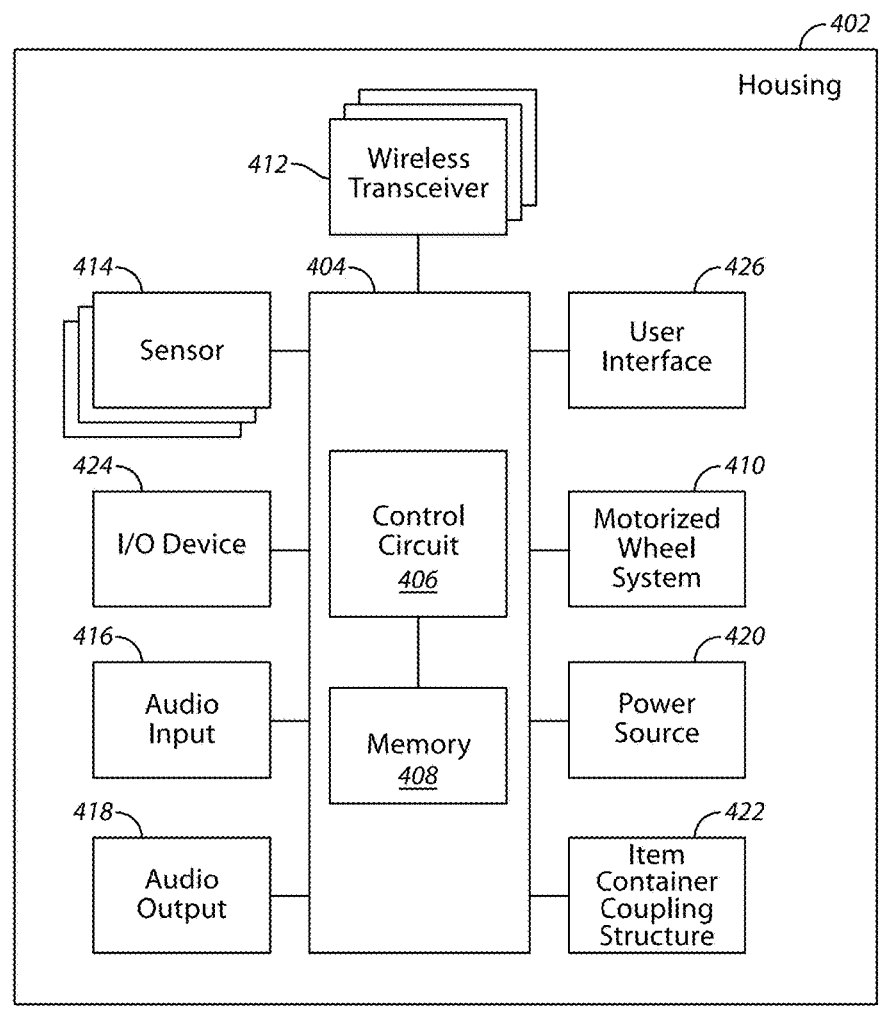
FIG. 4 comprises a block diagram of a motorized transport unit as configured in accordance with various embodiments of these teachings.

FIG. 4 presents a more detailed example of some embodiments of the motorized transport unit 102 of FIG. 1. In this example, the motorized transport unit 102 has a housing 402 that contains (partially or fully) or at least supports and carries a number of components. These components include a control unit 404 comprising a control circuit 406 that, like the control circuit 108 of the central computer system 106, controls the general operations of the motorized transport unit 102. Accordingly, the control unit 404 also includes a memory 408 coupled to the control circuit 406 and that stores, for example, operating instructions and/or useful data.

The control circuit 406 operably couples to a motorized wheel system 410. This motorized wheel system 410 functions as a locomotion system to permit the motorized transport unit 102 to move within the aforementioned retail or shopping facility 101 (thus, the motorized wheel system 410 may more generically be referred to as a locomotion system). Generally speaking, this motorized wheel system 410 will include at least one drive wheel (i.e., a wheel that rotates (around a horizontal axis) under power to thereby cause the motorized transport unit 102 to move through interaction with, for example, the floor of the shopping facility 101). The motorized wheel system 410 can include any number of rotating wheels and/or other floor-contacting mechanisms as may be desired and/or appropriate to the application setting.

The motorized wheel system 410 also includes a steering mechanism of choice. One simple example in these regards comprises one or more of the aforementioned wheels that can swivel about a vertical axis to thereby cause the moving motorized transport unit 102 to turn as well.

Numerous examples of motorized wheel systems are known in the art. Accordingly, further elaboration in these regards is not provided here for the sake of brevity save to note that the aforementioned control circuit 406 is configured to control the various operating states of the motorized wheel system 410 to thereby control when and how the motorized wheel system 410 operates.

In this illustrative example, the control circuit 406 also operably couples to at least one wireless transceiver 412 that operates according to any known wireless protocol. This wireless transceiver 412 can comprise, for example, a Wi-Fi-compatible and/or Bluetooth-compatible transceiver that can communicate with the aforementioned central computer system 106 via the aforementioned wireless network 124 of the shopping facility 101. So configured the control circuit 406 of the motorized transport unit 102 can provide information to the central computer system 106 and can receive information and/or instructions from the central computer system 106. As one simple example in these regards, the control circuit 406 can receive instructions from the central computer system 106 regarding movement of the motorized transport unit 102.

These teachings will accommodate using any of a wide variety of wireless technologies as desired and/or as may be appropriate in a given application setting. These teachings will also accommodate employing two or more different wireless transceivers 412 if desired.

The control circuit 406 also couples to one or more on-board sensors 414. These teachings will accommodate a wide variety of sensor technologies and form factors. By one approach at least one such sensor 414 can comprise a light sensor or light receiver. When the aforementioned location detection system 116 comprises a plurality of light emitters disposed at particular locations within the shopping facility 101, such a light sensor can provide information that the control circuit 406 and/or the central computer system 106 employs to determine a present location and/or orientation of the motorized transport unit 102.

As another example, such a sensor 414 can comprise a distance measurement unit configured to detect a distance between the motorized transport unit 102 and one or more objects or surfaces around the motorized transport unit 102 (such as an object that lies in a projected path of movement for the motorized transport unit 102 through the shopping facility 101). These teachings will accommodate any of a variety of distance measurement units including optical units and sound/ultrasound units. In one example, a sensor 414 comprises a laser distance sensor device capable of determining a distance to objects in proximity to the sensor. In some embodiments, a sensor 414 comprises an optical based scanning device to sense and read optical patterns in proximity to the sensor, such as bar codes variously located on structures in the shopping facility 101. In some embodiments, a sensor 414 comprises a radio frequency identification (RFID) tag reader capable of reading RFID tags in proximity to the sensor. Such sensors may be useful to determine proximity to nearby objects, avoid collisions, orient the motorized transport unit at a proper alignment orientation to engage a movable item container, and so on.

The foregoing examples are intended to be illustrative and are not intended to convey an exhaustive listing of all possible sensors. Instead, it will be understood that these teachings will accommodate sensing any of a wide variety of circumstances or phenomena to support the operating functionality of the motorized transport unit 102 in a given application setting.

By one optional approach an audio input 416 (such as a microphone) and/or an audio output 418 (such as a speaker) can also operably couple to the control circuit 406. So configured the control circuit 406 can provide a variety of audible sounds to thereby communicate with a user of the motorized transport unit 102, other persons in the vicinity of the motorized transport unit 102, or even other motorized transport units 102 in the area. These audible sounds can include any of a variety of tones and other non-verbal sounds. These audible sounds can also include, in lieu of the foregoing or in combination therewith, pre-recorded or synthesized speech.

The audio input 416, in turn, provides a mechanism whereby, for example, a user provides verbal input to the control circuit 406. That verbal input can comprise, for example, instructions, inquiries, or information. So configured, a user can provide, for example, a question to the motorized transport unit 102 (such as, "Where are the towels?"). The control circuit 406 can cause that verbalized question to be transmitted to the central computer system 106 via the motorized transport unit's wireless transceiver 412. The central computer system 106 can process that verbal input to recognize the speech content and to then determine an appropriate response. That response might comprise, for example, transmitting back to the motorized transport unit 102 specific instructions regarding how to move the motorized transport unit 102 (via the aforementioned motorized wheel system 410) to the location in the shopping facility 101 where the towels are displayed.

In this example the motorized transport unit 102 includes a rechargeable power source 420 such as one or more batteries. The power provided by the rechargeable power source 420 can be made available to whichever components of the motorized transport unit 102 require electrical energy. By one approach the motorized transport unit 102 includes a plug or other electrically conductive interface that the control circuit 406 can utilize to automatically connect to an external source of electrical energy to thereby recharge the rechargeable power source 420.

By one approach the motorized transport unit 102 comprises an integral part of a movable item container 104 such as a grocery cart. As used herein, this reference to "integral" will be understood to refer to a non-temporary combination and joinder that is sufficiently complete so as to consider the combined elements to be as one. Such a joinder can be facilitated in a number of ways including by securing the motorized transport unit housing 402 to the item container using bolts or other threaded fasteners as versus, for example, a clip.

These teachings will also accommodate selectively and temporarily attaching the motorized transport unit 102 to an item container 104. In such a case the motorized transport unit 102 can include a movable item container coupling structure 422. By one approach this movable item container coupling structure 422 operably couples to a control circuit 202 to thereby permit the latter to control, for example, the latched and unlatched states of the movable item container coupling structure 422. So configured, by one approach the control circuit 406 can automatically and selectively move the motorized transport unit 102 (via the motorized wheel system 410) towards a particular item container until the movable item container coupling structure 422 can engage the item container to thereby temporarily physically couple the motorized transport unit 102 to the item container. So latched, the motorized transport unit 102 can then cause the item container to move with the motorized transport unit 102. In embodiments such as illustrated in FIGS. 2A-3B, the movable item container coupling structure 422 includes a lifting system (e.g., including an electric drive or motor) to cause a portion of the body or housing 402 to engage and lift a portion of the item container off of the ground such that the motorized transport unit 102 can carry a portion of the item container. In other embodiments, the movable transport unit latches to a portion of the movable item container without lifting a portion thereof off of the ground.

In either case, by combining the motorized transport unit 102 with an item container, and by controlling movement of the motorized transport unit 102 via the aforementioned central computer system 106, these teachings will facilitate a wide variety of useful ways to assist both customers and associates in a shopping facility setting. For example, the motorized transport unit 102 can be configured to follow a particular customer as they shop within the shopping facility 101. The customer can then place items they intend to purchase into the item container that is associated with the motorized transport unit 102.

In some embodiments, the motorized transport unit 102 includes an input/output (I/O) device 424 that is coupled to the control circuit 406. The I/O device 424 allows an external device to couple to the control unit 404. The function and purpose of connecting devices will depend on the application. In some examples, devices connecting to the I/O device 424 may add functionality to the control unit 404, allow the exporting of data from the control unit 404, allow the diagnosing of the motorized transport unit 102, and so on.

In some embodiments, the motorized transport unit 102 includes a user interface 426 including for example, user inputs and/or user outputs or displays depending on the intended interaction with the user. For example, user inputs could include any input device such as buttons, knobs, switches, touch sensitive surfaces or display screens, and so on. Example user outputs include lights, display screens, and so on. The user interface 426 may work together with or separate from any user interface implemented at a user interface unit 114 (such as a smart phone or tablet device).

The control unit 404 includes a memory 408 coupled to the control circuit 406 and that stores, for example, operating instructions and/or useful data. The control circuit 406 can comprise a fixed-purpose hard-wired platform or can comprise a partially or wholly programmable platform. These architectural options are well known and understood in the art and require no further description here. This control circuit 406 is configured (for example, by using corresponding programming stored in the memory 408 as will be well understood by those skilled in the art) to carry out one or more of the steps, actions, and/or functions described herein. The memory 408 may be integral to the control circuit 406 or can be physically discrete (in whole or in part) from the control circuit 406 as desired. This memory 408 can also be local with respect to the control circuit 406 (where, for example, both share a common circuit board, chassis, power supply, and/or housing) or can be partially or wholly remote with respect to the control circuit 406. This memory 408 can serve, for example, to non-transitorily store the computer instructions that, when executed by the control circuit 406, cause the control circuit 406 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

It is noted that not all components illustrated in FIG. 4 are included in all embodiments of the motorized transport unit 102. That is, some components may be optional depending on the implementation.

Figure 5:
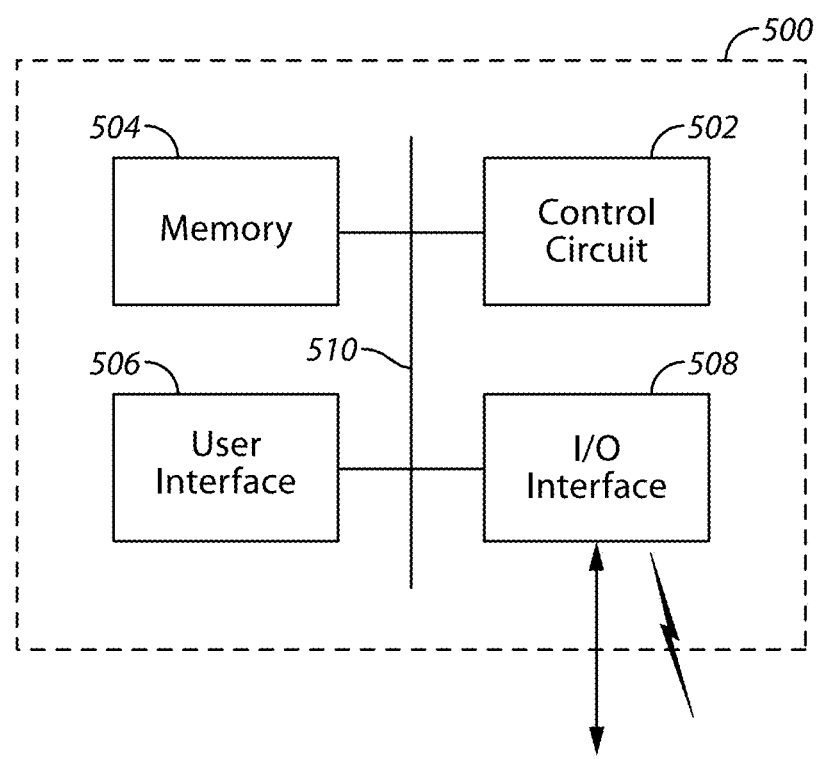
FIG. 5 comprises a block diagram of a computer device as configured in accordance with various embodiments of these teachings.

FIG. 5 illustrates a functional block diagram that may generally represent any number of various electronic components of the system 100 that are computer type devices. The computer device 500 includes a control circuit 502, a memory 504, a user interface 506 and an input/output (I/O) interface 508 providing any type of wired and/or wireless connectivity to the computer device 500, all coupled to a communication bus 510 to allow data and signaling to pass therebetween. Generally, the control circuit 502 and the memory 504 may be referred to as a control unit. The control circuit 502, the memory 504, the user interface 506 and the I/O interface 508 may be any of the devices described herein or as understood in the art. The functionality of the computer device 500 will depend on the programming stored in the memory 504. The computer device 500 may represent a high level diagram for one or more of the central computer system 106, the motorized transport unit 102, the user interface unit 114, the location detection system 116, the user interface computer 128, the MTU docking station 122 and the MTU dispenser 120, or any other device or component in the system that is implemented as a computer device.

Additional Features Overview

Referring generally to FIGS. 1-5, the shopping assistance system 100 may implement one or more of several different features depending on the configuration of the system and its components. The following provides a brief description of several additional features that could be implemented by the system. One or more of these features could also be implemented in other systems separate from embodiments of the system. This is not meant to be an exhaustive description of all features and not meant to be an exhaustive description of the details any one of the features. Further details with regards to one or more features beyond this overview may be provided herein.

Tagalong Steering: This feature allows a given motorized transport unit 102 to lead or follow a user (e.g., a customer and/or a worker) throughout the shopping facility 101. For example, the central computer system 106 uses the location detection system 116 to determine the location of the motorized transport unit 102. For example, LED smart lights (e.g., the ByteLight system) of the location detection system 116 transmit a location number to smart devices which are with the customer (e.g., user interface units 114), and/or on the item container 104/motorized transport unit 102. The central computer system 106 receives the LED location numbers received by the smart devices through the wireless network 124. Using this information, in some embodiments, the central computer system 106 uses a grid placed upon a 2D CAD map and 3D point cloud model (e.g., from the databases 126) to direct, track, and plot paths for the other devices. Using the grid, the motorized transport unit 102 can drive a movable item container 104 in a straight path rather than zigzagging around the facility. As the user moves from one grid to another, the motorized transport unit 102 drives the container 104 from one grid to the other. In some embodiments, as the user moves towards the motorized transport unit, it stays still until the customer moves beyond an adjoining grid.

Detecting Objects: In some embodiments, motorized transport units 102 detect objects through several sensors mounted on motorized transport unit 102, through independent cameras (e.g., video cameras 118), through sensors of a corresponding movable item container 104, and through communications with the central computer system 106. In some embodiments, with semi-autonomous capabilities, the motorized transport unit 102 will attempt to avoid obstacles, and if unable to avoid, it will notify the central computer system 106 of an exception condition. In some embodiments, using sensors 414 (such as distance measurement units, e.g., laser or other optical-based distance measurement sensors), the motorized transport unit 102 detects obstacles in its path, and will move to avoid, or stop until the obstacle is clear.

Visual Remote Steering: This feature enables movement and/or operation of a motorized transport unit 102 to be controlled by a user on-site, off-site, or anywhere in the world. This is due to the architecture of some embodiments where the central computer system 106 outputs the control signals to the motorized transport unit 102. These controls signals could have originated at any device in communication with the central computer system 106. For example, the movement signals sent to the motorized transport unit 102 may be movement instructions determined by the central computer system 106; commands received at a user interface unit 114 from a user; and commands received at the central computer system 106 from a remote user not located at the shopping facility space.

Determining Location: Similar to that described above, this feature enables the central computer system 106 to determine the location of devices in the shopping facility 101. For example, the central computer system 106 maps received LED light transmissions, Bluetooth low energy radio signals or audio signals (or other received signals encoded with location data) to a 2D map of the shopping facility. Objects within the area of the shopping facility are also mapped and associated with those transmissions. Using this information, the central computer system 106 can determine the location of devices such as motorized transport units.

Digital Physical Map Integration: In some embodiments, the system 100 is capable of integrating 2D and 3D maps of the shopping facility with physical locations of objects and workers. Once the central computer system 106 maps all objects to specific locations using algorithms, measurements and LED geo-location, for example, grids are applied which sections off the maps into access ways and blocked sections. Motorized transport units 102 use these grids for navigation and recognition. In some cases, grids are applied to 2D horizontal maps along with 3D models. In some cases, grids start at a higher unit level and then can be broken down into smaller units of measure by the central computer system 106 when needed to provide more accuracy.

Calling a Motorized Transport Unit: This feature provides multiple methods to request and schedule a motorized transport unit 102 for assistance in the shopping facility. In some embodiments, users can request use of a motorized transport unit 102 through the user interface unit 114. The central computer system 106 can check to see if there is an available motorized transport unit. Once assigned to a given user, other users will not be able to control the already assigned transport unit. Workers, such as store associates, may also reserve multiple motorized transport units in order to accomplish a coordinated large job.

Locker Delivery: In some embodiments, one or more motorized transport units 102 may be used to pick, pack, and deliver items to a particular storage locker 132. The motorized transport units 102 can couple to and move the storage locker to a desired location. In some embodiments, once delivered, the requestor will be notified that the items are ready to be picked up, and will be provided the locker location and locker security code key.

Route Optimization: In some embodiments, the central computer system automatically generates a travel route for one or more motorized transport units through the shopping facility space. In some embodiments, this route is based on one or more of a user provided list of items entered by the user via a user interface unit 114; user selected route preferences entered by the user via the user interface unit 114; user profile data received from a user information database (e.g., from one of databases 126); and product availability information from a retail inventory database (e.g., from one of databases 126). In some cases, the route intends to minimize the time it takes to get through the facility, and in some cases, may route the shopper to the least busy checkout area. Frequently, there will be multiple possible optimum routes. The route chosen may take the user by things the user is more likely to purchase (in case they forgot something), and away from things they are not likely to buy (to avoid embarrassment). That is, routing a customer through sporting goods, women's lingerie, baby food, or feminine products, who has never purchased such products based on past customer behavior would be non-productive, and potentially embarrassing to the customer. In some cases, a route may be determined from multiple possible routes based on past shopping behavior, e.g., if the customer typically buys a cold Diet Coke product, children's shoes or power tools, this information would be used to add weight to the best alternative routes, and determine the route accordingly.

Store Facing Features: In some embodiments, these features enable functions to support workers in performing store functions. For example, the system can assist workers to know what products and items are on the shelves and which ones need attention. For example, using 3D scanning and point cloud measurements, the central computer system can determine where products are supposed to be, enabling workers to be alerted to facing or zoning of issues along with potential inventory issues.

Phone Home: This feature allows users in a shopping facility 101 to be able to contact remote users who are not at the shopping facility 101 and include them in the shopping experience. For example, the user interface unit 114 may allow the user to place a voice call, a video call, or send a text message. With video call capabilities, a remote person can virtually accompany an in-store shopper, visually sharing the shopping experience while seeing and talking with the shopper. One or more remote shoppers may join the experience.

Returns: In some embodiments, the central computer system 106 can task a motorized transport unit 102 to keep the returns area clear of returned merchandise. For example, the transport unit may be instructed to move a cart from the returns area to a different department or area. Such commands may be initiated from video analytics (the central computer system analyzing camera footage showing a cart full), from an associate command (digital or verbal), or on a schedule, as other priority tasks allow. The motorized transport unit 102 can first bring an empty cart to the returns area, prior to removing a full one.

Bring a Container: One or more motorized transport units can retrieve a movable item container 104 (such as a shopping cart) to use. For example, upon a customer or worker request, the motorized transport unit 102 can reposition one or more item containers 104 from one location to another. In some cases, the system instructs the motorized transport unit where to obtain an empty item container for use. For example, the system can recognize an empty and idle item container that has been abandoned or instruct that one be retrieved from a cart storage area. In some cases, the call to retrieve an item container may be initiated through a call button placed throughout the facility, or through the interface of a user interface unit 114.

Respond to Voice Commands: In some cases, control of a given motorized transport unit is implemented through the acceptance of voice commands. For example, the user may speak voice commands to the motorized transport unit 102 itself and/or to the user interface unit 114. In some embodiments, a voice print is used to authorize to use of a motorized transport unit 102 to allow voice commands from single user at a time.

Retrieve Abandoned Item Containers: This feature allows the central computer system to track movement of movable item containers in and around the area of the shopping facility 101, including both the sale floor areas and the back-room areas. For example, using visual recognition through store cameras 118 or through user interface units 114, the central computer system 106 can identify abandoned and out-of-place movable item containers. In some cases, each movable item container has a transmitter or smart device which will send a unique identifier to facilitate tracking or other tasks and its position using LED geo-location identification. Using LED geo-location identification with the Determining Location feature through smart devices on each cart, the central computer system 106 can determine the length of time a movable item container 104 is stationary.

Stocker Assistance: This feature allows the central computer system to track movement of merchandise flow into and around the back-room areas. For example, using visual recognition and captured images, the central computer system 106 can determine if carts are loaded or not for moving merchandise between the back room areas and the sale floor areas. Tasks or alerts may be sent to workers to assign tasks.

Self-Docking: Motorized transport units 102 will run low or out of power when used. Before this happens, the motorized transport units 102 need to recharge to stay in service. According to this feature, motorized transport units 102 will self-dock and recharge (e.g., at a MTU docking station 122) to stay at maximum efficiency, when not in use. When use is completed, the motorized transport unit 102 will return to a docking station 122. In some cases, if the power is running low during use, a replacement motorized transport unit can be assigned to move into position and replace the motorized transport unit with low power. The transition from one unit to the next can be seamless to the user.

Item Container Retrieval: With this feature, the central computer system 106 can cause multiple motorized transport units 102 to retrieve abandoned item containers from exterior areas such as parking lots. For example, multiple motorized transport units are loaded into a movable dispenser, e.g., the motorized transport units are vertically stacked in the dispenser. The dispenser is moved to the exterior area and the transport units are dispensed. Based on video analytics, it is determined which item containers 104 are abandoned and for how long. A transport unit will attach to an abandoned cart and return it to a storage bay.

Motorized Transport Unit Dispenser: This feature provides the movable dispenser that contains and moves a group of motorized transport units to a given area (e.g., an exterior area such as a parking lot) to be dispensed for use. For example, motorized transport units can be moved to the parking lot to retrieve abandoned item containers 104. In some cases, the interior of the dispenser includes helically wound guide rails that mate with the guide member 208 to allow the motorized transport units to be guided to a position to be dispensed.

Specialized Module Retrieval: This feature allows the system 100 to track movement of merchandise flow into and around the sales floor areas and the back-room areas including special modules that may be needed to move to the sales floor. For example, using video analytics, the system can determine if a modular unit it loaded or empty. Such modular units may house items that are of seasonal or temporary use on the sales floor. For example, when it is raining, it is useful to move a module unit displaying umbrellas from a back room area (or a lesser accessed area of the sales floor) to a desired area of the sales floor area.

Authentication: This feature uses a voice imprint with an attention code/word to authenticate a user to a given motorized transport unit. One motorized transport unit can be swapped for another using this authentication. For example, a token is used during the session with the user. The token is a unique identifier for the session which is dropped once the session is ended. A logical token may be a session id used by the application of the user interface unit 114 to establish the session id when user logs on and when deciding to do use the system 100. In some embodiments, communications throughout the session are encrypted using SSL or other methods at transport level.

Further Details of Some Embodiments

In accordance with some embodiments, further details are now provided for one or more of these and other features. For example, generally speaking, pursuant to various embodiments, systems, apparatuses, processes and methods are provided herein that allow for accurate monitoring and identification of areas of a shopping facility that are in need of attention or one or more actions by one or more shopping facility associates or employees. The one or more actions can include, for example, restocking products onto a shelf, adjusting a positioning of items of a product on a shelf so that the items are proximate an outer edge of the shelf (sometimes referred to as "facing"), moving an incorrectly placed product, other such actions, or combinations of such actions. The accurate placement and stock level of products on shelves, on racks, or otherwise positioned to be readily visible and accessible to customers as they travel through the retail facility can dramatically improve sales. It is noted that some embodiments are described with reference to products placed on a shelf; however, it will be appreciated by those skilled in the art that the descriptions are not limited to shelves, but can be applied to racks, bins, modulars, cases, and substantially any product support structure at a shopping facility that supports and/or holds products.

Often, customers are more likely to purchase products when they are readily visible to them. Similarly, impulsive shoppers see products that are at the front of the shelf and are more likely to add these items to their cart. In many instances, when products are only located at the back of a shelf or missing, customers are often less likely to purchase the product. As such, maintaining desired quantities of products and in desired and/or optimal position can be extremely advantageous to sales and the shopping facility. Accordingly, some embodiments utilize shopping facility mapping and product mapping that define where products are within the shopping facility and on what area of a particular shelf, and can identify products and items on the shelf that may be in need attention. Further, some embodiments use three-dimensional (3D) scanning, point cloud measurements and/or 3D scan mapping in cooperation with shopping facility mapping and/or product mapping relative to the shopping facility to determine where products are supposed to be while enabling shopping facility colleagues and associates to be alerted to facing, zoning and other such product placement issues. Such information may additional provide notification of potential inventory issues. Further, effectively maintaining products in desired positions and/or faced on the shelf increases in difficulty as the number of products offered at shopping facilities increases.

In some implementations, the 3D scans are acquired by moving one or more 3D scanners through relevant portions of the shopping facility. During the movement of the 3D scanners, a series of 3D scans can be acquired. These series of scans can be evaluated relative to product placement one the one or more shelves. Further, some embodiments evaluate the 3D scans relative to a baseline scan and/or one or more threshold conditions, which can be product specific and/or shelf specific. The movement of the one or more scanners allows multiple shelves and correspondingly multiple products to be evaluated. Some embodiments mount one or more 3D scanners to a motorized transport unit that is controlled to position the one or more 3D scanners in relevant positions to obtain the desired scans.

Figure 6:
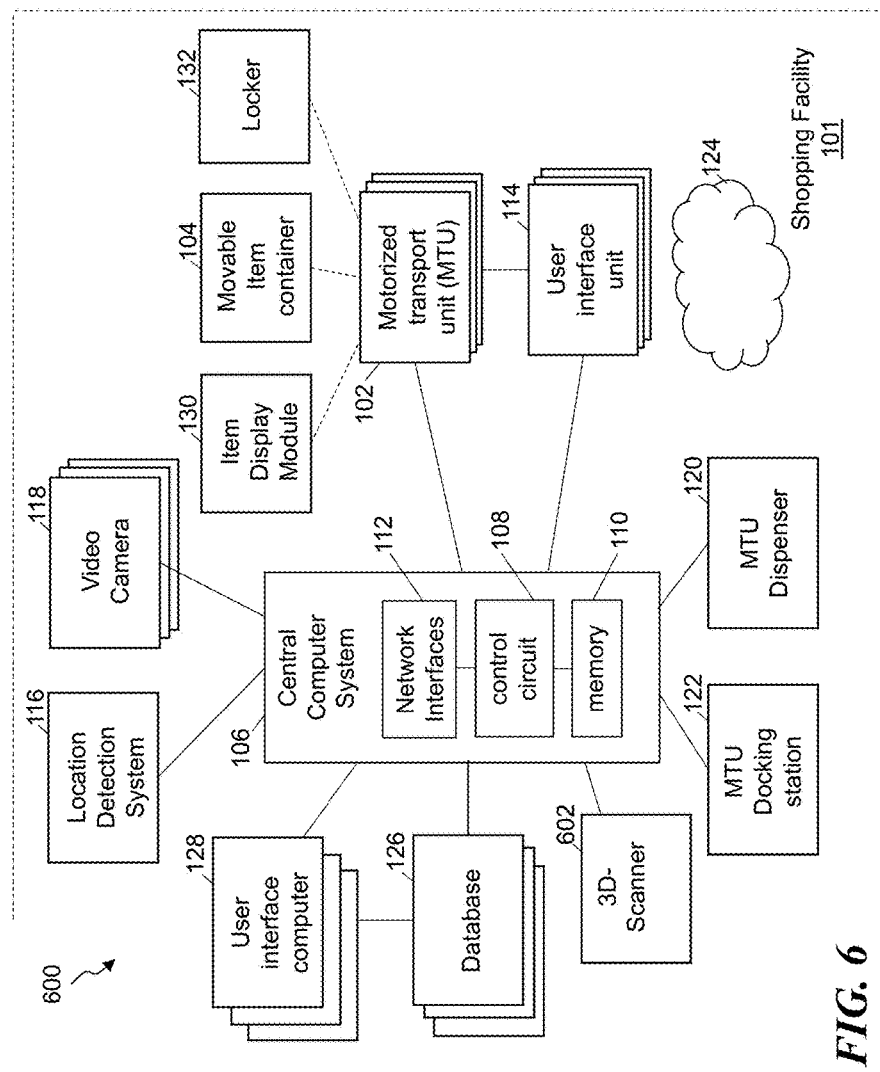
FIG. 6 comprises a block diagram of a shopping assistance system as configured in accordance with various embodiments of these teachings.

FIG. 6 illustrates a block diagram of an exemplary shopping assistance system 600, similar to that of FIG. 1, as configured in accordance with various embodiments of these teachings. The shopping assistance system 600 includes the components of FIG. 1, with the addition of one or more three-dimensional (3D) scanners 602 that are configured to be moved through the shopping facility to acquire 3D scans of products, shelves, bins, cases, modulars, and other such devices on which products are placed and that are spaced through the shopping facility. In some embodiments, the shopping facility assistance system 600 further includes and/or implements a shopping facility product monitoring system configured to monitor product placement on shelves, racks, cases, bins and other such product support structures distributed throughout the shopping facility, in accordance with some embodiments. The product monitoring system is configured to obtain data corresponding to product placement on the shelves, and based on the product placement determine whether one or more actions should be taken relative to the product placement, including a lack of items of a product available for customers on a shelf. In some implementations, the data evaluated can include three-dimensional (3D) scans obtained from the one or more 3D scanners 602, and/or 3D mapping generated from a series of 3D scans.

In some embodiments, the control circuit 108 includes a product monitoring control circuit and/or provides functionality to implement a product monitoring control circuit. The control circuit couples with the memory 110 and databases 126. In some embodiments, the memory 110 and/or databases 126 may store some or all of particular data that may be needed to evaluate product placement, shelf conditions, otherwise monitor products within the shopping facility based on one or more series of 3D scans and corresponding composite 3D scan mapping, establish and/or maintain communications, make any of the determinations and/or corrections described herein, and the like. For example, the databases 126 may store relevant information such as but not limited to two-dimensional (2D) shopping facility mapping, 3D shopping facility mapping, product mapping, 3D product scans, images of products, product information (e.g., inventory, types of products, details about products, product dimensions, images of products, pricing, promotional information, etc.), inventory information, product position and/or placement information, product stock levels, customer information (e.g., customer profiles, log-in information, contact information, types of user interface units used by the customer, shopping list(s), preferences, etc.), motorized transport unit identifying information, capabilities of the motorized transport units, movable item container identifying information, location information, lighting patterns, light source identifiers, light source mapping, commands, codes, code location mapping, software, applications, executables, log and/or historic information, other such relevant information, and typically a combination of two or more of such information. Such data may be pre-stored in the memory or be received, for example, from one or more 3D scanners, the motorized transport units 102, the movable item containers 104, customer and/or shopping facility associate user interface units 114, external servers, other sources, or combinations of such sources.

In some embodiments, the one or more 3D scanners 602 are configured to scan at least the product shelves and corresponding products on the shelves as the 3D scanners are moved through the shopping facility. The 3D scanners, in some embodiments, utilize an array of one or more lasers that are used to measure at least distances between the 3D scanner and one or more objects of interest. For example, some embodiments utilize 3D scanners from FARO Technologies, Inc. The 3D scanners can generate a series of 3D scans that can be cooperated to generate a composite 3D mapping of areas of the shopping facility.

In some implementations the control circuit 108 evaluates the 3D scans and/or 3D scan mapping. Similarly, in some applications, the control circuit obtains one or more series of 3D scans and compiles the series of 3D scans to generate one or more scan mapping. In other embodiments, the central computer system 106 includes one or more 3D scan mapping evaluators or couples with one or more 3D scan mapping evaluators that performs some or all of the evaluations of the 3D scan mapping relative to thresholds, baseline or reference 3D scans and/or mappings, store mapping, product mapping, product scans, other such evaluations, or combinations of such evaluations. The 3D scan mapping evaluation allows the product monitoring system to identify areas and/or products within the shopping facility for which action may need to be performed, such as moving items of a product forward toward an outer or exposed end of a shelf, restocking or adding additional items of a product to a shelf, returning an item to a corrected location within the shopping facility, and other such actions.

The control circuit and/or 3D scan mapping evaluator, in some embodiments, receives one or more 3D scans from one or more 3D scanners 602 and identifies relative distances. Further, in some implementations, the control circuit and/or 3D scan mapping evaluator is configured to compile series of 3D scans to define a 3D mapping, while in other implementations the 3D scanner or other component cooperates the series of 3D scans to form a 3D mapping. The 3D mapping can be evaluated relative one or more thresholds and/or a reference or baseline mapping.

By monitoring products on the shelves, the central computer system can enhance product visibility, improve customer shopping experiences, improve on shopping facility employee efficiency and effectiveness, increase sales, and other such benefits. The 3D scans can then be evaluated to identify when product placement is less than optimal and when a shelf has insufficient quantities of a product. In some implementation, the 3D scans are captured by moving one or more 3D scanners 602 through at least portions of the shopping facility and activating the 3D scanners to acquire the 3D scans, and typically a series of 3D scans as the 3D scanners are moved through at least the portions of the shopping facilities.

In some instances, one or more shopping facility associates, colleagues and/or other such workers can move the 3D scanner through the shopping facility allowing the 3D scanner to capture scans of different areas of the shopping facility. For example, a shopping facility worker may manually carry one or more 3D scanners as scans are acquired. As another example, one or more 3D scanners may be positioned on a movable structure or device that can be physically moved by the shopping facility associate. Additionally or alternatively, some implementations cooperate one or more 3D scanners with a motorized transport unit 102 that can utilize its internal locomotion system to physically move the one or more 3D scanners through relevant portions of the shopping facility while the 3D scanners acquire the desired 3D scans and typically one or more series of 3D scans.

Again, the motorized transport units 102 are self-propelled and configured to move themselves throughout at least some, if not all of the shopping facility. Typically, the motorized transport units 102 wirelessly receive commands from the central computer system 106, which may include a location controller and/or route controller that can direct the motorized transport units to desired locations and/or along desired routes within or outside of the shopping facility. Further, in some embodiments, one or more of the available motorized transport units 102 can be configured to carry one or more 3D scanners 602. In some implementations, the movable structure that supports the one or more 3D scanners may be a movable item container 104.

In some embodiments, the motorized transport units 102 and/or the movable item containers 104 provide information to the central computer system 106 to allow the central computer system to accurately identify a relevant location of the motorized transport unit, movable item container and/or 3D scanners at the shopping facility. Typically, the motorized transport units 102 are configured with one or more detection systems or sensors 414 (e.g., light detectors, measurement systems, etc.) that can provide relevant information to the central computer system.

Figure 7:
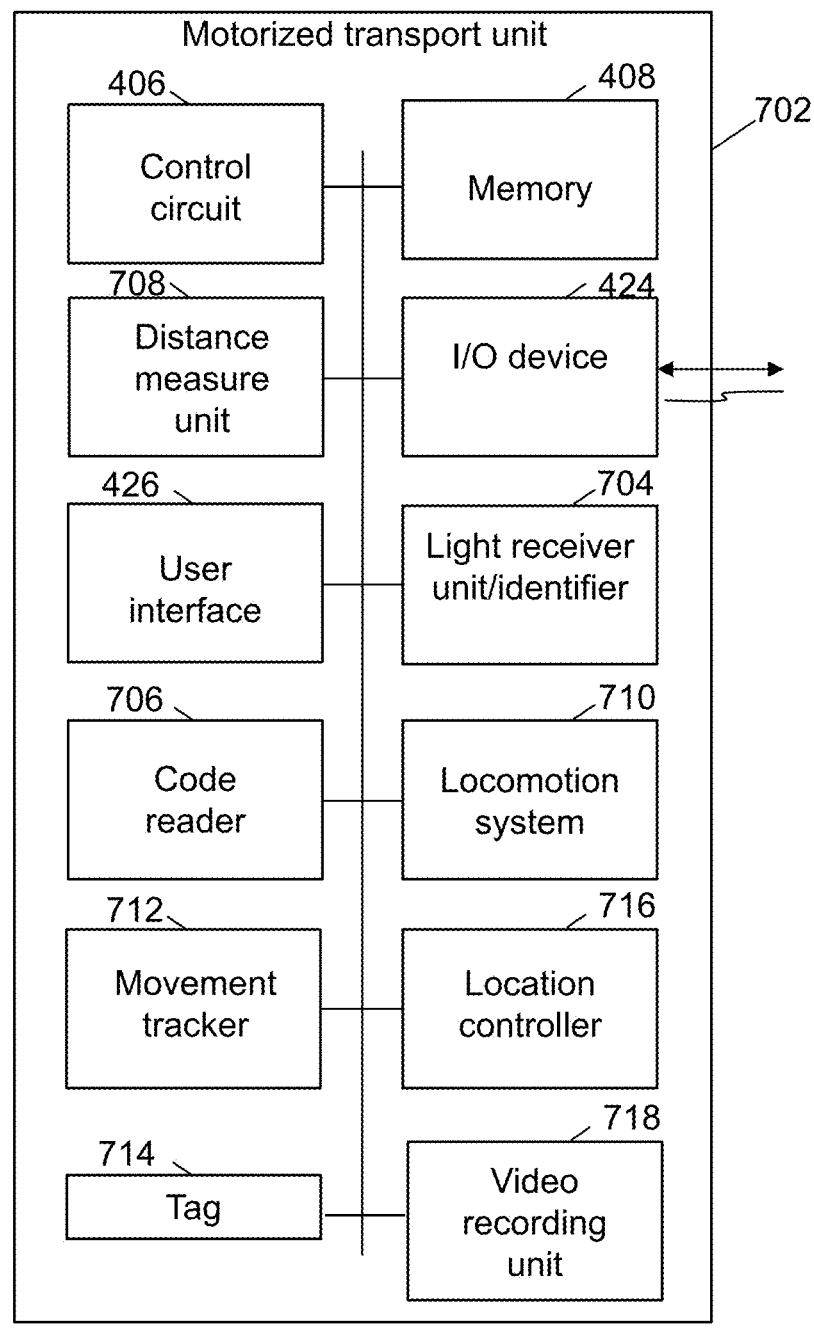
FIG. 7 shows a simplified block diagram of an exemplary motorized transport unit, in accordance with some embodiments.

FIG. 7 shows a simplified block diagram of an exemplary motorized transport unit 702, similar to the motorized transport unit in FIG. 4, in accordance with some embodiments. Again, the motorized transport units 702 are self-propelled and configured to move themselves throughout at least some, if not all of the shopping facility. In some embodiments, the motorized transport units 702 wirelessly receive commands from the central computer system 106 (or the control circuit) to direct the motorized transport units to desired locations and/or along desired routes within or outside of the shopping facility. Additionally, in some implementations, one or more motorized transport units are configured to move one or more 3D scanners 602 through the shopping facility in accordance with movement commands and/or routing information provided by the central computer system. In some embodiments, the movable item container may configured to support one or more 3D scanners, and/or a movable item container may be a device specifically constructed to support one or more 3D scanners intended to be moved through the shopping facility.

The motorized transport unit includes one or more control circuit 406, one or more memory 408, one or more input/output (I/O) devices or interfaces 424, and one or more locomotion systems 710 (such as a motorized wheel system 410). The motorized transport unit may further include a user interface 426. Further, the motorized transport unit may also include one or more sensors and/or measurement units, such as but not limited to one or more distance measurement units 708, light receiver units 704, optical and/or machine readable code readers 706, movement tracker units 712, location controller 716, camera and/or video recording unit 718, other such measurement units, and typically a combination of such measurement units. In some embodiments, the motorized transport unit 702 includes one or more tags 714 or other device that may be detectable, such as by location tracking units located at one or more positions throughout the shopping facility, by one or more movable item containers 104, or by other systems of the product monitoring system. In some embodiments, the tag 714 is an RFID tag or other tag, and can in some instances provide a unique identifier of the motorized transport unit.

The locomotion system 710 includes and controls one or more motors of the motorized transport unit to at least cause the motorized transport unit to move throughout one or more areas within and/or exterior to the shopping facility. Typically, the locomotion system controls the one or more motors in accordance with one or more commands, position information, mapping coordinates, destination locations and the like. In some embodiments, the central computer system 106 and/or a location controller is configured to issue movement commands based on a determined and/or predicted location of the motorized transport unit.

In some embodiments, the motorized transport unit 702 further includes the movement tracker unit 712 that is configured to track one or more parameters corresponding to the movement and/or orientation of the motorized transport unit. For example, the movement tracker unit may include and/or communicate with one or more accelerometers, gyroscopes, compass, wheel or tread velocity or rate meters, odometer based on wheel and/or tread movement, global positioning satellite (GPS) information, Wi-Fi signal evaluation, and/or other such movement parameters. These parameters can be used in determining, predicting, and/or fine tuning a location of the motorized transport unit.

Figure 8A:
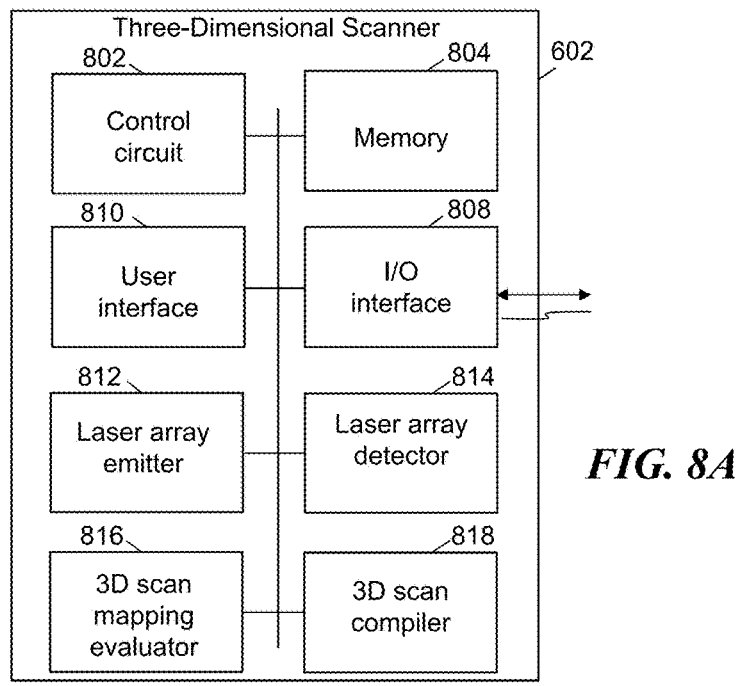
FIG. 8A illustrates a simplified block diagram of an exemplary three-dimensional (3D) scanner, in accordance with some embodiments.

FIG. 8A illustrates a simplified block diagram of an exemplary 3D scanner 602, in accordance with some embodiments. The 3D scanner includes a control circuit 802, memory 804, one or more input/output (I/O) interfaces 808, one or more lasers, laser array emitters or outputs 812, and one or more laser array detectors 814. The 3D scanner typically also includes and one or more user interfaces 810. In some implementations, the 3D scanner may optionally also include one or more 3D scan mapping evaluators 816 and/or 3D scan compilers 818.

The control circuit 802 of the 3D scanner 602 typically comprises one or more processors and/or microprocessors. Generally, the memory 804 stores the operational code or set of instructions that is executed by the control circuit 802 and/or processor to implement the functionality of the 3D scanner. In some embodiments, the memory 804 may also store some or all of particular data that may be needed to implement scans, and make any determinations, measurements and/or communications described herein. Such data may be pre-stored in the memory and/or received from a remote source such as but not limited to the central computer system 106, other 3D scanner, a motorized transport unit, a user interface unit 114, the movable item container 104, other source, or combination of such sources. It is understood that the control circuit 802 and/or processor may be implemented as one or more processor devices as are well known in the art. Similarly, the memory 804 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 804 is shown as internal to the 3D scanner; however, the memory 804 can be internal, external or a combination of internal and external memory. Additionally, a power supply (not shown) is typically included to power one or more of the components, or power may be received from an external source. While FIG. 8A illustrates the various components being coupled together via a bus, it is understood that the various components may actually directly couple with the control circuit 802 and/or one or more other components.

Generally, the control circuit 802 and/or electronic components of the 3D scanner 602 can comprise fixed-purpose hard-wired platforms or can comprise a partially or wholly programmable platform. These architectural options are well known and understood in the art and require no further description here. The 3D scanner 602 and/or control circuit 802 can be configured (for example, by using corresponding programming as will be well understood by those skilled in the art) to carry out one or more of the steps, actions, and/or functions described herein.

The control circuit 802 can be configured, in part, to provide overall control and/or coordinate operation of the components of the movable item container. For example, the control circuit 802 can activate, deactivate and/or otherwise control the one or more laser array emitters 812, instruct and/or activate one or more transmitters, receivers, or transceivers of the I/O interface 808 to communicate with the central computer system 106, one or more the motorized transport units, user interface units 114, and the like, initiate actions in response to commands received (e.g., from the central computer system 106, inputs received through the user interface 810, etc.), and other such actions and control. As another example, the control circuit 802 may activate the one or more laser array emitters 812 and corresponding one or more laser array detectors 814 to measure and/or capture multiple series of 3D scans that can be evaluated, compiled and/or communicated to the central computer system 106.

In some embodiments, the user interface 810 is included, which may be used for user input, output display, output audio, and the like. For example, the user interface 810 may include any known input devices, such one or more buttons, knobs, selectors, switches, keys, touch input surfaces, audio input, and/or displays, etc. Additionally, the user interface may include one or more output audio and/or display devices, such as lights, visual indicators, display screens, speakers, buzzers, etc. to convey information to a user (e.g., display 3D scans, composite 3D scans, composite 3D mapping, status information, notifications, errors, conditions, and/or other such information).

The one or more I/O interfaces 808 allow wired and/or wireless communication coupling of the 3D scanner to external components, such as the central computer system 106, the databases 126, the motorized transport units, the user interface units 114, and other such components. Accordingly, the I/O interface 808 may include any known wired and/or wireless interfacing device, circuit and/or connecting device, such as but not limited to one or more transmitter, receiver, transceiver, etc. For example, in some implementations, the I/O interface provides wireless communication in accordance with one or more wireless protocols (e.g., Wi-Fi, Bluetooth, radio frequency (RF), etc.), providing communication through electromagnetic, optical or acoustic waves carry a signal through atmospheric space rather than along a wire. Accordingly, in some implementations, the 3D scanner can communicate the obtained 3D scans and/or composite scans to the central computer system 106. For example, in some implementations, the 3D scanner can store scans to be transferred later (e.g., upon completing one or more series of scans). In other instances, the 3D scanner may not wait to communicate the scans or may only wait a limited amount of time to communicate one or more scans, such as via a wireless communication. Still further, the 3D scanner may be communicationally coupled with the motorized transport unit to communicate the 3D scans to the motorized transport units to be relayed to the central computer system 106.

The 3D scanner 602 can, in some implementations, further include one or more 3D scan mapping evaluators 816. The 3D scan mapping evaluator is configured to evaluate one or more 3D scans and/or 3D scan mapping to evaluate the scans and/or mapping relative to one or more thresholds and/or one or more reference scans and/or 3D reference mappings. The 3D scan evaluator can be configured to evaluate individual scans of a series of 3D scans, and/or configured to evaluate composite 3D scans formed from a composite of multiple 3D scans. Similarly, in some embodiments, the 3D scanner includes one or more 3D scan compilers 818 that are configured to cooperate, combine, interlace or otherwise compile two or more 3D scans to provide one or more composite 3D scans and/or 3D scan mappings of areas of the shopping facility, including areas of a shelf for multiple different shelves throughout the shopping facility.

In some embodiments, the central computer system 106 receives the series of 3D scans and utilizes the scans to compile a 3D mapping of areas of the shelves and products on those shelves. In some embodiments, the 3D scanner provides one or more composite 3D scans. A 3D mapping is generated based on the scans that define at least relative distances within the areas captured by the scans. Utilizing the mapping of the shopping facility and product mapping and placement in cooperation with the 3D mapping, product placement one or more shelves is evaluated relative to product placement and/or an evaluation of one or more items placed on the shelf.

In some embodiments, one or more 3D scanners may be positioned on and/or coupled with a motorized transport unit (e.g., motorized transport unit 702) allowing the motorized transport unit to transport the one or more 3D scanners through at least portions of the shopping facility to allow 3D scans to be acquired. Typically, the motorized transport unit is provided with movement instructions and/or route information from the central computer system 106. In response to the commands, the motorized transport unit moves one or more the 3D scanner.

Figure 8B:
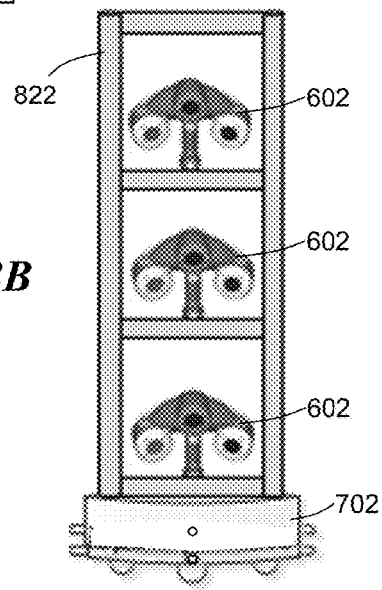
FIG. 8B shows a simplified plane view of a plurality of exemplary 3D scanners cooperated with a motorized transport unit, in accordance with some embodiments.

FIG. 8B shows a simplified plane view of a plurality of exemplary 3D scanners 602 cooperated with an exemplary motorized transport unit 702, in accordance with some embodiments. In some embodiments, the 3D scanners are mounted within a frame 822, post, or other structure that is secured with the motorized transport unit. The frame 822 can support multiple 3D scanners 602 at different heights. Accordingly, the motorized transport unit can be issued commands from the central computer system 106 to move the 3D scanners 602 throughout at least portions of the shopping facility. In some embodiments, the frame may be configured to change an elevation and/or angular orientation relative to the motorized transport unit (e.g., frame may include one or more telescoping sections that can raise or lower, and/or be mounted on a plate or the like that can rotate). For example, some embodiments include a telescoping post that supports one or more 3D scanners that can be used to raise and lower the 3D scanners, and in some instances may allow rotation of the 3D scanners. Corresponding actuators, motors or the like can be used to implement relevant movement of the frame and/or 3D scanners.

Figure 9:
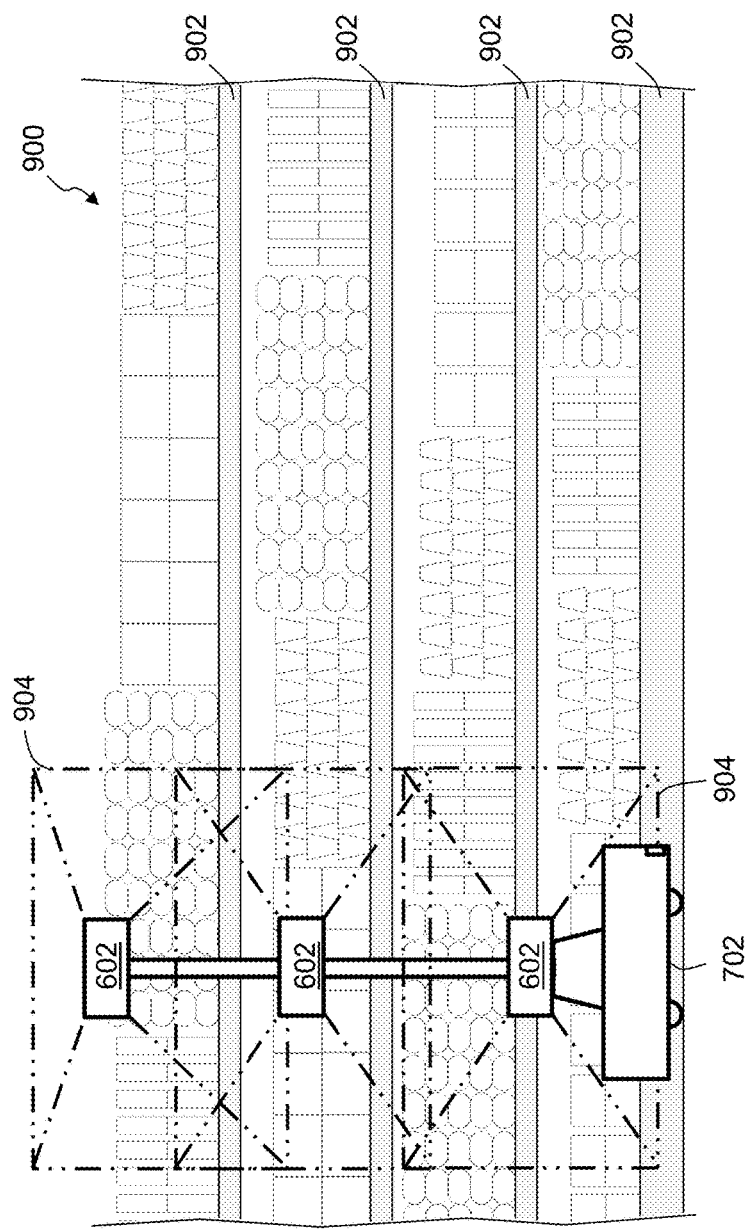
FIG. 9 shows simplified block diagram of a motorized transport unit supporting and moving multiple 3D scanners along a modular having multiple shelves that supports multiple different products, in accordance with some embodiments.

FIG. 9 shows simplified block diagram of a motorized transport unit 702 supporting and moving multiple exemplary 3D scanners 602 along an exemplary modular 900 having multiple shelves 902 that supports multiple different products, in accordance with some embodiments. Each 3D scanner is configured to preform one or more, and typically a series of multiple 3D scans 904 or scan patterns that can be utilized and/or stitched or otherwise cooperated to form 3D mappings.

Figure 10:
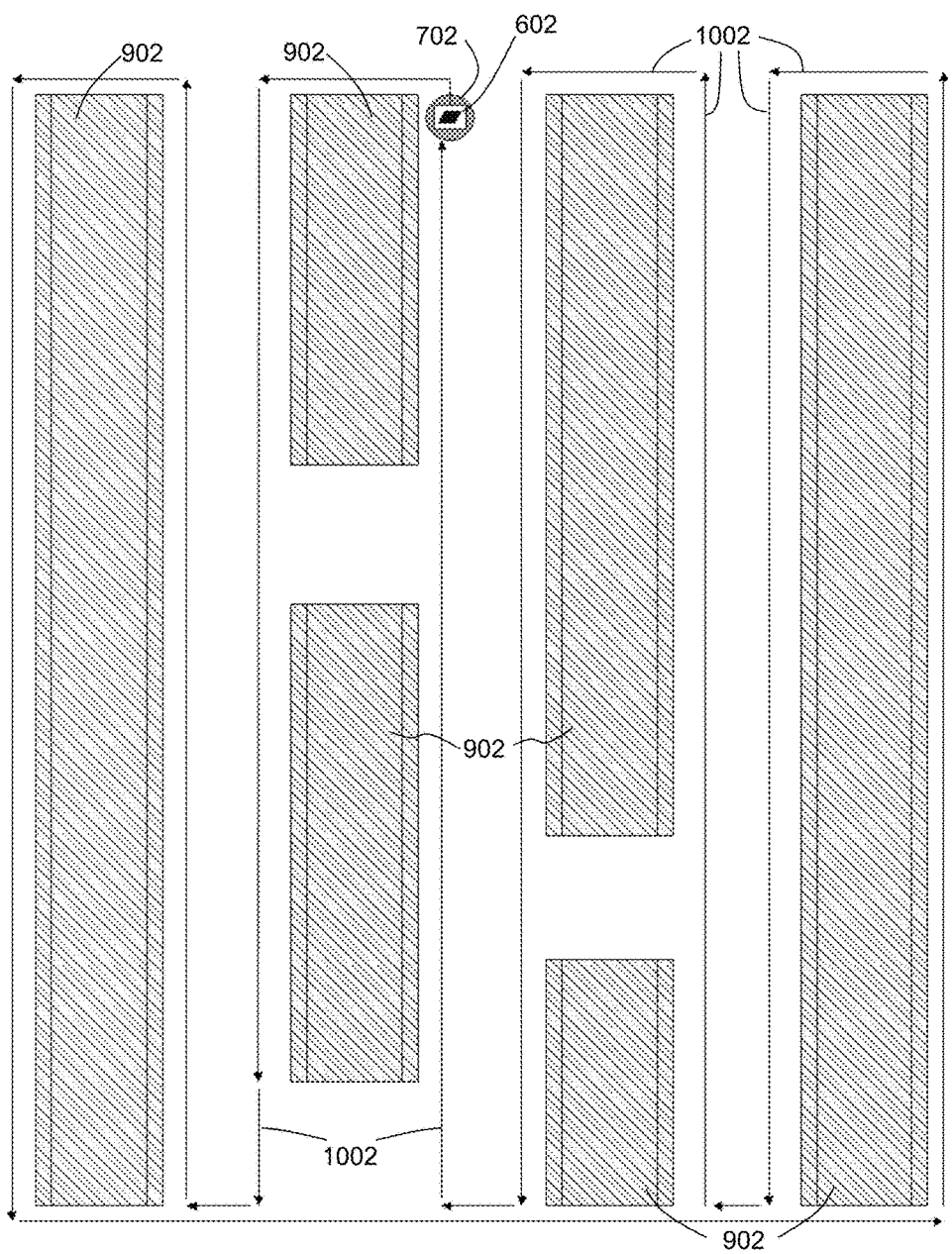
FIG. 10 shows a simplified overhead view of at least a portion of a shopping facility with an exemplary defined scan route, in accordance with some embodiments.

FIG. 10 shows a simplified overhead view of at least a portion of a shopping facility with an exemplary defined scanning route 1002, in accordance with some embodiments. Multiple shelves 902, modulars, bins, cabinets, and/or other such product support structures are positioned distributed throughout the shopping facility. The one or more 3D scanners 602 are moved through amongst the shelves 902 while acquiring the multiple series of 3D scans. As described above and further below, in many implementations one or more 3D scanners are mounted and/or coupled with a motorized transport unit (e.g., motorized transport unit 702). The central computer system 106 can issue movement commands and/or communicate route information to the motorized transport unit to be implemented and/or followed by the motorized transport unit to obtain the desired series of 3D scans.

Further illustrated in FIG. 10 is a series of arrows representative of an example scanning route or routes 1002. One or more legs of the scanning route 1002 may be repeated. For example, in some implementations one or more legs of the route may be repeated with the one or more 3D scanners 602 positioned at different heights and/or at different orientations or angles relative to the shelves 902. Further, in some applications, the route or portions of the route may be continuously repeated, such as following the completion of the route the one or more 3D scanners may be returned to again implement a scan. This repeating can provide continuous feedback regarding the state of products within the shopping facility. Further, FIG. 10 shows a single motorized transport unit moving one or more 3D scanners 602. Some embodiments may provide multiple different motorized transport units that can operate simultaneously or at different times traveling different routes, parts of the same routes, or the same routes.

In some embodiments, the central computer system 106 provides the one or more motorized transport units with one or more consistent routes or path to follow. Further, in some instances, the route and/or movement commands include or provide a desired distance from the shelf 902 when the 3D scans are being performed. As described herein, the motorized transport unit typically includes sensors, and one such sensor can include a distance sensor that can be used to maintain an accurate distance between the motorized transport unit 702 and a shelf 902 to achieve a desired scan. This distance may vary, for example, depending on the portion of a shelf being scanned, a desired angle of scan, a desired width, a product being scanned, a type of shelf or bin or case being scanned, other such factors, or a combination of such factors. In many implementations, the distance between the motorized transport unit and the shelf is less than one meter. By using a consistent route, customers and shopping facility associates easily learn or know what to expect when the motorized transport unit is moving. Typically, the motorized transport units travel are relatively slow speeds, and can depend on the scan being performed, area being scanned, whether obstructions are present, congestion within aisles, and other factors. Further, the routing can help the 3D scanners 602 to detect, maintain or reestablishes reference points when moving (e.g., predefined markers, ends of aisles, ends of modulars, etc.). Still further, in some instances, the 3D scans are configured to be in a single direction. In other implementations, however, the 3D scans may be taken in multiple directions (e.g., with the 3D scanners moving down generally a center of an aisle with scans performed on shelves on both sides of the 3D scanners).

Again, the series of 3D scans are evaluated regarding the placement of products on the shelves 902. In some embodiments, one or more baseline or reference 3D scans are generated with product placement on the shelves at desired or ideal conditions (e.g., fully stocked to a desired depth and faced with a first row of the product placed at a desired reference location or offset distance proximate an outer or front edge or end of the shelf). For example, in some instances the reference offset distance may be at the outer edge of the shelf, but typically the reference offset is an offset distance from the outer most exposed edge of the shelf. In some implementations, the reference offset is determined in response to the baseline 3D scans, while in other instances, it is determined prior to the baseline 3D scans are performed and the product placed at the desired reference offset from the outer edge of the shelf. The reference offset typically varies between products, their placement on shelves and other such factors. For example, with heavier and/or more fragile products it may be desirable to have a greater reference offset than other products. Similarly, products place on lower shelves may be allowed to have a reduced reference offset than products placed on higher shelves. Further, taller products may allow for a greater reference offset than shorter products. Accordingly, reference offsets are often dependent upon a product, placement on a product support structure, weight of a product, height of a product, number of products that are typically stacked upon each other, other such factors, and typically a combination of two or more of such factors.

Typically, the reference or baseline scans correspond to how products should be placed. In some embodiments, the baseline scans are generated with 360 degree laser scans that are cooperated or stitched together to form a large 360 degree 3D model and/or 3D mapping. The one or more 3D scanners 602 are moved by the motorized transport units to acquire multiple subsequent or delta 3D scans. In some embodiments, the subsequent 3D scans are obtained through one or more triangulation scanners position at different heights. Further, in some implementations, the 3D scanning sessions for the subsequent 3D scans are activated relative to a shelf, modular, or portion of a shelf. The 3D scans and/or 3D scan mapping are evaluated relative to one or more thresholds and/or the baseline scan. For example, a composite 3D scan mapping corresponding to a select area of a shelf and based on a series of 3D scan data can be compared to and/or evaluate based upon modular tolerances or thresholds. Typically, such tolerances or thresholds are set and maintained by shopping facility associates and/or colleagues. The thresholds may be based upon staffing, whether a shelf can take a full case for replenishment as some shopping facilities do not open and stock a partial case, optimum sales, associate efficiency, product popularity, predicted sales, whether the product is on sale, and/or other such factors or combinations of two or more of such factors.

In some embodiments, the central computer system compares baseline scans with subsequent 3D scans while moving one or more 3D scanners from one modular to another analyzing product placement and distance of product from an edge of the shelf and/or to a back of the shelf, or by calculating an area or volume and comparing it to a baseline area or volume and/or a threshold area or volume. When thresholds are exceeded, associates are notified via text, email, voice mail, or some other electronic notification that the modular needs attention. Associates can acknowledge the alert, correct the situation, and follow up to the central computer system with their completion of task status. The central computer system may record or otherwise log actions of the motorized transport units, 3D scanners 602, and associates and/or colleagues. Such logs may be used in performance analysis, efficiency analysis, product throughput and/or other such analysis.

Figure 11:
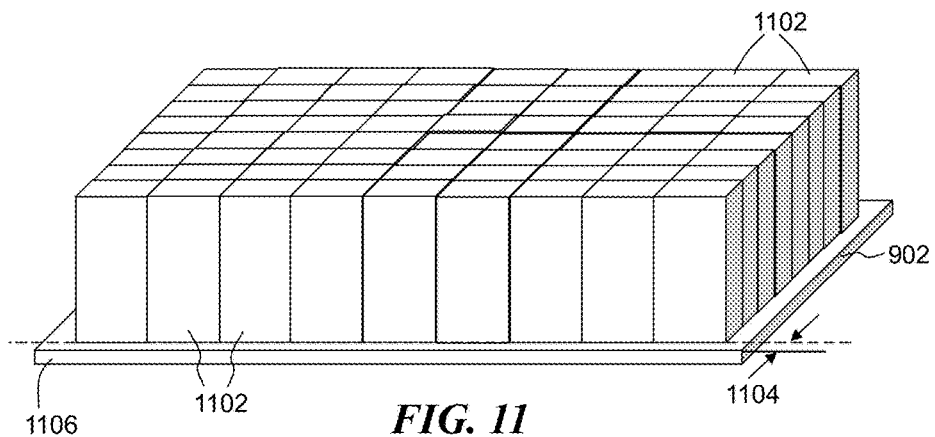
FIG. 11 shows a simplified perspective view of an exemplary baseline 3D scan mapping of at least a portion of a shelf or support structure with a desired or ideal quantity of items of a product being placed on the shelf, in accordance with some embodiments.

FIG. 11 shows a simplified perspective view of an exemplary baseline 3D scan mapping of at least a portion of a shelf 902 or support structure with a desired or ideal quantity of items 1102 of a product being placed on the shelf, in accordance with some embodiments. In this representative example, the first items of the product are placed at a reference offset 1104 from the outer, front, or exposed edge 1106 of the shelf 902. Typically, a series of 3D scans are used to generate the 3D mapping. The 3D mapping can then be used as the baseline or reference in evaluating subsequent or delta 3D scans and resulting 3D scan mappings. Often the items 1102 are arranged in rows extending away from the outer edge 1106 of the shelf 902, with customers typically retrieving items closest to the outer edge of the shelf such that as the quantity of items decreases the available items are typically further from the edge 1106 of the shelf.

Figure 12:
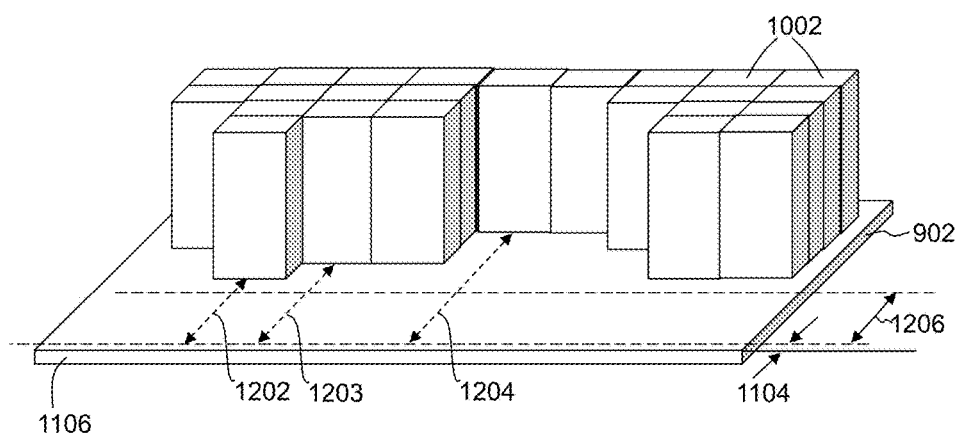
FIG. 12 shows a simplified perspective view of an exemplary subsequent 3D scan mapping of at least the portion of the shelf of FIG. 11, with many of the items of the product having been removed, in accordance with some embodiments.

FIG. 12 shows a simplified perspective view of an exemplary subsequent 3D scan mapping of at least the portion of the shelf 902 of FIG. 11, with many of the items 1102 of the product having been removed, in accordance with some embodiments. Again, items are typically removed from those closest to the outer edge resulting in items at a front of a row progressively being further from the edge 1106 of the shelf as items are removed. The 3D scan mappings are evaluated relative to the baseline scan and/or one or more thresholds in determining whether actions should be taken with respect to the product and portion of the shelf being evaluated. In some embodiments, the evaluation includes evaluating depth distances 1202-1204 between from the reference offset 1104 or the outer edge 1106 of the shelf to the first item of the product in each row of products. These depth distances 1202-1204 are evaluated, in some implementations, relative to one or more threshold distances 1206 (generally referred to as a depth distance threshold), which may correspond to when it is desired that a row of items of a product be "faced" and moved closer to the edge 1106 of the shelf, and typically to the reference offset 1104. For example, when one or more rows of a product are more than the depth distance threshold 1206 from the edge of the shelf and/or from the reference offset 1104, the central computer system may set a flag corresponding to the product and/or the specific location on the shelf using the retail facility mapping and/or product mapping. In response to the facing flag being set, a notification can be communicated to one or more shopping facility associates notifying them that items of the product should be faced, restocked or otherwise addressed.

In other instances, the notification to the shopping facility associate is not immediately communicated in response to detecting a row being further from the reference offset than a depth distance threshold 1206. This is because there may be only a single row that is further than the facing distance threshold from the reference offset, and such a notification would likely be an inefficient use of the associate's time. Instead, the central computer system may further evaluate an area of the shelf corresponding to the product of interest that are empty of items of the product relative to one or more threshold areas in determining when to notify shopping facility that action should be taken.

Figure 13:
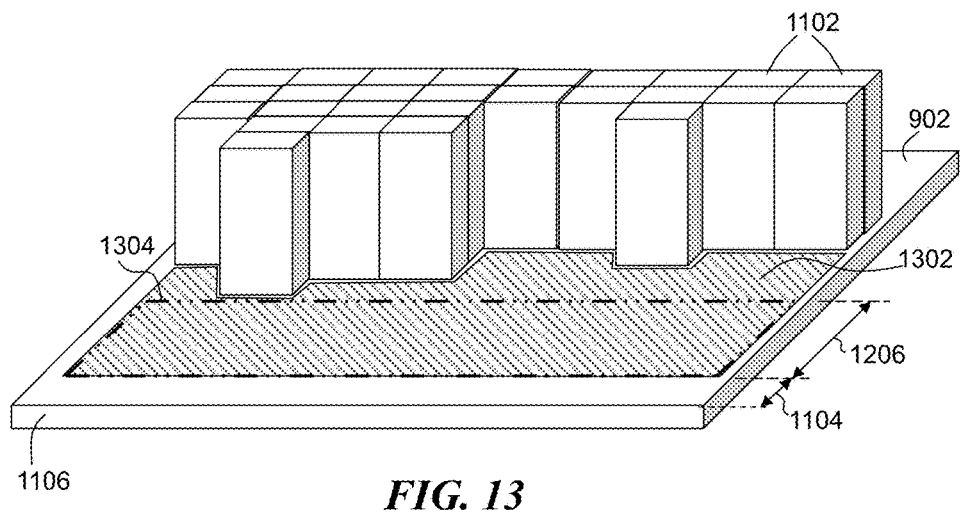
FIG. 13 shows a simplified perspective view of an exemplary 3D scan mapping of at least the portion of the shelf of FIG. 11, with items of the product having been removed by customers, in accordance with some embodiments.

FIG. 13 shows a simplified perspective view of an exemplary 3D scan mapping of at least the portion of the shelf 902 of FIG. 11, with items 1102 of the product having been removed by customers, in accordance with some embodiments. Further illustrated is an exemplary empty area 1302 corresponding to one or more areas where items of a product have been removed, and in the illustration of FIG. 13 shows that the available products present are further than the depth distance threshold 1206 than from the reference offset 1104. Utilizing the 3D scan mapping, the central computer system can identify and/or determine the empty area or areas 1302, and evaluate the empty area 1302 relative to a facing area threshold 1304. The facing area threshold may correspond to the depth distance threshold 1206, while in other embodiments, the facing area threshold may be unrelated to the facing distance threshold. Additionally or alternatively, the facing area threshold may be dependent at least in part on a quantity of items of the product that are within a single case or other such packaging. For example, some shopping facilities may not restock a shelf until there is empty space to receive at least a full case of items of the product so that partial cases do not have to be stored.

In identifying that the empty area 1302 is greater than the facing area threshold 1304, the central computer system 106 can then issue a notification to one or more shopping facility associates requesting that one or more actions be taken. Typically, the requested action may depend on one or more factors, such as the size of the empty area 1302, a ratio of the empty area to the facing area threshold 1304, whether the empty area 1302 can receive a full case of the product or whole number multiples of cases of the product, or other such factors. In some instances, a further restocking area threshold (not shown) is also considered. The restocking area threshold may correspond to an area that is greater than the facing area threshold. As such, if the central computer system detects that the empty area 1302 is equal to or greater than the facing area threshold but less than the restocking area threshold, the central computer system may issue a notification or instruction to the one or more shopping facility associates to go to the area of the shelf and move the items of the product closer to or up to the reference offset (or the edge 1106 of the shelf 902 depending on the product and other such factors). Alternatively, when the empty area 1302 is equal to or greater than the restocking area threshold the central computer system can issue a request that the associate restock at least that area of the shelf 902. Similarly, the central computer system may take into consideration other factors, such as what is available in stock of the product being evaluated. For example, if there are no additional items of the product in stock, the central computer system will not issue the request to restock even when the empty area 1302 meets or exceeds the restocking area threshold. Instead, the central computer may limit the notification to only a request for a facing of the product at the identified area of the shelf. In this way, the central computer system may at least in part improve or optimize the efficiency of shopping facility associate.

Additionally or alternatively, some embodiments monitor products relative to a number of items of the product that are available on one or more shelves and accessible to customers. One or more thresholds can be evaluated to determine whether restocking should be performed. For example, some embodiments identify from the evaluation of the 3D scan mapping and relative to each of multiple rows of items of the product supported by the product support structure whether a threshold number of items are present within each expected row, with each of the multiple rows of items including one or more of the items 1102 arranged extending away from the edge of the shelf. Similarly, the evaluation can identify that all products within an expected row have been removed. For example, the evaluation of the 3D mapping can identify a gap between rows of products (whether rows of the same product or two different products), and/or a spacing between rows that is greater than a gap threshold, which typically corresponds to a known or determined width of a product being evaluated. The evaluation can further identify, for example, that a threshold number of rows within the select area do not have at least the threshold number of items. In response to detecting a lack of a desired quantity of items at the area of the shelf being evaluated, a restocking notification can be issued to a shopping facility associate. In some implementations, this evaluation can include evaluating products even when items of the products are fully faced, partially faced and not faced.

Figure 14:
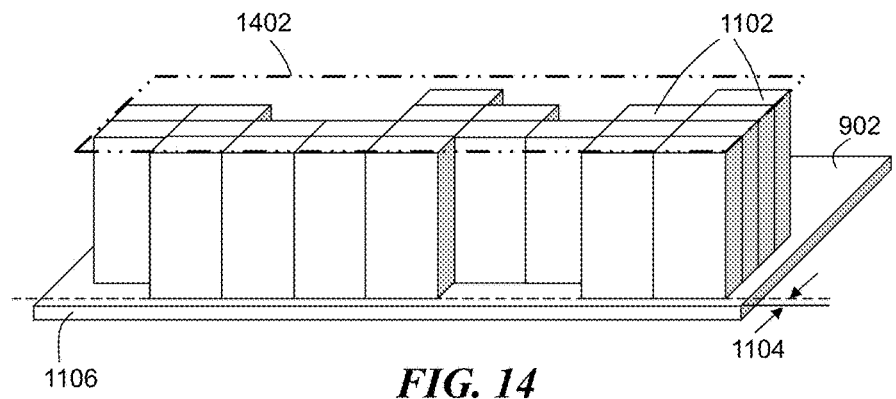
FIG. 14 shows a simplified perspective view of an exemplary 3D scan mapping of at least the portion of a shelf with items substantially faced at the reference offset with an empty area behind a plurality of items of the product, in accordance with some embodiments.

FIG. 14 shows a simplified perspective view of an exemplary 3D scan mapping of at least the portion of a shelf 902 with items 1102 substantially faced at the reference offset with an empty area behind a plurality of items of the product, in accordance with some embodiments. In some implementations, the one or more 3D scanners 602 can be positioned to capture 3D scans that can include the depth or a number of products deep on a shelf. Again, some embodiments provide 3D scans at multiple different heights. These different heights can allow for a mapping of depths on shelves. The 3D mappings can be evaluated to determine whether a threshold number of items are present within each row, with each of the multiple rows of items includes one or more of the items arranged extending away from the edge of the shelf. Some embodiments further identify whether a threshold number of rows within the select area do not have at least the threshold number of items.

Additionally or alternatively, a product depth distance threshold may be evaluated for each row, and/or a depth area threshold 1402 may be considered in determining whether a sufficient numbers of items of the product are available to customers (e.g., items of a product fill less than a depth area threshold 1402). Again, the central computer system can issue a request or instruction to a shopping facility associate to take action relative to insufficient quantities of a product. For example, the central computer system may issue restocking commands. Again, the evaluation may take into consideration other factors, such as available stock of the product, available associates, other restocking and/or facing that have been identified, prioritization of restocking and/or facing needs, and the like. The prioritization may be based on a difference between available items of products and one or more thresholds, products in stock, products on order, likelihood a product is to be purchased and/or popularity of products, expected shipments of products, other such factors, and typically a combination of two or more of such factors.

Similarly, the central computer system can be configured, in some embodiments, to identify, relative to each of multiple rows of items of a product supported by a shelf and/or empty rows, whether a threshold number of items of the product are present within each row. For some products, a notification may be issued in response to identifying that one or more rows do not have the desired number of items. With other products, the central computer system may further identify that a threshold number of the rows of items of the product within the select area do not have at least a threshold number of items, and issue a notification requesting action be taken in response to identifying that at least the threshold number of rows do not have at least the threshold number of items.

Figure 15:
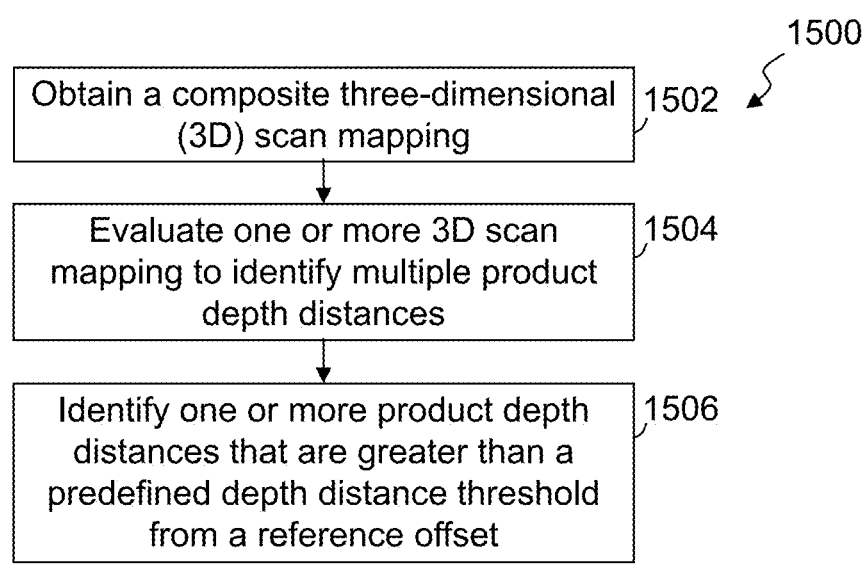
FIG. 15 depicts a simplified flow diagram of an exemplary process of obtaining one or more 3D scans and/or evaluating composite 3D scan mappings, in accordance with some embodiments.

FIG. 15 depicts a simplified flow diagram of an exemplary process 1500 of obtaining one or more 3D scans and/or evaluating composite 3D scan mappings, in accordance with some embodiments. In step 1502, a composite three-dimensional (3D) scan mapping is obtained that corresponds to at least a select area of the shopping facility and based on a series of 3D scan data obtained by one or more 3D scanners as the one or more 3D scanners are moved within the shopping facility. In some instances, the 3D scan data comprises 3D scans of shelves and the items of products supported by the shelves. Further, the 3D scans are capture as the 3D scanners are moved through the shopping facility. In some instances, one or more 3D scanners are mounted on or otherwise moved by a motorized transport unit. The scans can be captured while movement is taking place. In other instances, the motorized transport unit may be instructed to implement movements of defined distance and making stops following the defined distance. One or more 3D scans can then be taken while the motorized transport unit is stopped between predefined movements. In some applications, the central computer system can tracks a movement of the motorized transport unit and the corresponding 3D scanners, and issues commands to the 3D scanner to implement one or more 3D scans.

In step 1504, the 3D scan mapping is evaluated to identify multiple product depth distances 1202 between a reference offset proximate an edge 1106 of the shelf 902 and each of multiple items of a product positioned on and spaced across the select area of the shelf. In step 1506, one or more of the multiple product depth distances are identified, from the evaluation of the 3D scan mapping, that are greater than a predefined depth distance threshold 1206 from the reference offset or edge of the product support structure. Again, in some instances, the reference offset may be specific to a particular product, a particular shelf, and/or a particular product and its placement on a particular shelf. In some embodiments, a notification is issued (e.g., displayed, communicated to a user interface unit 114, etc.) to a shopping facility associate, in response to identifying that one or more of the multiple product depth distances are greater than a predefined depth distance threshold 1206 from the reference offset, requesting action be taken (e.g., facing of the product, restocking, etc.).

Additionally or alternatively, some embodiments further identify when a threshold area or facing area threshold 1304 across the shelf of the select area has the product depth distance 1202 that is greater than the predefined depth distance threshold 1206. A notification can be issued (e.g., displayed, communicated to a user interface unit 114, etc.) in response to identifying that the facing area threshold 1304 across the shelf of the select area has the product depth distance that is greater than the predefined depth distance threshold 1206. Again, the notification can request action be taken, such as facing the product, restocking the shelf, confirming an order for the product has been submitted, and/or other such actions.

Some embodiments further issue a notification when there are not enough items of a product behind items of the product on a shelf. In some instances, the central computer system identifies, from the evaluation of the 3D scan mapping and relative to each of multiple rows of items of the a product supported by a shelf, whether a threshold number of items are present within each row, wherein each of the multiple rows of items comprises one or more of the items arranged extending away from the edge of the shelf. Similarly, the evaluation can include identifying that a threshold number of rows within the select area do not have at least the threshold number of items. A notification may be issued when the threshold number of items are not present and/or a threshold area is not occupied. The notification can include a request that action be taken in response to identifying that at least one of the threshold area across the shelf of the select area has the product depth distance that is greater than the depth distance threshold, and the threshold number of rows do not have at least the threshold number of items.

Further, some embodiments are configured to identify an incorrectly placed product. As described herein, the central computer system may store and/or may have access to 3D scans, pictures, and/or other such images of many if not all of the products available for purchase at the shopping facility. Additionally, with the shopping facility mapping and/or product mapping the central computer system knows which products are supposed to be in which locations, and which areas on which shelves. Accordingly, the 3D scans and/or 3D mapping can be evaluated with knowledge of which product is supposed to be positioned in an area of a shelf. Items 1102 of the product can be identified within the 3D scans and/or mapping and compared with a 3D scan or picture of an item of the product expected to be at the given area of the shelf being evaluated. Similarly, one or more pictures, video or other imaging can be captured by one or more shopping facility video systems and/or video cameras 118 while the 3D scans are being performed. The one or more pictures, video or other imaging can be evaluated relative to an image of an expected product. For example, dimensions, colors, patterns, bar codes, and/or other such identifying features can be used to confirm that an item located in an area on the shelf being evaluated is actually an item of the product expected to be located in the area. In some embodiments, the central computer system in evaluating the 3D scan mapping is further configured to identify when one or more of the items detected through the 3D scan mapping and within the select area are different than an expected product intended to be positioned within the select area. The central computer system may cause a notification to be communicated, such as wirelessly transmitted through a transceiver, notifying a shopping facility associate that an item of a different product is incorrectly placed within the select area.

Some implementations further consider, in response to an evaluation of the 3D scan mappings, on-hold, on-order and/or in transit conditions in determining whether to place an order for a product. The central computer system can further evaluate an on-hand stock of a product being evaluated in one or more 3D mappings in response to identifying one or more threshold conditions are detected (e.g., that the threshold area across the shelf of the select area has the product depth distance that is greater than the depth distance threshold). The on-hand stock of the product may be identified as being less than a threshold quantity. The central computer system may further determine, in response to identifying that the on-hand stock of the product is less than the threshold quantity, whether additional items of the product are pending delivery from a supplier, whether further orders of the product are on hold for one or more reasons, whether a shipment is in transit, or other such factors.

Some embodiments further cause one or more notifications to be communicated or otherwise issued when there are not enough items behind the front items on a shelf. Accordingly, the central computer system can evaluate the 3D scan mapping and/or multiple 3D scan mappings in evaluating item depths on a shelf. For example, it can be determined relative to each of multiple rows of items of the product supported by the shelf whether a threshold number of items of the product are present within each row. Further, some implementations further identify whether a threshold number of the rows of items of the product within the select area do not have at least the threshold number of items, and issue a notification requesting action be taken in response to identifying that at least the threshold number of rows do not have at least the threshold number of items.

One or more 3D scanners are typically moved through the shopping facility as they capture multiple series of 3D scans. In some implementations, a motorized transport unit is configured to support and move one or more 3D scanners and/or to couple with a scanner support structure that the motorized transport unit can move through the shopping facility in accordance with movement instructions and/or route. In some embodiments the central computer system communicates the one or more instructions and/or routes to the motorized transport unit. For example, the central computer system can cause a transceiver to wirelessly communicate one or more movement commands to the motorized transport unit coupled with the one or more 3D scanners. The one or more movement commands when implemented by the motorized transport unit are configured to cause physical movement of the motorized transport unit and the one or more 3D scanners consistent with the one or more movement commands through at least a portion of the shopping facility and proximate the select area of the product support structure. In some implementations, the one or more routes are identified relative to a mapping of the shopping facility, with the route extending between a determined location of the motorized transport unit within the shopping facility and a destination location within the shopping facility. One or more movement commands can be identified that are configured to control movement of the motorized transport unit to cause the motorized transport unit to move to the destination location in accordance with the route. The central computer system can cause a transceiver to wirelessly transmit the one or more movement commands to the motorized transport unit to cause the motorized transport unit to control its movements in accordance with the one or more movement commands and consistent with the route.

Further, central computer system 106 and/or the motorized transport units can be configured, in some embodiments, to identify obstacles in the way of an intended movement or route that can interfere with movement or interfere with one or more scans. These obstacles can be substantially any obstacle, such as but not limited to customers, movable item containers, other motorized transport units, other scanners, shopping facility employees, boxes, pallets, products, cleaning equipment, and other such obstacles. In some implementations, the central computer system identifies obstacles based on an evaluation of video content received through one or more video cameras positioned at or within the shopping facility; communications from the motorized transport unit and/or a movable item container (e.g., distance measurement information identifying an object along an intended path of the motorized transport unit, video content from the motorized transport unit or movable item container, and the like), notification from another source (e.g., from a shopping facility associate, customer, etc.), and the like. The central computer system 106 can, in some embodiments, determine whether the obstacle is short term obstacle (i.e., expected to be an obstacle for less than a threshold amount of time) or a long term obstacle (i.e., expected to be an obstacle for more than the threshold amount of time). For example, if the central computer system identifies or predicts that the obstacle is likely not to move for less than five minutes, the obstacle may be classified as a short term obstacle, and longer than five minutes as a long term obstacle.

In some embodiments, the central computer system may notify a shopping facility associate or colleague the motorized transport unit needs assistance when a long term obstacle is detected. The notification typically includes a location of the obstacle, and in some instances may identify a type of obstacle, a size, whether a device may be needed to move the obstacle (e.g., a lift or the like), and/or other such information. The notification can be a display on a computer display, display on a point of sale device or the like, a wireless communication to a user interface unit 114 (e.g., a text message sent to one or more associates and/or colleagues) requesting that the associate or colleague investigate. In some embodiments, the colleague acknowledges the alert. In some applications, the central computer system 106 provides a map to the colleague of the location of the motorized transport unit and/or obstacle. Further, the associate or colleague may respond back to the central computer system upon taking action, and in some instances the central computer system may continue to send notifications until a response is received. In other instances, the motorized transport unit may notify the central computer system that the obstacle has been addressed and/or the central computer system may detect (e.g., based on video analysis) that the obstacle has been addressed. For example, if the action is to clear the obstacle, the central computer system can recognize the blockage is clear and the associate and/or colleague may respond back, such as with a text message.

In other instances, the central computer system may determine that the motorized transport unit should take one or more actions in response to the obstacle. For example, when an action is to go around the obstacle, the central computer system may identify one or more movement commands and/or plot a new path for the motorized transport unit to follow so that the one or more 3D scanners 602 can reestablish one or more reference points within the 3D model and/or identify new reference points. In some embodiments, when an obstacle is identified as a short term obstacles the motorized transport unit may be instructed to stop and wait for the obstacle to move out of the way and will not deviate from its intended scanning route 1002.

In some embodiments, the central computer system is configured to communicate with the 3D scanners. The communications can include receiving the series of 3D scans, receiving 3D mapping, whether one or more reference points have been established and/or detected, where a scan is acceptable, when a reference point is lost (e.g., due to speed of movement, interference, orientation, etc.), a detected boundary (e.g., beginning or end) of a shelf, status information, and other such information; and communicating instructions, activating one or more scans, controlling an orientation of the one or more 3D scanners, and the like; and other such communications. For example, the central computer system can cause a transceiver to wirelessly communicate one or more 3D scan commands to induce a change in orientation of the 3D scanners relative to the shelf, which might include a rotation by a certain amount or number of degrees, a shift up or down, or other such instructions. Alternatively, similar commands may be communicated to the motorized transport unit and/or a control system cooperated with the support frame 822 that supports the one or more 3D scanners 602. For example, an orientation control system may be cooperated with one or more motors of the support frame 822 that can rotate the frame, raise or lower one or more sections of the frame or the like.

In some embodiments, apparatuses and methods are provided herein useful to provide assistance to customers and/or workers in a shopping facility. In some embodiments, an apparatus configured to determine product placement conditions within a shopping facility comprises: a transceiver configured to wirelessly receive communications; a product monitoring control circuit coupled with the transceiver and associated with a shopping facility; a memory coupled with the control circuit and storing computer instructions that when executed by the control circuit cause the control circuit to: obtain a composite three-dimensional (3D) scan mapping corresponding to at least a select area of the shopping facility and based on a series of 3D scan data obtained by a 3D scanner as the 3D scanner is moved within the shopping facility; evaluate the 3D scan mapping to identify multiple product depth distances between a reference offset distance proximate an edge of a product support structure and each of multiple items of a first product positioned on and spaced across the select area of the product support structure; and identify, from the evaluation of the 3D scan mapping, when one or more of the multiple product depth distances is greater than a predefined depth distance threshold from the reference offset distance of the product support structure.

In some embodiments, a method of determining product placement conditions within a shopping facility, comprises: by a control circuit of a shopping facility product monitoring system: obtaining a composite three-dimensional (3D) scan mapping corresponding to at least a select area of the shopping facility and based on a series of 3D scan data obtained by a 3D scanner as the 3D scanner is moved within the shopping facility; evaluating the 3D scan mapping to identify multiple product depth distances between a reference offset distance proximate an edge of a product support structure and each of multiple items of a first product positioned on and spaced across the select area of the product support structure; and identifying, from the evaluation of the 3D scan mapping, when one or more of the multiple product depth distances is greater than a predefined depth distance threshold from the edge of the product support structure.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. An apparatus configured to determine product placement conditions within a shopping facility, comprising:
    a transceiver configured to wirelessly receive communications;
    a product monitoring control circuit coupled with the transceiver and associated with a shopping facility;
    a memory coupled with the control circuit and storing computer instructions that when executed by the control circuit cause the control circuit to:
        obtain a composite three-dimensional (3D) scan mapping corresponding to at least a select area of the shopping facility and based on a series of 3D scan data obtained by a 3D scanner as the 3D scanner is moved within the shopping facility;
        evaluate the 3D scan mapping to identify multiple product depth distances between a reference offset distance proximate an edge of a product support structure and each of multiple items of a first product positioned on and spaced across the select area of the product support structure; and
        identify, from the evaluation of the 3D scan mapping, when one or more of the multiple product depth distances is greater than a predefined depth distance threshold from the reference offset distance of the product support structure.

2. The apparatus of claim 1, wherein the control circuit is further configured to:
    identify when a threshold area across the product support structure of the select area has the product depth distance that is greater than the depth distance threshold; and
    issue a notification requesting action be taken in response to identifying that the threshold area across the product support structure of the select area has the product depth distance that is greater than the depth distance threshold.

3. The apparatus of claim 2, wherein the control circuit is further configured to:
    identify, from the evaluation of the 3D scan mapping and relative to each of multiple rows of items of the first product supported by the product support structure, whether a threshold number of items are present within each row, wherein each of the multiple rows of items comprises one or more of the items arranged extending away from the edge of the product support structure; and
    identify that a threshold number of rows within the select area do not have at least the threshold number of items;
    wherein the issuing the notification comprises issuing the notification requesting action be taken in response to identifying that at least one of:
        the threshold area across the product support structure of the select area has the product depth distance that is greater than the depth distance threshold; and
        the threshold number of rows do not have at least the threshold number of items.

4. The apparatus of claim 2, wherein the control circuit in evaluating the 3D scan mapping is further configured to:
    identify when one or more of the items detected through the 3D scan mapping and within the select area are different than the first product intended to be positioned within the select area; and
    cause a notification to be wirelessly transmitted through the transceiver notifying a shopping facility associate that an item of a second product is incorrectly placed within the select area.

5. The apparatus of claim 2, wherein the control circuit is further configured to:
    evaluate an on-hand stock of the first product in response to identifying that the threshold area across the product support structure of the select area has the product depth distance that is greater than the depth distance threshold;
    identify that the on-hand stock of the first product is less than a threshold quantity; and
    determine, in response to identifying that the on-hand stock of the first product is less than the threshold quantity, whether additional items of the first product are pending delivery from a supplier.

6. The apparatus of claim 1, wherein the control circuit is further configured to:
    identify, relative to each of multiple rows of items of the first product supported by the product support structure, whether a threshold number of items of the first product are present within each row, wherein each of the multiple rows of items comprises one or more of the items of the first product arranged extending away from the edge of the product support structure;
    identify that a threshold number of the rows of items of the first product within the select area do not have at least the threshold number of items; and
    issue a notification requesting action be taken in response to identifying that at least the threshold number of rows do not have at least the threshold number of items.

7. The apparatus of claim 1, wherein the control circuit is further configured to:
    cause the transceiver to wirelessly communicate one or more movement commands to a motorized transport unit coupled with the 3D scanner, wherein the one or more movement commands when implemented by the motorized transport unit are configured to cause physical movement of the motorized transport unit and the 3D scanner consistent with the one or more movement commands through at least a portion of the shopping facility and proximate the select area of the product support structure.

8. The apparatus of claim 7, wherein the control circuit is further configured to:
    identify, relative to a mapping of the shopping facility, a route between a determined location of the motorized transport unit within the shopping facility and a destination location within the shopping facility;
    identify the one or more movement commands configured to control movement of the motorized transport unit to cause the motorized transport unit to move to the destination location in accordance with the route; and
    cause the transceiver to wirelessly transmit the one or more movement commands to the motorized transport unit to cause the motorized transport unit to control its movements in accordance with the one or more movement commands and consistent with the route.

9. The apparatus of claim 7, wherein the control circuit is further configured to:
cause the transceiver to wirelessly communicate one or more 3D scan commands to induce a change in orientation of the 3D scanners relative to the product support structure.

10. A method of determining product placement conditions within a shopping facility, comprising:
by a control circuit of a shopping facility product monitoring system:
obtaining a composite three-dimensional (3D) scan mapping corresponding to at least a select area of the shopping facility and based on a series of 3D scan data obtained by a 3D scanner as the 3D scanner is moved within the shopping facility;
evaluating the 3D scan mapping to identify multiple product depth distances between a reference offset distance proximate an edge of a product support structure and each of multiple items of a first product positioned on and spaced across the select area of the product support structure; and
identifying, from the evaluation of the 3D scan mapping, when one or more of the multiple product depth distances is greater than a predefined depth distance threshold from the edge of the product support structure.

11. The method of claim 10, further comprising:
identifying when a threshold area across the product support structure of the select area has the product depth distance that is greater than the depth distance threshold; and
issuing a notification requesting action be taken, in response to identifying that the threshold area across the product support structure of the select area has the product depth distance that is greater than the depth distance threshold.

12. The method of claim 11, further comprising:
identifying, relative to each of multiple rows of items of the first product supported by the product support structure, whether a threshold number of items are present within each row, wherein each of the multiple rows of items comprises one or more of the items arranged extending away from the edge of the product support structure; and
identifying that a threshold number of rows within the select area do not have at least the threshold number of items;
wherein the issuing the notification comprises issuing the notification requesting action be taken in response to identifying that at least one of:
the threshold area across the product support structure of the select area has the product depth distance that is greater than the depth distance threshold, requesting action be taken; and
the threshold number of rows do not have at least the threshold number of items.

13. The method of claim 11, wherein the evaluating the 3D scan mapping comprises:
identifying when one or more of the items detected through the 3D scan mapping and within the select area are different than the first product intended to be positioned within the select area; and
causing a notification to be wirelessly transmitted through the wireless transceiver notifying a shopping facility associate that an item of a second product is incorrectly placed within the select area.

14. The method of claim 11, further comprising:
evaluating an on-hand stock of the first product in response to identifying that the threshold area across the product support structure of the select area has the product depth distance that is greater than the depth distance threshold;
identifying that the on-hand stock of the first product is less than a threshold quantity; and
determining, in response to identifying that the on-hand stock of the first product is less than the threshold quantity, whether additional items of the first product are pending delivery from a supplier.

15. The method of claim 10, further comprising:
identifying, relative to each of multiple rows of items of the first product supported by the product support structure, whether a threshold number of items of the first product are present within each row, wherein each of the multiple rows of items comprises one or more of the items of the first product arranged extending away from the edge of the product support structure;
identifying that a threshold number of the rows of items of the first product within the select area do not have at least the threshold number of items; and
issuing a notification requesting action be taken in response to identifying that at least the threshold number of rows do not have at least the threshold number of items.

16. The method of claim 10, further comprising:
causing a wireless communication of one or more movement commands, through the wireless transceiver, to a motorized transport unit coupled with the 3D scanner, wherein the one or more movement commands when implemented by the motorized transport unit are configured to cause physical movement of the motorized transport unit and the 3D scanner consistent with the one or more movement commands through at least a portion of the shopping facility and proximate the select area of the product support structure.

17. The method of claim 16, further comprising:
identifying, relative to a mapping of the shopping facility, a route between a determined location of the motorized transport unit within the shopping facility and a destination location within the shopping facility; and
identifying the one or more movement commands configured to control movement of the motorized transport unit to cause the motorized transport unit to move to the destination location in accordance with the route;
wherein the causing a wireless communication of the one or more movement commands comprises causing the wireless transceiver to wirelessly transmit the one or more movement commands to the motorized transport unit to cause the motorized transport unit to control its movements in accordance with the one or more movement commands and consistent with the route.

18. The method of claim 16, further comprising:
causing the wireless transceiver to wirelessly communicate one or more 3D scan commands to induce a change in orientation of the 3D scanner relative to the product support structure.

* * * * *